United States Patent [19]
Hirokane et al.

[11] Patent Number: 6,117,544
[45] Date of Patent: Sep. 12, 2000

[54] MAGNETO-OPTICAL RECORDING MEDIUM

[75] Inventors: Junji Hirokane, Nara; Noboru Iwata, Tenri; Akira Takahashi, Nara, all of Japan

[73] Assignee: Sharp Kabushiki Kaisha, Osaka, Japan

[21] Appl. No.: 09/336,094

[22] Filed: Jun. 18, 1999

[30] Foreign Application Priority Data

Jun. 19, 1998 [JP] Japan ................................. 10-173489

[51] Int. Cl.⁷ ...................................................... G11B 5/66
[52] U.S. Cl. ................... 428/336; 428/694 RE; 428/694 MM; 428/694 EC; 428/694 IS; 428/694 TP; 428/900
[58] Field of Search ............................. 428/336, 694 RE, 428/694 MM, 694 EC, 694 IS, 694 TP, 900; 427/131, 132

[56] References Cited

U.S. PATENT DOCUMENTS

| 5,777,953 | 7/1998 | Hirokane et al. | 369/13 |
| 5,939,187 | 8/1999 | Hirokane et al. | 428/332 |

FOREIGN PATENT DOCUMENTS 10-40600  2/1998  Japan .

OTHER PUBLICATIONS

"Magnetically Induced Superresolution Using Interferential In–Plane Magnetization Readout Layer". (J. Hirokane, et al., *Jpn. J. Appl. Phys.* vol. 35, Part 1, No. 11, Nov. 1996, pp. 5701–5704).

"Magnetically Induced Superresolution Magneto–Optical Disk Using an In–Plane Magnetization Mask Layer", by J. Hirokane, et al., in *Japan Applied Magnetic Society Bulletin*, vol. 21, No. 8, pp. 1076–1081(1997). In Japanese with translation of relevant passages. (No Month Avail.).

*Primary Examiner*—Bernard Pianalto
*Attorney, Agent, or Firm*—Dike, Bronstein, Roberts & Cushman, LLP; David G. Conlin

[57] ABSTRACT

A recording layer and a flux adjustment layer have different magnetic polarities so that their magnetizations are countervailed at room temperature, with the result that a weakened leakage magnetic flux is released therefrom. A reproducing layer, a reproducing assist layer and an in-plane magnetization layer exhibit in-plane magnetization at room temperature. In a first temperature area having a temperature not more than the critical temperature of the reproducing layer, the reproducing layer 1 exhibits in-plane magnetization so that magnetization of a recording magnetic domain is not copied to the reproducing layer. In contrast, a second temperature area having a temperature rise between the critical temperature and the Curie temperature of the reproducing layer, the flux adjustment layer and the in-plane magnetization layer have reached their Curie temperatures and lost their magnetization; thus, a leakage magnetic flux generated by the magnetization of the recording magnetic domain is copied to the reproducing assist layer that is in a perpendicular magnetization state, and further copied to the reproducing layer. Moreover, in a third temperature area having a temperature rise exceeding the Curie temperature of the reproducing layer, the reproducing layer has lost its magnetization.

28 Claims, 32 Drawing Sheets

F I G. 17
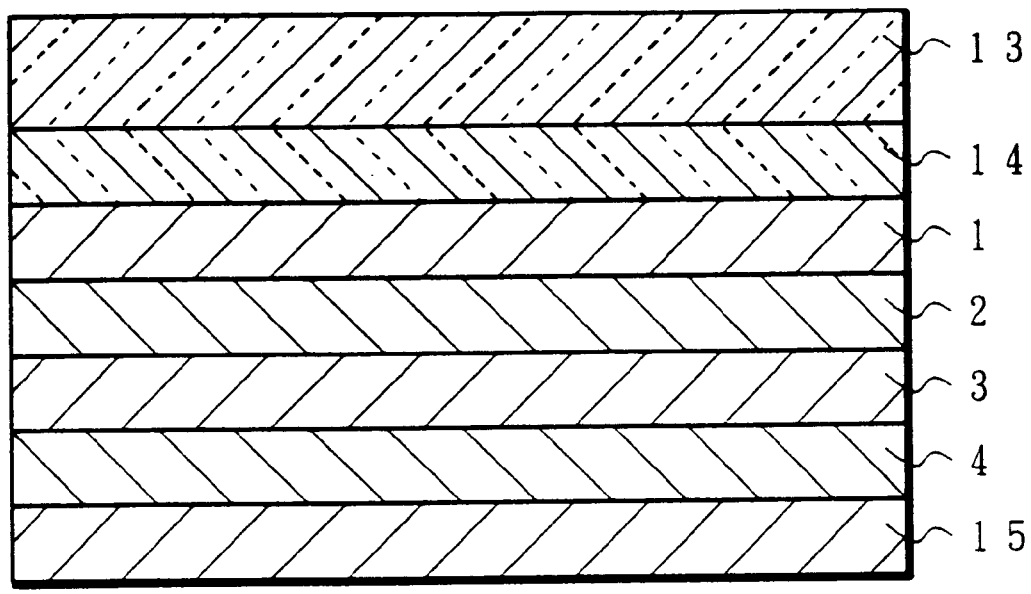

MAGNETO-OPTICAL RECORDING MEDIUM

FIELD OF THE INVENTION

The present invention relates to a magneto-optical recording medium, such as a magneto-optical disk, a magneto-optical tape and a magneto-optical card, which is applied to a magneto-optical recording-reproduction apparatus.

BACKGROUND OF THE INVENTION

Conventionally, magneto-optical recording media, which have been put into practical use as rewritable optical recording media, use a beam-condensed light beam released from a semiconductor laser so as to carry out recording and reproducing operations. However, the disadvantage with the magneto-optical recording medium is that in the case when the diameter of a recording bit serving as a recording magnetic domain or the interval of the recording bit is relatively smaller than the diameter of the light beam, its reproducing characteristic deteriorates.

This is caused by the fact that within the beam diameter of the light beam which has been beam-condensed on a target recording bit, adjacent recording bits of this bit tend to be included, with the result that individual recording bits can not be reproduced in a separated manner.

A construction which aims to overcome the above-mentioned disadvantage with the magneto-optical recording medium has been proposed in "Magnetically Induced Super-resolution Using Interferential In-Plane Magnetization Readout Layer" (Jpn.J.Appl.Phys.Vol.35(1996) pp.5701–5704). In this construction, a reproducing layer, a non-magnetic intermediate layer and a recording layer are stacked in this order. This reproducing layer exhibits in-plane magnetization at room temperature, and comes to exhibit perpendicular magnetization as the temperature rises. Moreover, in this construction, the reproducing layer and the recording layer are magnetostatically coupled with each other with the non-magnetic intermediate layer interpolated in between so that a portion of the reproducing layer which is in a perpendicular magnetization state copies the magnetization of the recording layer. On the other hand, a portion thereof which is in an in-plane magnetization state masks the magnetization of the recording layer.

For this reason, information of recording bits in the recording layer at the portion in contact with the reproducing layer that is maintained in an in-plane magnetization state is not reproduced. Therefore, even if a target recording bit to be reproduced and a recording bit adjacent to this recording bit are included within a beam spot of the light beam, it is possible to reproduce the target recording bit individually in a separated manner.

Moreover, "Magnetic Super-Resolution Magneto-optical Disk using In-plane magnetization Mask Layer" (Japan Applied Magnetic Society Bulletin 21,1076–1081(1997)) has proposed a construction in which in order to achieve a higher reproducing resolution, the in-plane magnetization mask is strengthened by adding an in-plane magnetization mask layer having a low Curie temperature to a reproducing layer.

Furthermore, Japanese Patent Application No. 193140/1996 (Tokuganhei 8-193140), which was applied by the inventors of the present invention, has proposed another construction for further increasing the reproducing resolution of the magneto-optical recording medium, in which the Curie temperature of a reproducing layer is set lower than the Curie temperature of a recording layer so that the in-plane magnetization mask of the reproducing layer is used as a front mask while a portion of the reproducing layer having a temperature rise not less than the Curie temperature is used as a rear mask, thereby forming double masks.

However, the conventional magneto-optical recording media having the above-mentioned constructions have a problem in which, upon carrying out recording and reproducing operations by using an even smaller recording-bit diameter and even smaller recording bit intervals, a leakage magnetic flux, released from the recording layer, gradually grows with temperature rise, with the result that the mask effect of the reproducing layer becomes insufficient, thereby failing to provide a sufficient reproducing signal.

SUMMARY OF THE INVENTION

The objective of the present invention is to provide a magneto-optical recording medium which can obtain a sufficient reproducing signal even from information that has been recorded with such a small recording-bit diameter and such small recording-bit intervals that the conventional super-resolution magneto-optical recording media would fail to reproduce it.

In order to achieve the above-mentioned objective, a magneto-optical recording medium of the present invention is provided with:

a recording layer made of a perpendicular magnetization film;

a reproducing layer made of a magnetic film which exhibits in-plane magnetization at room temperature and comes to exhibit perpendicular magnetization at a temperature not less than a critical temperature; and a flux adjustment layer, stacked adjacent to the recording layer, which is made of a perpendicular magnetization film that has a magnetic polarity different from that of the recording layer and also has a Curie temperature lower than the Curie temperature of the recording layer.

With the above-mentioned construction, leakage magnetic fluxes, released from the recording layer and the flux adjustment layer, are made to rapidly grow with a temperature rise. In other words, since the recording layer and the flux adjustment layer, which are stacked adjacent to each other, have mutually different magnetic polarities, their magnetizations are countervailed at room temperature so that the leakage magnetic fluxes are weakened. Upon reproducing a recording magnetic domain of the recording layer, an area including the recording magnetic domain related to the reproducing process is heated. At this time, since the Curie temperature of the flux adjustment layer is lower than that of the recording layer, the magnetization of an area of the flux adjustment layer corresponding to the recording magnetic domain to be reproduced is allowed to decrease or disappear. As a result, a leakage magnetic flux, which is strengthened by a corresponding decrement of the magnetization of the flux adjustment layer, appears and is copied onto the reproducing layer.

Thus, a greater leakage magnetic flux is generated from the recording layer and the flux adjustment layer only at areas having a temperature rise. In other words, since a greater leakage magnetic flux is generated only from the inside of a rear aperture region having a greater temperature rise, it is possible to form a smaller rear aperture region in a stable manner.

Therefore, only the magnetization of the recording bit to be reproduced is copied from the recording layer to the reproducing layer so that it is possible to reproduce only the recording bit to be reproduced stably. Consequently, it becomes possible to provide a super-resolution reproducing operation with a high reproducing resolution.

The magneto-optical recording medium of the present invention having the above-mentioned construction is also preferably provided with an in-plane magnetization layer made of a magnetic film, which is stacked between the reproducing layer and the recording layer and which exhibits in-plane magnetization at room temperature, and has a Curie temperature in the vicinity of the critical temperature of the reproducing layer.

With this construction, the in-plane magnetization mask of the reproducing layer is further strengthened. In other words, at room temperature, the magnetization layer forms an in-plane magnetization mask against a leakage magnetic flux generated from the recording layer and the flux adjustment layer. Then, upon reproduction, the area including the recording magnetic domain to be reproduced is heated to a temperature in the vicinity of the critical temperature of the reproducing layer; therefore, the in-plane magnetization layer at this area has reached the Curie temperature, losing its magnetization. This makes it possible to release only the in-plane magnetization mask of the area including the recording magnetic domain to be reproduced.

This allows a transition from in-plane magnetization to perpendicular magnetization in the reproducing layer at the time of a temperature rise to take place more abruptly.

Therefore, only the magnetization of the recording bit to be reproduced is copied from the recording layer to the reproducing layer so that it is possible to reproduce only the recording bit to be reproduced stably. Consequently, it becomes possible to provide a super-resolution reproducing operation with a high reproducing resolution.

Moreover, in the above-mentioned construction, it is desirable to further provide an arrangement in which the above-mentioned reproducing layer is allowed to exhibit perpendicular magnetization from the critical temperature to the Curie temperature so that the magnetization of the recording layer is not copied on areas thereof having a temperature rise exceeding the Curie temperature.

In this construction, upon reproduction, three temperature areas are formed in the above-mentioned magneto-optical recording medium that has been heated. That is, in the first temperature area having a temperature not more than the critical temperature, the reproducing layer exhibits in-plane magnetization so that it does not copy the magnetization of the recording layer which exhibits perpendicular magnetization. In the second temperature area having a temperature rise between the critical temperature and the Curie temperature, the reproducing layer comes to exhibit perpendicular magnetization so that it copies the magnetization of the recording layer. In the third temperature area having a temperature rise exceeding the Curie temperature, the magnetization of the reproducing layer has disappeared so that it does not copy the magnetization of the recording layer.

Thus, the second temperature area, which is an area relating to a reproducing operation, is formed, and the first and third temperature areas, which cannot copy the magnetization of the recording layer, are formed adjacent to this area, with the result that the area capable of copying is greatly narrowed.

Therefore, even if the recording-bit diameter and the recording-bit intervals of the recording layer are very small, a recording bit to be reproduced is reproduced in a separated manner from recording bits adjacent to this recording bit, thereby making it possible to carry out a magnetically-induced super-resolution reproducing process with a higher reproducing resolution even in the case of the application of a shorter mark length.

Moreover, the magneto-optical recording medium of the present invention having the above-mentioned construction is preferably provided with a reproducing assist layer made of a magnetic film, which is stacked between the reproducing layer and the recording layer in contact with the reproducing layer, and which exhibits in-plane magnetization at room temperature, has a Curie temperature higher than the Curie temperature of the reproducing layer, and comes to exhibit perpendicular magnetization at a temperature in the vicinity of the critical temperature of the reproducing layer.

With this construction, in addition to the function obtained by the construction of the magneto-optical recording medium, since the reproducing assist layer has a Curie temperature higher than the Curie temperature of the reproducing layer, even if, upon reproduction, the reproducing layer is heated to the vicinity of its Curie temperature, the perpendicularly magnetized state is maintained so that the magnetization copied from the recording layer is further copied onto the reproducing layer.

Thus, a comparatively great magnetization exerted by the reproducing assist layer and a leakage magnetic flux generated from the recording layer and the flux adjustment layer are magnetostatically coupled more firmly in a stable state so that a recording magnetic domain to be reproduced is copied on the reproducing layer stably in both of the cases of a shorter mark length and a longer mark length.

Therefore, it becomes possible to carry out a magnetic super-resolution reproducing operation with a high reproducing resolution in a stable manner.

For a fuller understanding of the nature and advantages of the invention, reference should be made to the ensuing detailed description taken in conjunction with the accompanying drawings.

BRIEF DESCRIPTION OF THE DRAWINGS

FIG. 17 is a cross-sectional view that schematically shows the construction of a magneto-optical disk to which the magneto-optical recording medium of FIG. 14 is applied.

DESCRIPTION OF THE EMBODIMENTS

Embodiment 1

Referring to FIGS. 1 through 9 and FIGS. 31 through 33, the following description will discuss one embodiment of the present invention.

First, referring to FIGS. 31 through 33, an explanation will be given of a magnetic super-resolution reproducing process carried out by a conventional super-resolution magneto-optical recording medium so as to show a technique which forms the premise for the present invention.

Figure 31:
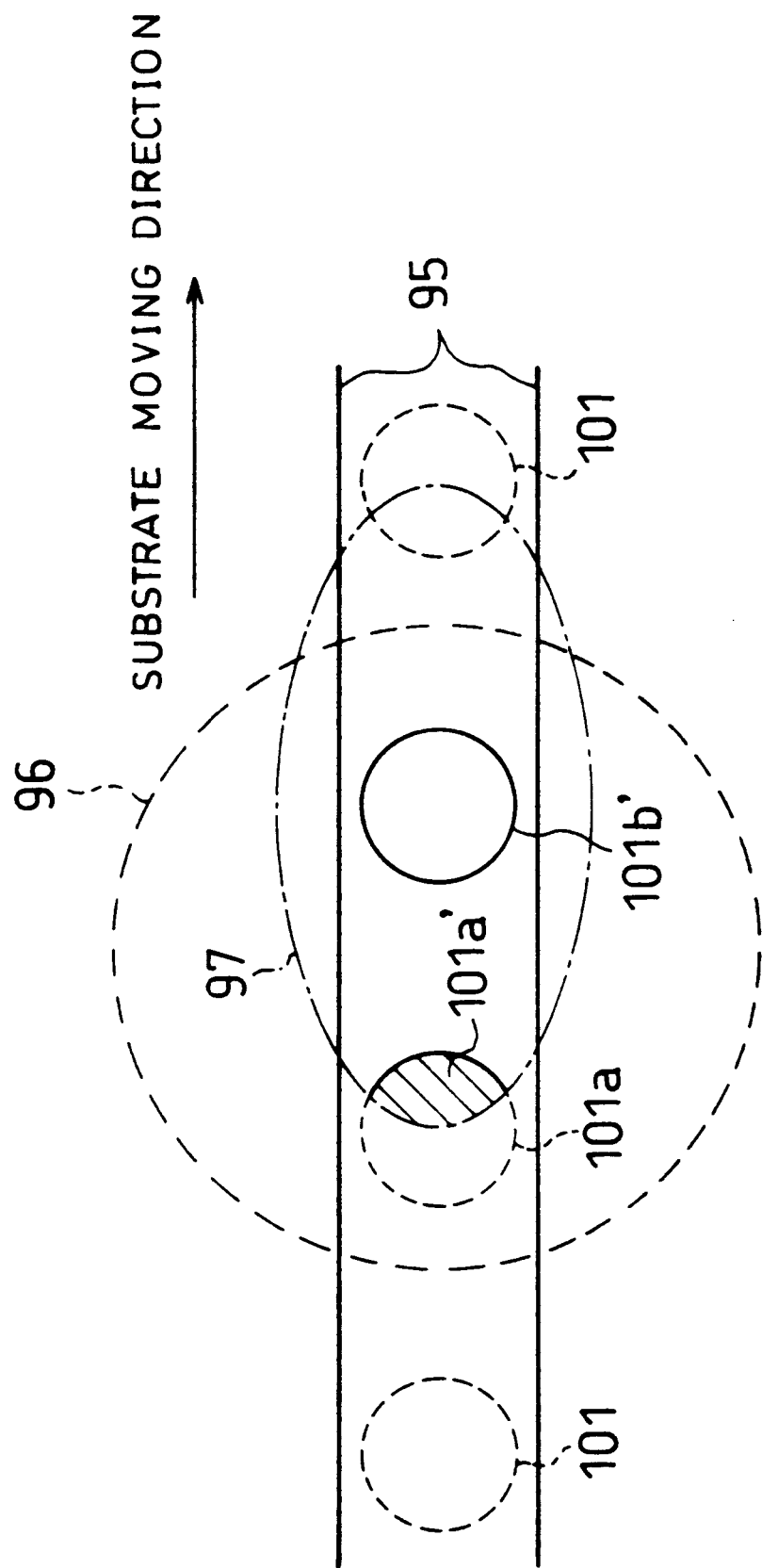
FIG. 31 is an explanatory drawing that shows a temperature distribution of a reproducing layer in a conventional magneto-optical recording medium at the time of reproducing said magneto-optical recording medium.
Figure 32:
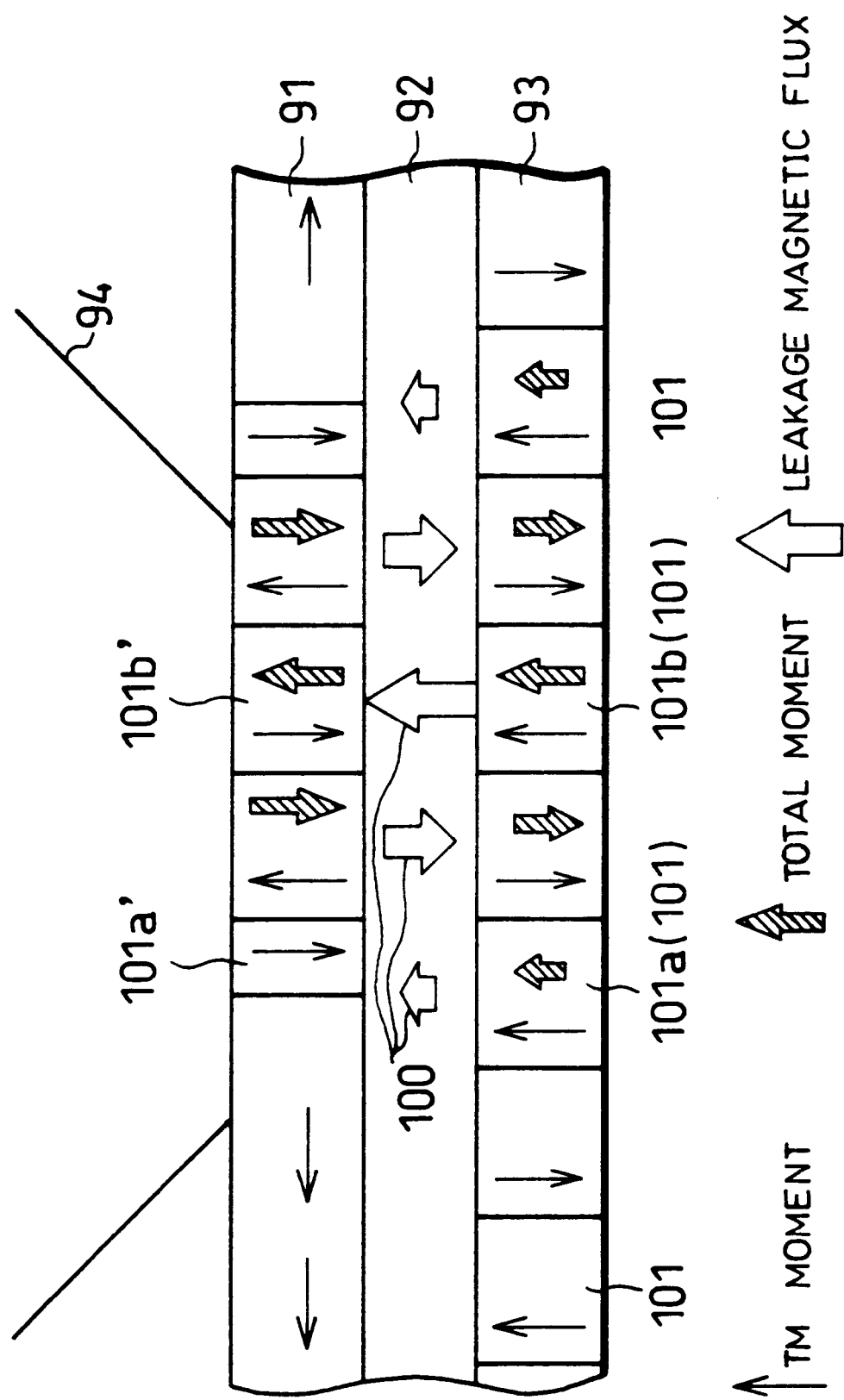
FIG. 32 is an explanatory drawing that shows magnetized states of the reproducing layer and a recording layer of the magneto-optical recording medium at the time of reproducing the magneto-optical recording medium shown in FIG. 31.

FIGS. 31 and 32 are explanatory drawings that show a magneto-optical recording medium in a reproducing state, which is disclosed in the aforementioned "Magnetically Induced Super-resolution Using Interferential In-Plane Magnetization Readout Layer" (Jpn.J.Appl.Phys. Vol.35 (1996)pp.5701–5704).

As illustrated in FIG. 32, the conventional magneto-optical recording medium is constituted by a reproducing layer 91, a non-magnetic intermediate layer 92 and a recording layer 93 that are formed on a substrate. Here, with respect to arrows shown in FIG. 32, each of the thin arrows indicates the direction of a magnetic moment of a transition metal (TM), each of the thick arrows indicates the size and direction of a total moment, and each of void arrows indicates the size and direction of a leakage magnetic flux.

As illustrated in FIG. 31, in the above-mentioned conventional magneto-optical recording medium, a light beam 94 is beam-condensed and directed onto the reproducing layer 91 so as to carry out recording and reproducing operations. In this case, recording magnetic domains 101 are recorded along a guide groove 95, which shows a reproducing state. Here, it is supposed that among the recording magnetic domains 101, a recording magnetic domain at which a magnetization to be reproduced has been recorded is referred to as a recording magnetic domain 101b and a recording magnetic domain adjacent to the recording magnetic domain 101b on the upstream side thereof (on the left in the Figure) is referred to as a recording magnetic domain 101a.

The above-mentioned reproducing layer 91 is a magnetic film whose composition is adjusted so that it exhibits in-plane magnetization at room temperature and comes to exhibit perpendicular magnetization at a temperature not less than the critical temperature. When, upon reproduction, guide groove 95 is irradiated with a light beam 94 while the substrate is in motion, the reproducing layer 91 has a temperature rise not less than the critical temperature at a downstream position (on the right of the Figure) of the light beam spot 96, thereby forming an area that exhibits perpendicular magnetization, that is, a rear aperture region 97. Areas other than the rear aperture region 97 in the reproducing layer 7, which are maintained in an in-plane magnetization state, do not contribute to the reproducing operation.

In the rear aperture region 97, a leakage magnetic flux 100, generated from the recording layer 93, and a magnetization from the reproducing layer 91 is magnetostatically coupled through the non-magnetic intermediate layer 92 so that the magnetization of the recording layer 93 is copied onto the reproducing layer 91. Thus, it is possible to carry out a magnetically-induced super-resolution reproducing operation.

Here, in order to realize the above-mentioned magnetic property, the reproducing layer 91 is designed to have such a composition (RErich composition) that with respect to the compensation composition at which the magnetic moment of a transition metal (TM) and the magnetic moment of a rare-earth metal (RE) balance each other, the RE magnetic moment becomes predominant at room temperature. Thus, in the reproducing layer 91, the direction of the TM magnetic moment and the direction of the total magnetic moment are set antiparallel to each other.

In contrast, the recording layer 93 is adjusted in its composition so that it does not generate a leakage magnetic flux at room temperature while it generates a great leakage magnetic flux at areas having a temperature rise. Here, the recording layer 93 is designed to have such a composition (TMrich composition) that its compensation temperature is set at room temperature and that, with respect to the compensation temperature at which the magnetic moment of a transition metal (TM) and the magnetic moment of a rare-earth metal balance each other, the TM magnetic moment becomes predominant. Thus, in the recording layer 93, the direction of the TM magnetic moment and the direction of the total magnetic moment are set parallel to each other.

Figure 33:
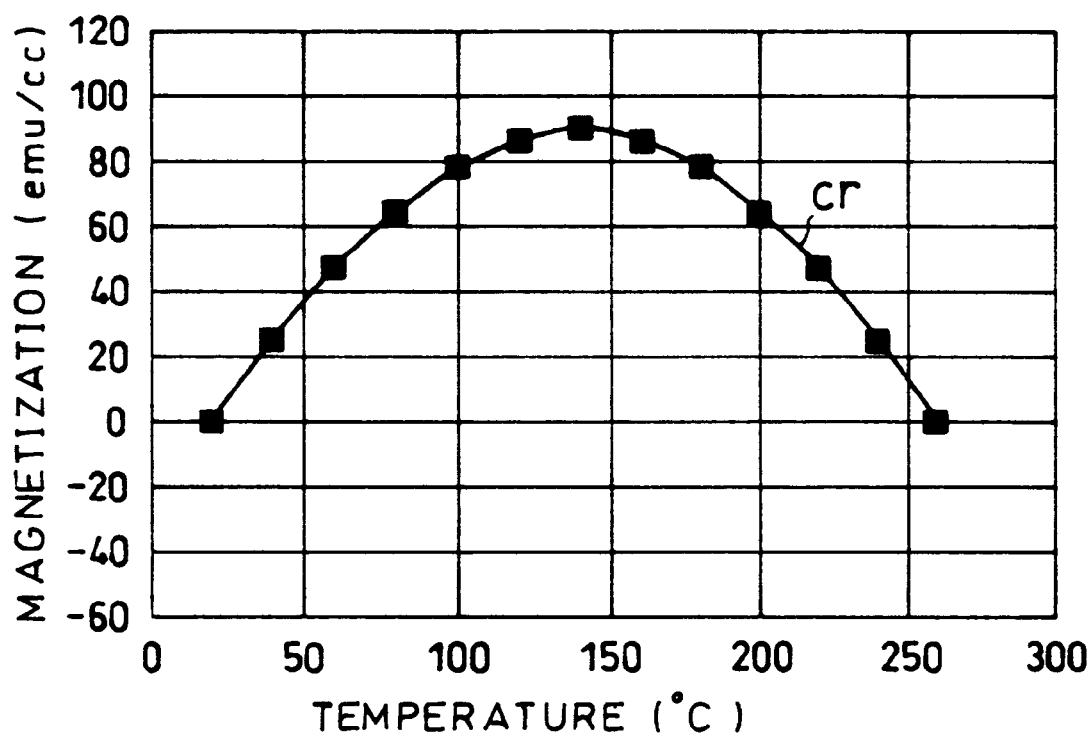
FIG. 33 is a graph that shows a magnetic property of the recording layer and the flux adjustment layer in the magneto-optical recording medium shown in FIG. 31.

FIG. 33 shows the temperature dependence of the total moment (magnetization)(cr) of the recording layer 93.

Since the compensation temperature of the recording layer 93 is set at 20° C., its total moment is zero at 20° C. As the temperature rises, its total moment gradually increases, and becomes greatest at 140° C. Then, at 260° C. that is the Curie temperature of the recording layer 93, the total moment becomes zero again. Here, since a leakage magnetic flux 100, generated from the recording layer 93, is directly proportional to the size of the total moment, it gradually increases as the temperature rises in the same manner as the total moment.

Thus, as illustrated in FIGS. 31 and 32, upon irradiation with a light beam 94, a leakage magnetic flux 100 is generated from the recording layer 93 over a comparatively wide range. Here, the reproducing layer 91 is adjusted in its composition so that it exhibits in-plane magnetization at room temperature and comes to exhibit perpendicular magnetization; therefore, its magnetization is magnetostatically coupled with the leakage magnetic flux 100 released from the recording layer 93, with the result that its magnetization direction is changed from an in-plane direction to a perpendicular direction. Thus, the shape of a rear aperture region 97 to be formed, that is, an area at which the reproducing layer 91 exhibits in-plane magnetization, is dependent on the size of the leakage magnetic flux 100 released from the recording layer 93.

In the case when the leakage magnetic flux 100 released from the recording layer 93 gradually increases as the temperature rises as described above, the leakage magnetic flux 100 is released from the recording layer 93 over a comparatively wide range, with the result that the rear aperture region 97 is widened above what is required. For this reason, although it is originally attempted that only the magnetization of a recording magnetic domain 101b of the recording layer 93 be copied on the reproducing layer 91 and that only the copied magnetic domain 101b' be reproduced, one portion of the magnetization of the adjacent recording magnetic domain 101a is copied on the reproducing layer 91, and the magnetic domain 101a', which is originally not intended to be reproduced, is reproduced together with the magnetic domain 101b', causing degradation in the reproducing resolution.

Next, referring to FIGS. 1 through 3, an explanation will be given of a reproducing state of the magneto-optical recording medium of the present embodiment.

Figure 2:
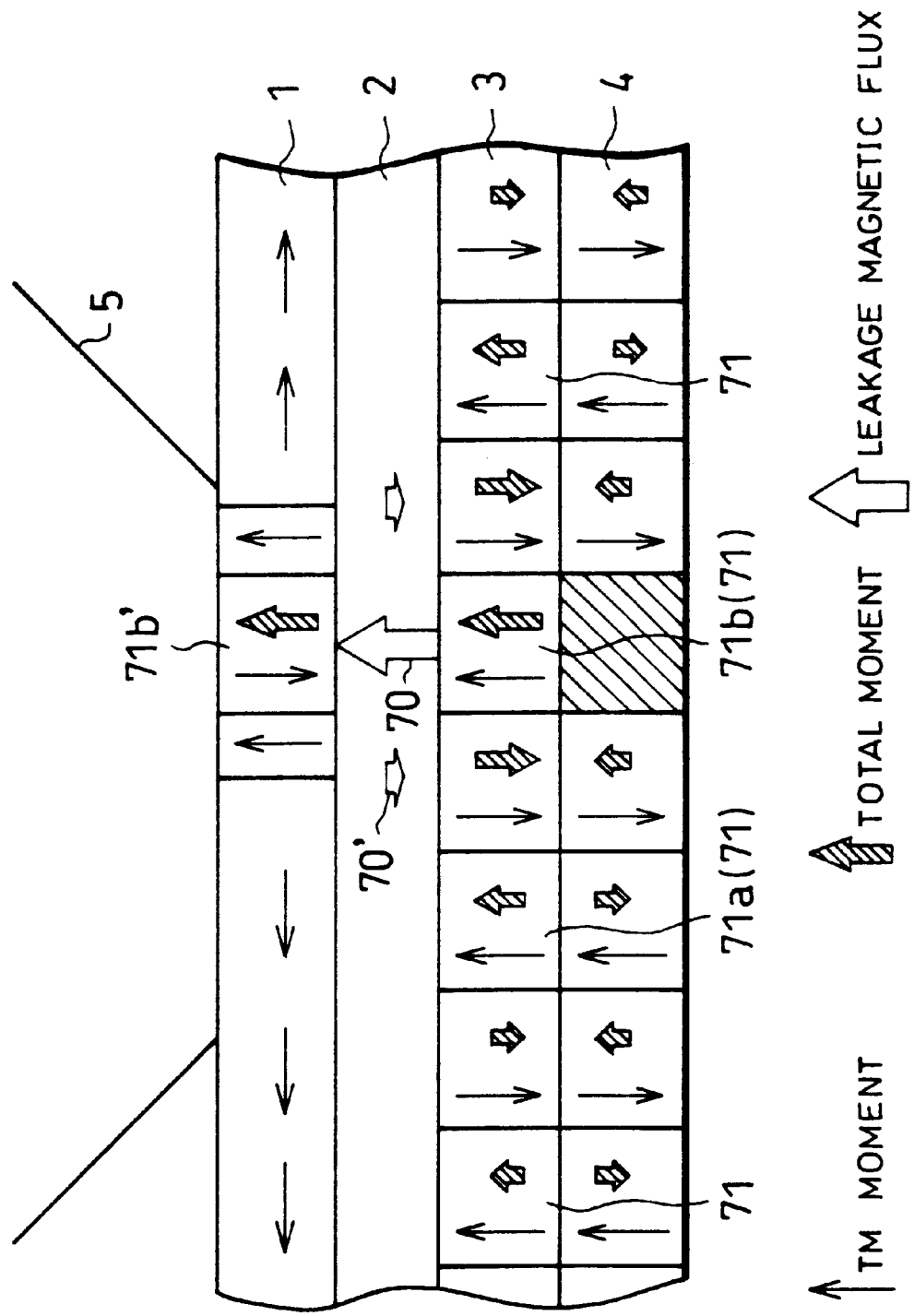
FIG. 2 is an explanatory drawing that shows magnetized states of the reproducing layer, a recording layer and a flux adjustment layer of the magneto-optical recording medium at the time of reproducing the magneto-optical recording medium shown in FIG. 1.

As illustrated in FIG. 2, in a magneto-optical recording medium in the present embodiment, a flux adjustment layer 4 is formed on the substrate in addition to the reproducing layer 1, the non-magnetic intermediate layer 2 and the recording layer 3. Here, with respect to arrows shown in FIG. 2, each of the thin arrows indicates the direction of a magnetic moment of a transition metal (TM), each of the thick arrows indicates the size and direction of a total moment, and each of void arrows indicates the size and direction of a leakage magnetic flux.

Figure 1:
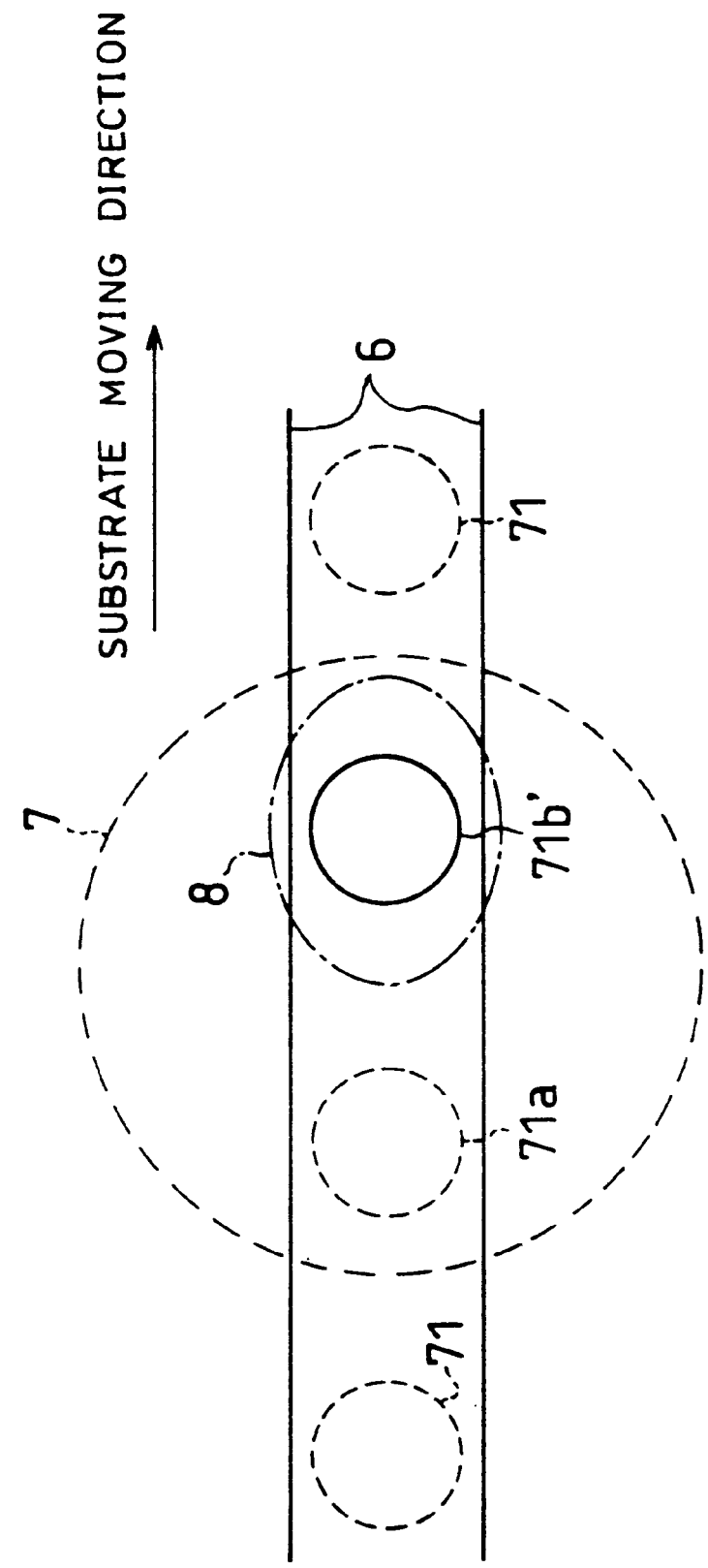
FIG. 1 is an explanatory drawing that shows a temperature distribution of a reproducing layer at the time of reproducing a magneto-optical recording medium related to one embodiment of the present invention.

As illustrated in FIG. 1, in the above-mentioned conventional magneto-optical recording medium, a light beam 5 is beam-condensed and directed onto the reproducing layer 1 so as to carry out recording and reproducing operations. In this case, recording magnetic domains 71 are recorded along a guide groove 6, which shows a reproducing state. Here, it is supposed that among the recording magnetic domains 71, a recording magnetic domain at which a magnetization to be reproduced has been recorded is referred to as a magnetic domain 71b and a recording magnetic domain adjacent to the recording magnetic domain 71b on the upstream side thereof (on the left in the Figure) is referred to as a recording magnetic domain 71a.

The above-mentioned reproducing layer 1 and non-magnetic intermediate layer 2 are the same as those on the conventional super-resolution magneto-optical recording medium explained by reference to FIG. 31 and FIG. 32. In other words, the reproducing layer 1 is made of a rare-earth transition metal alloy film having an RErich composition, which is adjusted so as to exhibit in-plane magnetization at room temperature and to exhibit perpendicular magnetization at a temperature not less than the critical temperature Tp1. When, upon reproduction, guide groove 6 is irradiated with a light beam 5 while the substrate is in motion, the reproducing layer 1 has a temperature rise not less than the critical temperature Tp1 at a downstream position (on the right of the Figure) of the light beam spot 7, thereby forming a rear aperture region 8 that exhibits perpendicular magnetization. Areas other than the rear aperture region 8 in the reproducing layer 1, which are maintained in an in-plane magnetization state, do not contribute to the reproducing operation.

In the rear aperture region 8, a leakage magnetic flux 70, released from the recording layer 3, and a magnetization from the reproducing layer 1 are magnetostatically coupled through the non-magnetic intermediate layer 2 so that the magnetization of the recording layer 3 is copied onto the reproducing layer 1. Thus, it is possible to carry out a magnetically-induced super-resolution reproducing operation.

Here, in order to realize the above-mentioned magnetic property, the reproducing layer 1 is designed to have such a composition (RErich composition) that with respect to the compensation composition at which the magnetic moment of a transition metal (TM) and the magnetic moment of a rare-earth metal (RE) balance each other, the RE magnetic moment becomes predominant at room temperature. Thus, in the reproducing layer 1, the direction of the TM magnetic moment and the direction of the total magnetic moment are set antiparallel to each other.

In the present embodiment, the above-mentioned recording layer 3 is exchange-coupled to the flux adjustment layer 4 made of a rare-earth transition metal alloy having a different Curie temperature so that the leakage magnetic flux 70, released from the recording layer 3 and the flux adjustment layer 4, is made to abruptly increase as the temperature rise.

Figure 3:
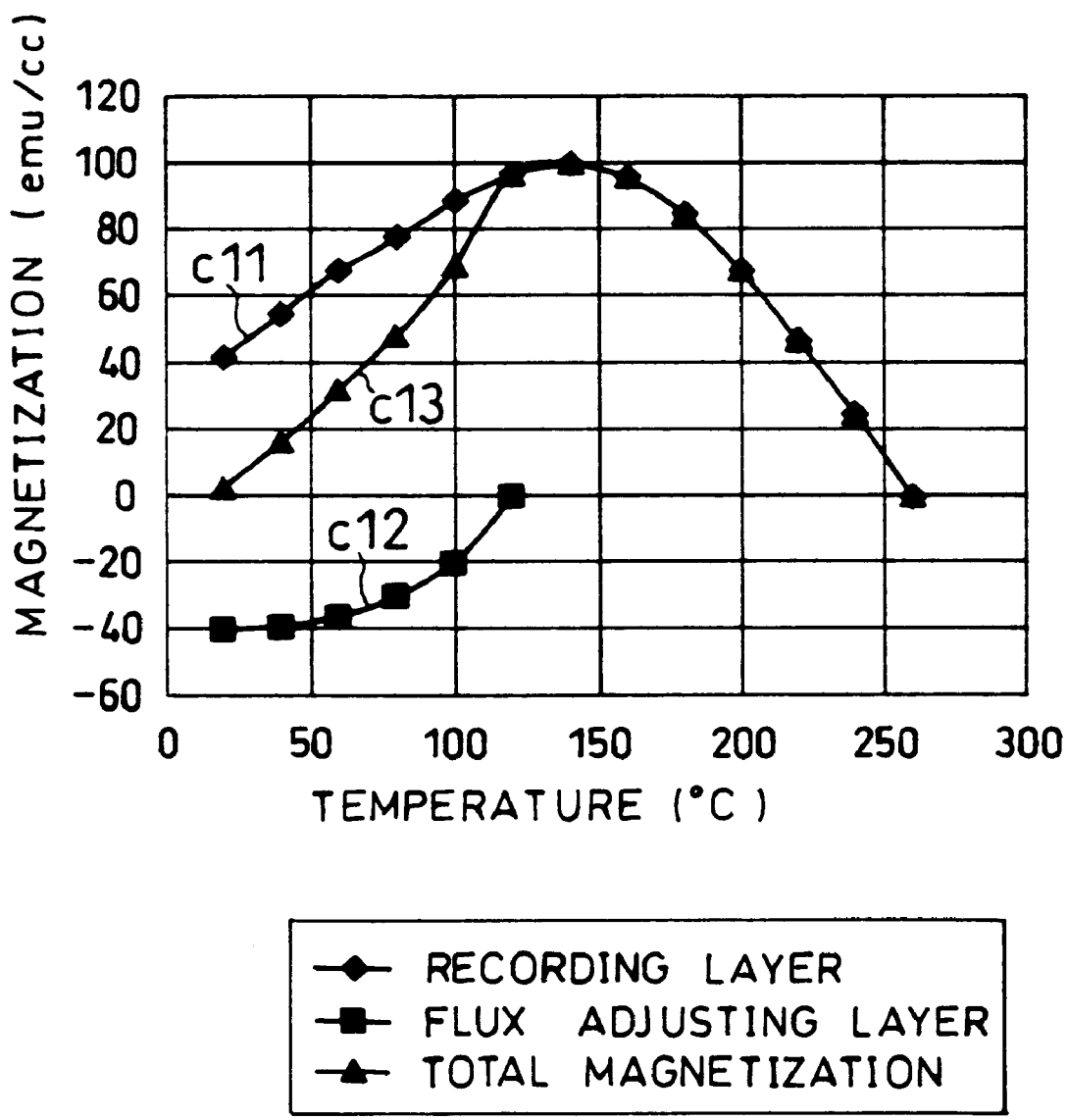
FIG. 3 is a graph that shows magnetic properties of the recording layer and the flux adjustment layer in the magneto-optical recording medium shown in FIG. 1.

Referring to FIGS. 2 and 3, the following description will discuss the recording layer 3 and the flux adjustment layer 4 in detail.

The above-mentioned recording layer 3 is made of a TbFeCo rare-earth transition metal alloy film having a TMrich composition with a coercive force of 1500 kA/m at room temperature.

As illustrated in FIG. 3, the total moment (magnetization) of the recording layer 3 (c11) has a magnitude of approximately 40 emu/cc at room temperature, and it gradually increases as the temperature rises, and becomes greatest at 140° C., and then becomes zero at the Curie temperature Tc3 (260° C.).

For this reason, as illustrated in FIG. 2, in the recording layer 3, the direction of the TM moment and the direction of the total magnetic moment are set parallel to each other.

In contrast, in the above-mentioned flux adjustment layer 4, since it is made of a TbFe rare-earth transition metal alloy of a RE rich composition having a polarity different from that of the recording layer 3, the direction of the TM moment and the direction of the total magnetic moment are set anti-parallel to each other. Moreover, since an exchange coupling force is exerted between the recording layer 3 and the flux adjustment layer 4, the direction of the TM moment of the flux adjustment layer 4 coincides with the direction of the TM moment of the recording layer 3. Therefore, the direction of the total moment of the flux adjustment layer 4 is set anti-parallel to the direction of the total moment of the recording layer 3.

For reasons as described above, in FIG. 3, the size of the total moment (c12) of the flux adjustment layer 4 having a polarity different from that of the recording layer 3 is indicated by a minus direction. In this case, the size of the total moment of the flux adjustment layer 4 is −40 emu/c at room temperature, and this gradually decreases as the temperature rises, and becomes zero at its Curie temperature Tc4 (120° C.).

Moreover, the leakage magnetic flux 70, released from the recording layer 3 and the flux adjustment layer 4, is obtained by adding the total moment of the recording layer 3 to the total moment of the flux adjustment layer 4. In FIG. 3, the change in the leakage magnetic flux 70 with temperature is indicated as the change (c13) in the total magnetization with temperature.

When the change (c13) in the total magnetization with temperature is compared with the change (cr) in the magnetization of the conventional recording layer 93 with temperature shown in FIG. 33 as well as with the change (c11) in the magnetization of the recording layer 3 with temperature, it is found that an abrupt increase in the magnetization is realized in relation to the temperature rise.

In this manner, by stacking the flux adjustment layer 4 on the recording layer 3, it is possible to realize an abrupt increase in the leakage magnetic flux 70 with a temperature rise. Therefore, upon irradiation with the light beam 5, a greater leakage magnetic flux 70 can be released from the recording layer 3 and the flux adjustment layer 4 only at the temperature-rise area. In other words, as illustrated in FIGS. 1 and 2, the irradiation with the light beam 5 allows the greater leakage magnetic flux 70 to be released only from the inside of the rear aperture region 8 that has been subjected to the temperature rise, thereby making it possible to provide a smaller rear aperture region 8 in a stable manner.

Consequently, since only the magnetization of the recording magnetic domain 71b is copied from the recording layer 3 to the reproducing layer 1, it is possible to stably reproduce only the copied magnetic domain 71b'. In other words, it is possible to provide a super-resolution reproducing operation with higher reproducing resolution.

Next, referring to FIGS. 4 through 6, an explanation will be given of a magneto-optical recording medium in which the thickness of the flux adjustment layer 4 is doubled.

Figure 5:
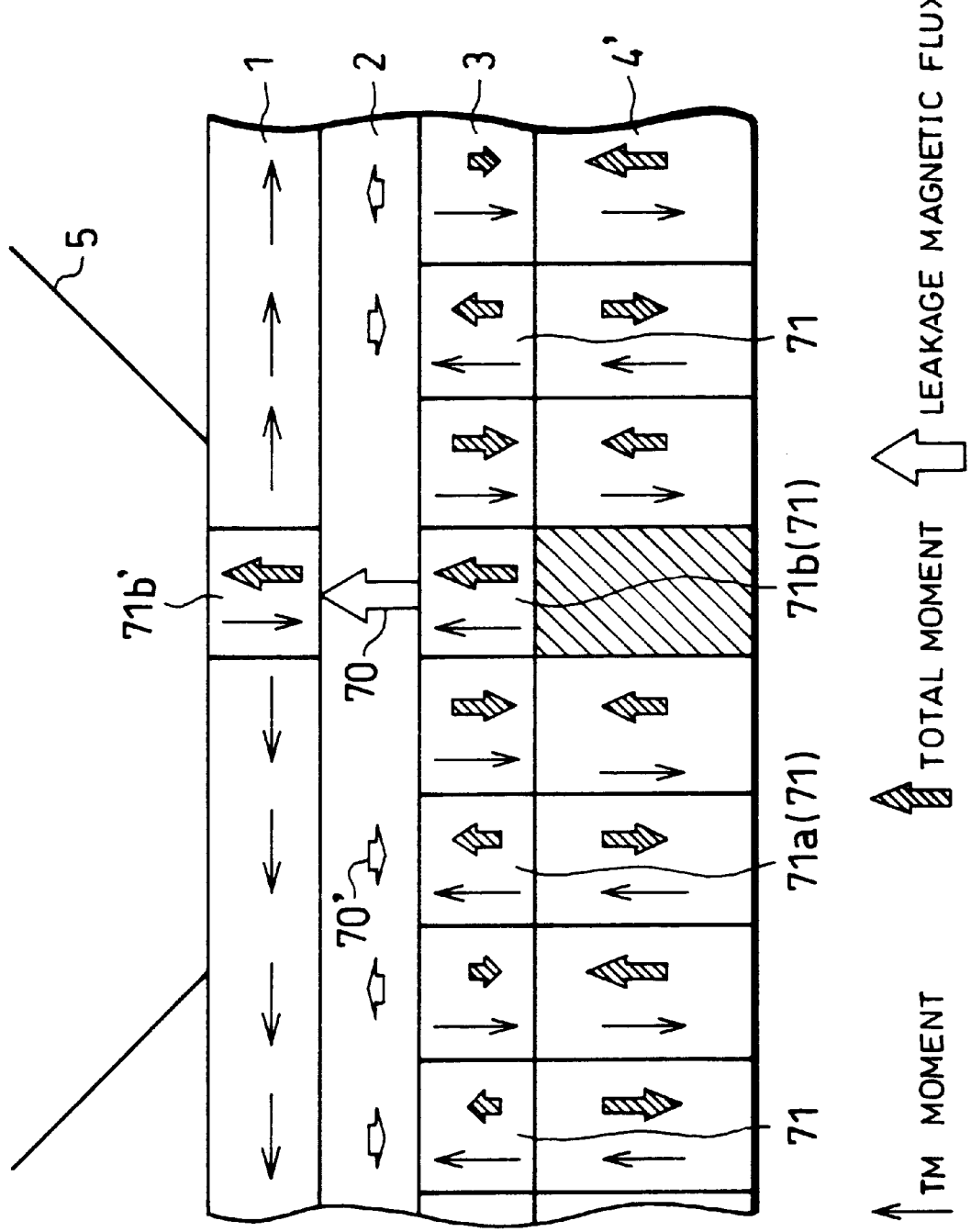
FIG. 5 is an explanatory drawing that shows magnetized states of the reproducing layer, a recording layer and a flux adjustment layer of the magneto-optical recording medium at the time of reproducing the magneto-optical recording medium shown in FIG. 4.

As illustrated in FIG. 5, the film-thickness of a flux adjustment layer 4' of the present embodiment is double the film-thickness of the flux adjustment layer 4 of the magneto-optical magneto-optical recording medium shown in FIG. 2.

Figure 6:
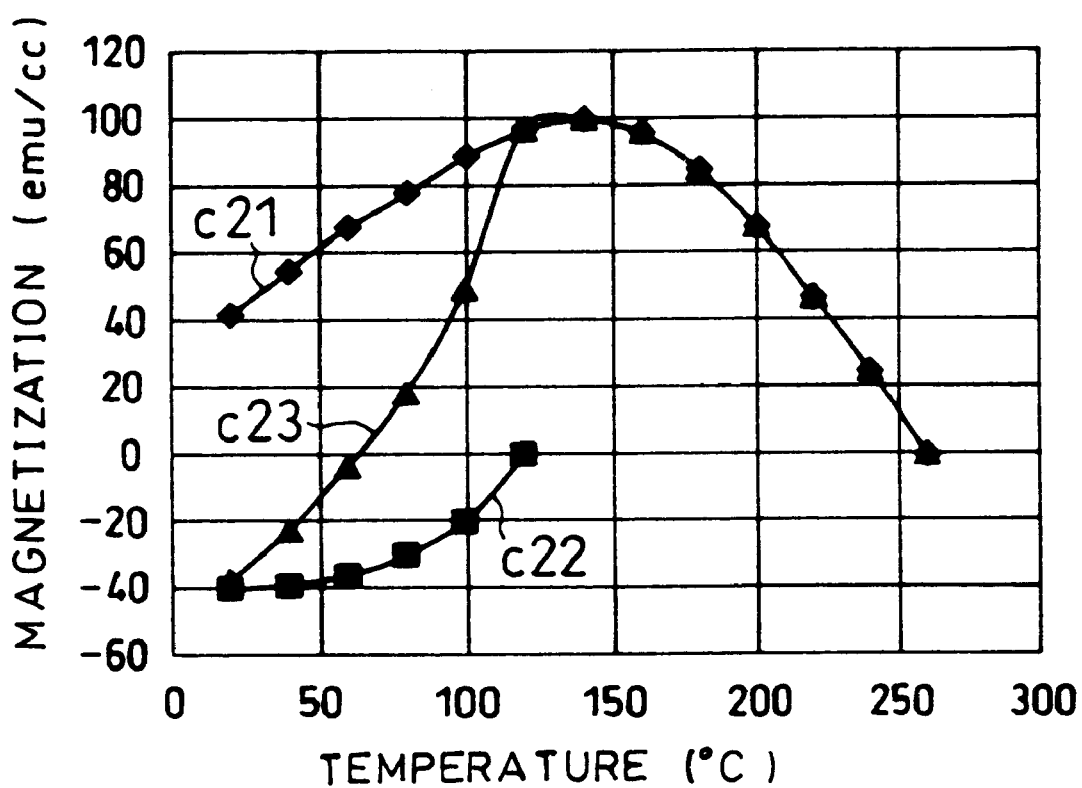
FIG. 6 is a graph that shows magnetic properties of the recording layer and the flux adjustment layer in the magneto-optical recording medium shown in FIG. 4.

In this case, as shown in FIG. 6, the total moment (c21) of the recording layer 3 and the total moment (c22) of the flux adjustment layer 4' are respectively the same as the total moment (c11) of the recording layer 3 and the total moment (c12) of the flux adjustment layer 4 shown in FIG. 3. However, since the film-thickness of the flux adjustment layer 4' is double the film-thickness of the recording layer 3, the total magnetization is obtained by adding the total moment of the recording layer 3 to double the total moment of the flux adjustment layer 4' (c23=c21+c22×2).

In other words, the total magnetization of the recording layer 3 and the flux adjustment layer 4' is −40 emu/cc at room temperature, and this increases to the greatest value at 140° C. as the temperature rises, and becomes zero at the Curie temperature Tc3 (260° C.) of the recording layer 3.

Figure 4:
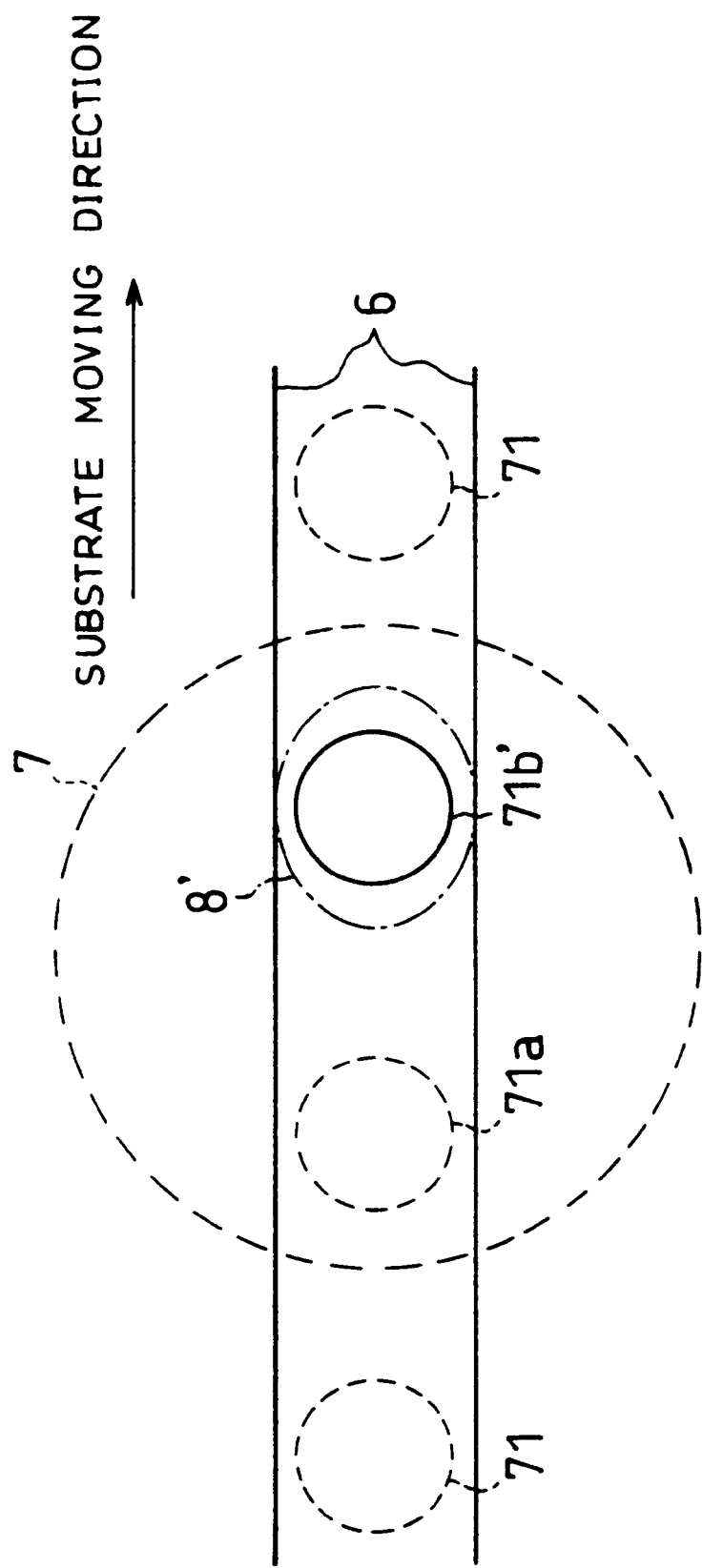
FIG. 4 is an explanatory drawing that shows a temperature distribution of a reproducing layer at the time of reproducing a magneto-optical recording medium related to another embodiment of the present invention.

With this arrangement, the total magnetization is allowed to increase more abruptly as the temperature rises so that since the leakage magnetic flux 70 also increases more abruptly, a smaller rear aperture region 8' is formed as shown in FIG. 4.

Consequently, since only the magnetization of the recording magnetic domain 71b is copied from the recording layer 3 to the reproducing layer 1, it is possible to stably reproduce only the copied magnetic domain 71b'.

Here, at an area that has not been subjected to a temperature rise, a total magnetization is formed by the recording layer 3 and the flux adjustment layer 4', with the result that a leakage magnetic flux 70' is exerted. However, at the area that has not been subjected to a temperature rise, the total magnetization formed by the recording layer 3 and the flux adjustment layer 4' is so small and the in-plane magnetization state in the reproducing layer 1 is maintained so stable that no magnetization is copied from the recording layer 3 to the reproducing layer 1.

As described above, by forming the recording layer 3 and the flux adjustment layer 4' with its film-thickness adjusted, the total magnetization is allowed to increase more abruptly as the temperature rises. Since the leakage magnetic flux 70 also increases more abruptly, a smaller rear aperture region 8' is formed in a stable manner.

Consequently, since only the magnetization of the recording magnetic domain 71b is copied from the recording layer 3 to the reproducing layer 1, it is possible to stably reproduce only the copied magnetic domain 71b'. In other words, it is possible to provide a super-resolution reproducing operation with higher reproducing resolution.

Next, referring to FIGS. 7 and 8, an explanation will be given of the construction of the magneto-optical recording medium in accordance with the present embodiment. Here, the following description will deal with a case in which the magneto-optical recording medium of the present embodiment is applied to a magneto-optical disk.

Figure 7:
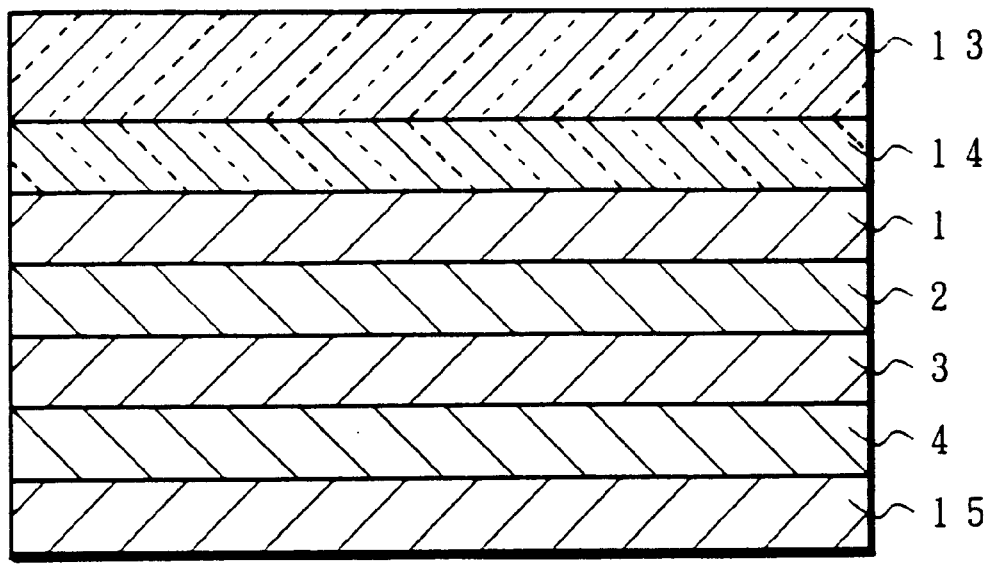
FIG. 7 is a cross-sectional view that schematically shows the construction of a magneto-optical disk to which the magneto-optical recording medium of FIG. 1 is applied.

As illustrated in FIG. 7, in the magneto-optical disk using the magneto-optical recording medium of the present embodiment, a transparent dielectric protective layer 14, a reproducing layer 1, a non-magnetic intermediate layer 2, a recording layer 3, a flux adjustment layer 4 and a protective layer 15 are successively stacked on a substrate 13.

The above-mentioned magneto-optical disk uses a Curie temperature recording system as its recording system. More specifically, a light beam 5, directed from a semiconductor laser, is focused onto the reproducing layer 1 through the substrate 13 so as to allow the recording layer 3 to have a temperature rise not less than its Curie temperature Tc3, while an external magnetic field is applied thereto; thus, the magnetization direction of the recording layer 3 is controlled so as to carry out a recording operation.

In contrast, with respect to a reproducing operation of the above-mentioned magneto-optical disk, the power of the light beam 5 is set weaker than that at the time of recording, and an information reproducing operation is carried out by utilizing a magneto-optical effect known as the polar Kerr effect. Here, the polar Kerr effect refers to a phenomenon in which the direction of the rotation of plane of polarization of the reflected light beam is reversed depending on the direction of magnetization perpendicular to the plane of incidence of a light beam.

The above-mentioned substrate 13 is made of a transparent base material such as, for example, polycarbonate, and formed into a disk shape. Further, a guide groove 6, etc. are formed on the film-formation surface of the substrate 13.

The above-mentioned transparent dielectric protective layer 14 is preferably made of a transparent dielectric material such as AlN, SiN, AlSiN and $Ta_2O_3$, and its film-thickness is set so as to realize a preferable interference effect with respect to the incident light beam 5 and to provide an increased polar Kerr rotation angle to the medium.

Therefore, supposing that the wavelength of the light beam 5 is λ, and that the refraction factor of the transparent dielectric protective layer 14 is n, the film-thickness of the transparent dielectric protective layer 14 is set at approximately λ/(4 n). For example, supposing that the wavelength of the light beam 5 is 680 nm, the film-thickness of the transparent dielectric protective layer 14 is preferably set in the range of 40 to 100 nm.

Moreover, it is possible for the transparent dielectric protective layer 14 to improve the super-resolution reproducing characteristic by utilizing its optical interference effect. Moreover, together with the protective layer 15, the transparent dielectric protective layer 14 shields from air the respective magnetic films, such as the reproducing layer 1, the in-plane magnetization layer 9, the reproducing support layer 10, the recording layer 3 and the flux adjustment layer 4, so as to protect them from degradation due to oxidation, etc.

The above-mentioned reproducing layer 1 is made of an alloy thin-film having a rare-earth transition metal alloy as its main component, and adjusted in its composition so that it exhibits in-plane magnetization at room temperature and comes to exhibit perpendicular magnetization as the temperature rises. The film-thickness of the reproducing layer 1 is set in the range of 20 nm to 80 nm. Here, the film-thickness of the reproducing layer 1 less than 20 nm makes the transmitted luminous energy too large, thereby failing to obtain a good mask effect. Moreover, the film-thickness of the reproducing layer 1 exceeding 80 nm causes degradation in the recording sensitivity due to an increase in the film thickness.

Moreover, the critical temperature Tp1 of the reproducing layer 1 at which a transition occurs from in-plane magnetization to perpendicular magnetization is preferably set from not less than 60° C. to not more than 250° C. In the case of the critical temperature Tp1 less than 60° C., the reproducing layer 1 comes to exhibit in-plane magnetization at a comparatively low temperature; this weakens the front mask in the reproducing layer 1, failing to provide a good reproducing resolution. In the case of the critical temperature Tp1 exceeding 250° C., since it is required to subject the reproducing layer 1 to a temperature rise exceeding 250° C. in order to allow it to exhibit perpendicular magnetization; therefore, the recording layer 3 has to have a temperature rise to the vicinity of the Curie temperature Tc3, thereby narrowing the reproducing power margin to a great degree.

The above-mentioned non-magnetic intermediate layer 2 is installed so that an exchange coupling is not exerted between the reproducing layer 1 and the recording layer 3. With respect to the material of the non-magnetic intermediate layer 2, non-magnetic metals such as Al, Si, Ti and Ta, non-magnetic metal alloys such as AlSi, AlTa and SiTa, and non-magnetic dielectrics such as AlN, SiN, AlSiN and $Ta_2O_3$ may be used.

The film-thickness of the non-magnetic intermediate layer 2 is set in the range of 0.5 nm to 60 nm. The film-thickness of the non-magnetic intermediate layer 2 less than 0.5 nm makes it difficult to completely intercept the exchange coupling between the reproducing layer 1 and the recording layer 3, thereby failing to maintain a stable magnetostatically coupled state between them. Moreover, the film-thickness of the non-magnetic intermediate layer 2 exceeding 60 nm makes the reproducing layer 1 and the recording layer 3 apart from each other, thereby failing to maintain a stable magnetostatically coupled state between them.

As described above, the non-magnetic intermediate layer 2 completely intercept the exchange coupling between the reproducing layer 1 and the recording layer 3 plus the flux adjustment layer 4 so that it is possible to realize an excellent magnetostatic coupling between the reproducing layer 1 and the recording layer 3 plus the flux adjustment layer 4; thus, it becomes possible to provide stable super-resolution reproducing characteristics.

The above-mentioned recording layer 3 is a perpendicular magnetization film made of a rare-earth transition metal alloy. The film-thickness of the recording layer 3 is set in the range of 20 nm to 80 nm. In this case, the film-thickness of the recording layer 3 less than 20 nm reduces a leakage magnetic flux released from the recording layer 3, with the result that a stable magnetostatically coupled state is not available between the reproducing layer 1 and the recording layer 3 plus the flux adjustment layer 4. Further, the film-thickness of the recording layer 3 exceeding 80 nm causes degradation in the recording sensitivity due to an increase in the film-thickness.

The above-mentioned flux adjustment layer 4 is a perpendicular magnetization film made of a rare-earth transition metal alloy. The film-thickness of the flux adjustment layer 4 is set in the range of 20 nm to 80 nm. In this case, the film-thickness of the flux adjustment layer 4 less than 20 nm reduces a leakage magnetic flux released from the flux adjustment layer 4, with the result that a stable magnetostatically coupled state is not available between the reproducing layer 1 and the recording layer 3 plus the flux adjustment layer 4. Further, the film-thickness of the flux adjustment layer 4 exceeding 80 nm causes degradation in the recording sensitivity due to an increase in the film-thickness.

Moreover, with respect to magnetic properties of the recording layer 3 and the flux adjustment layer 4, any of those may be used as long as at least their polarities and Curie temperatures are different from each other. For example, as explained referring to FIGS. 2 and 5, in the case when TbFeCo of a TMrich composition with a Curie temperature Tc3 is used as the recording layer 3, TbFe of an RErich composition with a Curie temperature Tc4 may be used as the flux adjustment layer 4.

Here, it is necessary to set the Curie temperature Tc3 of the recording layer 3 higher than the Curie temperature Tc4 of the flux adjustment layer 4. More specifically, the Curie temperature Tc3 of the recording layer 3 is preferably set from not less than 200° C. to not more than 300° C., and the Curie temperature Tc4 of the flux adjustment layer 4 is preferably set from not less than 100° C. to not more than 200° C. Here, in the case when the Curie temperature Tc3 of the recording layer 3 is lower than 200° C., since the critical temperature Tp1 at which the reproducing layer 1 comes to exhibit perpendicular magnetization and the Curie temperature Tc3 of the recording layer 3 approach each other, the reproducing power margin is extremely narrowed. Moreover, in the case when the Curie temperature Tc3 of the recording layer 3 is higher than 300° C., since it is necessary to raise the temperature of the recording layer 3 to not less than 300° C. so as to carry out a recording process, heat deterioration occurs in the magnetic thin-films such as the reproducing layer 1, the recording layer 3 and the flux adjustment layer 4 due to a temperature rise.

Moreover, the Curie temperature Tc4 of the flux adjustment layer 4 is arranged so that a greater leakage magnetic flux 70 is released only from a temperature-rise area. More specifically, in the case when the Curie temperature Tc3 of the recording layer 3 is set from not less than 200° C. to not more than 300° C., it is preferable to set the Curie temperature Tc4 of the flux adjustment layer 4 approximately in a range from not less than 100° C. to not more than 200° C.

Here, with respect to the combination of the recording layer 3 and the flux adjustment layer 4, for example, in the case of the application of TbFeCo of an RErich composition as the recording layer 3, TbFe of a TMrich composition may be used as the flux adjustment layer 4.

Moreover, as explained referring to FIGS. 2 and 5, among various combinations of the recording layer 3 and the flux adjustment layer 4, it is preferable to control the film-thicknesses of the two layers so as to release an optimal leakage magnetic flux 70.

Figure 8:
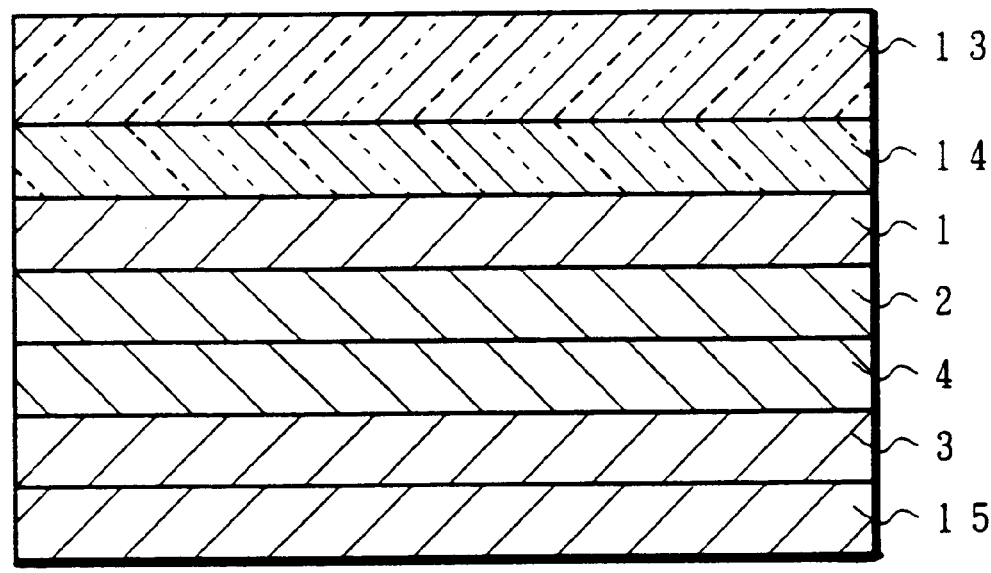
FIG. 8 is a cross-sectional view that schematically shows the construction of another magneto-optical disk to which the magneto-optical recording medium of FIG. 1 is applied.

Additionally, the above explanation was given only on the construction shown in FIG. 7; however, the present invention may be applied to any construction as long as the temperature dependence of the leakage magnetic flux 70 is optimized, and as shown in FIG. 8, the present invention may also be applied to a construction in which the order of formation of the recording layer 3 and the flux adjustment layer 4 is reversed, with sufficient effects, The protective layer 15 is formed so as to protect the rare-earth transition metal alloy used in the reproducing layer 1, the recording layer 3 and the flux adjustment layer 4 from oxidation. With respect to materials for the protective layer 15, transparent dielectrics, such as AlN, SiN, AlSiN, and $Ta_2O_3$, and non-magnetic metal alloys, such as Al, Ti, Ta and Ni, may be used. The film-thickness of the protective layer 15 is set in the range of 5 nm to 60 nm.

Furthermore, an ultraviolet-setting resin layer, a thermosetting resin layer, a lubricating layer, etc. may be formed on the protective layer 15, if necessary.

Next, an explanation will be given on specific examples of the formation method and recording and reproducing characteristics of a magneto-optical disk (FIG. 7) having the above-mentioned construction.

(1) Formation method of the magneto-optical disk

The formation method of the above-mentioned magneto-optical disk is described below.

First, a substrate 13 made of polycarbonate, which has pre-grooves and pre-pits and is formed into a disk shape, is arranged in a sputter equipment in which an Al target, a GdFeCo alloy target, a TbFeCo alloy target and a TbFe alloy target are respectively provided. After the sputter equipment has been evacuated to $1 \times 10^{-6}$ Torr, a mixed gas of argon and nitrogen is introduced and electric power is supplied to the Al target under a gas pressure of $4 \times 10^{-3}$ Torr; thus, a transparent dielectric protective layer 14 made of AlN is formed on the substrate 13, with a film-thickness of 80 nm.

Second, after the sputter equipment has been evacuated to $1 \times 10^{-6}$ Torr again, argon gas is introduced and electric power is supplied to GdFeCo alloy target under a gas pressure of $4 \times 10^{-3}$ Torr; thus, a reproducing layer 1 made of $Gd_{0.31}(Fe_{0.80}Co_{0.20})_{0.69}$ is formed on the above-mentioned transparent dielectric protective layer 14 with a film thickness of 40 nm. Here, the reproducing layer 1 thus formed exhibits in-plane magnetization at room temperature, comes to exhibit perpendicular magnetization at 150° C., has its compensation temperature at 300° C., and also has its Curie temperature Tc1 at 300° C.

Third, a mixed gas of argon and nitrogen is introduced and electric power is supplied to Al target under a gas pressure of $4\times10^{-3}$ Torr; thus, a non-magnetic intermediate layer 2 made of AlN is formed on the above-mentioned reproducing layer 1, with a film-thickness of 3 nm.

Fourth, after the sputter equipment has been evacuated to $1\times10^{-6}$ Torr, argon gas is introduced and electric power is supplied to TbFeCo alloy target under a gas pressure of $4\times10^{-3}$ Torr; thus, a recording layer 3 made of $Tb_{0.23}(Fe_{0.88}Co_{0.12})_{0.77}$ is formed on the above non-magnetic intermediate layer 2, with a film-thickness of 40 nm. Here, the recording layer 3 thus formed has its compensation temperature at $-50°$ C., serves as a perpendicular magnetization film of a TMrich composition at temperatures higher than room temperature, has a coercive force of 1500 kA/m at room temperature, and also has its Curie temperature Tc3 at 260° C.

Fifth, electric power is supplied to the TbFe alloy target under a gas pressure of $4\times10^{-3}$ Torr; thus, a flux adjustment layer 4 made of $Tb_{0.30}Fe_{0.70}$ is formed on the above-mentioned recording layer 3, with a film-thickness of 40 nm. Here, the flux adjustment layer 4 thus formed serves as a perpendicular magnetization film of an RErich composition at temperatures higher than room temperature, has a coercive force of 500 kA/m at room temperature, and also has its Curie temperature Tc4 at 120° C.

Sixth, a mixed gas of argon and nitrogen is introduced and electric power is supplied to the Al target under a gas pressure of $4\times10^{-3}$ Torr; thus, a protective layer 15 made of AlN is formed on the above-mentioned flux adjustment layer 4, with a film-thickness of 20 nm.

(2) Recording and reproducing characteristics

Figure 9:
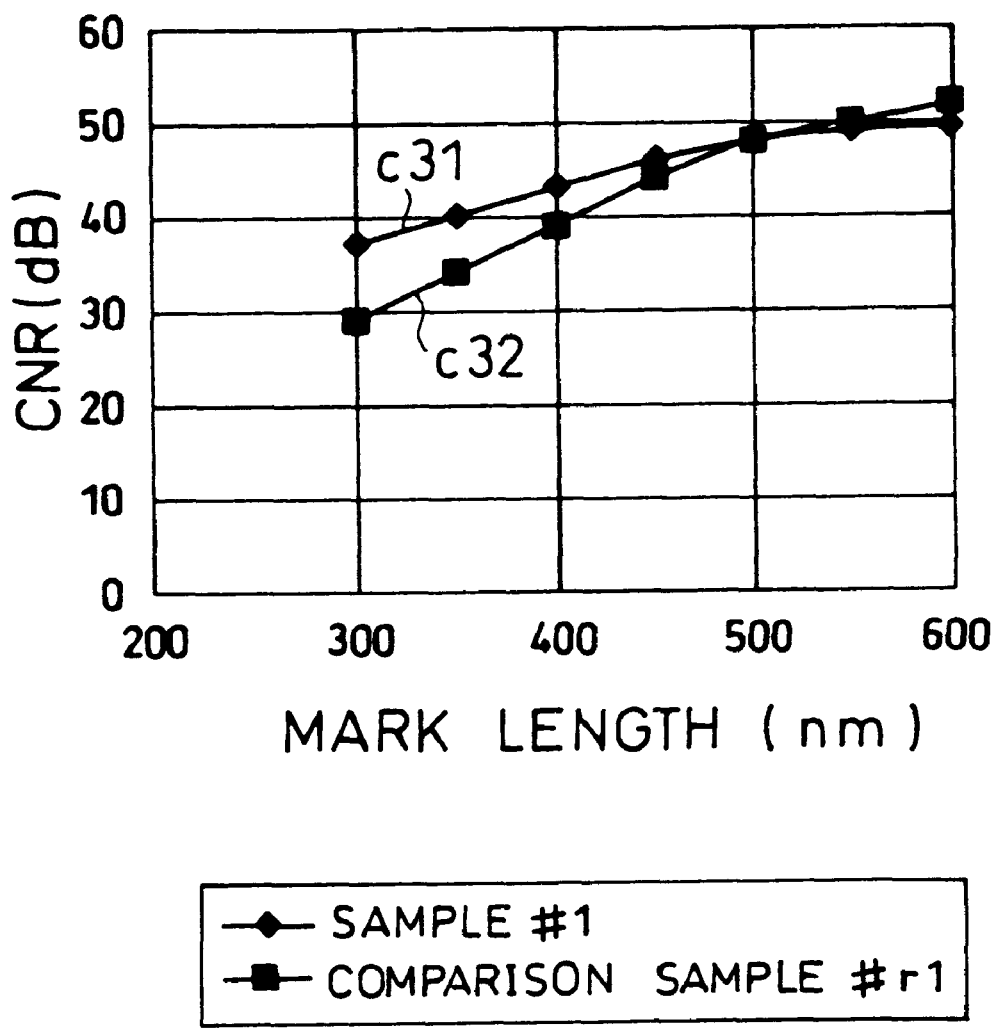
FIG. 9 is a graph that shows one example of mark-length dependence of the carrier-to-noise ratio of a magneto-optical disk to which the magneto-optical recording medium of FIG. 1 is applied.
Figure 10:
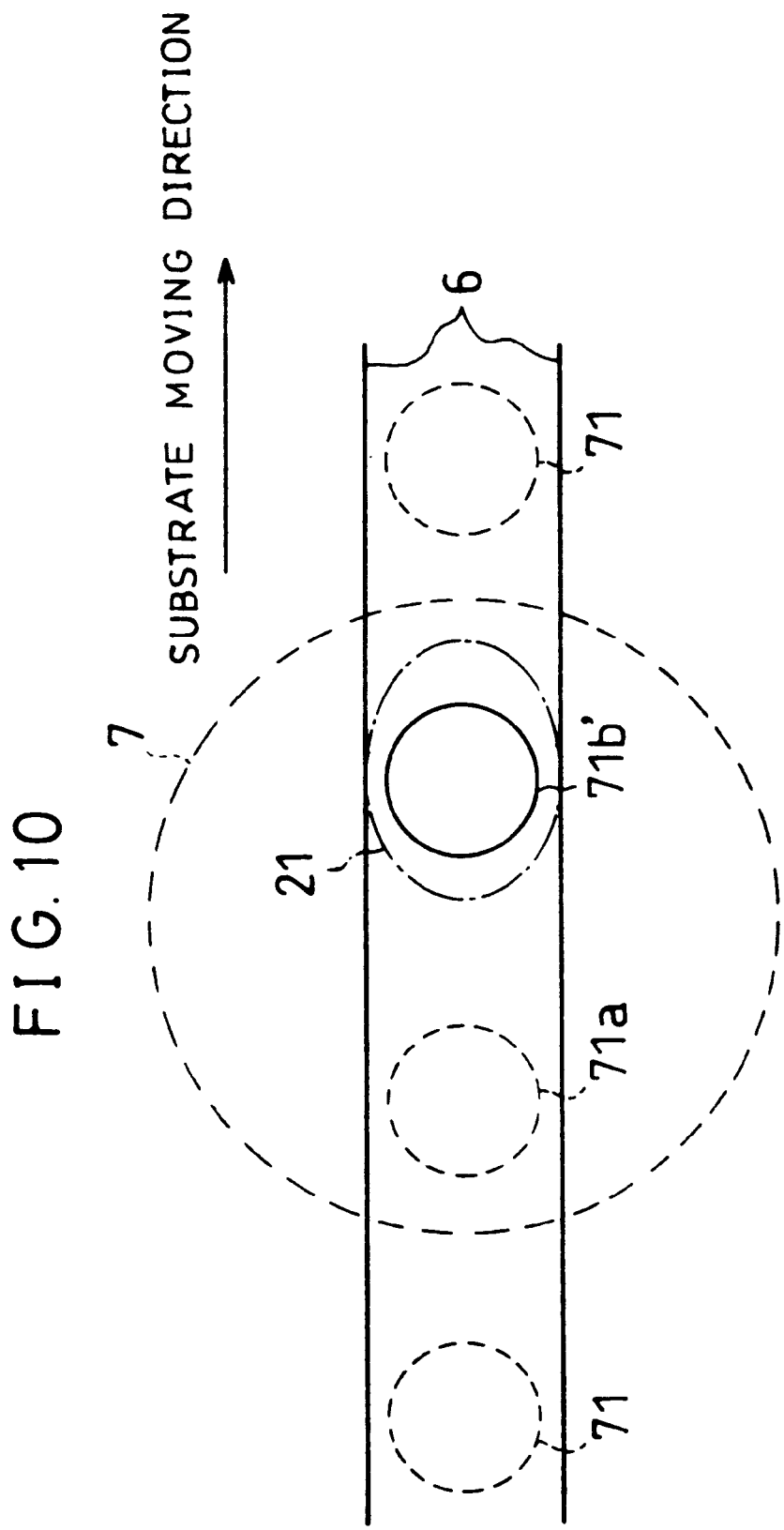
FIG. 10 is an explanatory drawing that shows a temperature distribution of a reproducing layer at the time of reproducing a magneto-optical recording medium related to still another embodiment of the present invention.

The recording and reproducing characteristics of the above-mentioned magneto-optical disk will be explained as follows:

FIG. 9 is a graph that shows a mark-length dependence of CNR (signal-to-noise ratio) obtained by carrying out measurements on the above-mentioned magneto-optical disk (referred to as sample #1) by using an optical pickup and a semiconductor laser having a wavelength of 680 nm (c31). Here, these measurements were carried out by adjusting the line speed to 5 m/s and the reproducing power to 2.5 mW. Moreover, the mark-length dependence of CNR shown here represents a signal-to-noise ratio of a reproducing signal obtained when recording magnetic domains, each having a length corresponding to a mark length, are successively formed with a pitch twice as long as the mark-length by using a magnetic-field modulation recording system.

Moreover, for comparative purposes, another graph is also shown in which a mark-length dependence of CNR is obtained by carrying out measurements on a magneto-optical disk (referred to as comparative sample #r1) having no flux adjustment layer 4 in the above-mentioned construction (c32). In this case, since no flux adjustment layer 4 exists, the reproducing power of comparative sample #r1 was set at 2.3 mW, which was lower than the reproducing power of sample #1.

In FIG. 9, comparison made between sample #1 (c31) and comparative sample #r1 (c32) shows that the CNR of sample #1 is higher than the CNR of comparative sample #r1 in a range with short mark-lengths not more than a mark-length 500 nm. This shows that in sample #1, since the flux adjustment layer 4 is installed, a leakage magnetic flux 70, released from the recording layer 3 and the flux adjustment layer 4, is allowed to increase more abruptly as the temperature rises; therefore, it is confirmed that narrower rear aperture regions 8 are formed stably and that the reproducing resolution has been improved. Thus, it becomes possible to improve quality in the reproducing signal in the range with short mark-lengths, and consequently to reproduce information recording with a higher density.

Additionally, in a range with longer mark-lengths not less than a mark-length of 500 nm, the CNR of comparative sample #r1 is slightly higher than the CNR of sample #1. This is because, in sample #1, the reproducing signal intensity becomes smaller in the longer mark-lengths because the rear aperture regions 8 become smaller than those in the flux adjustment layer 4. However, even with respect to the mark-lengths in this range, a CNR of approximately 50 dB was obtained so that no problem is raised in carrying out a signal reproducing operation on the magneto-optical disk of sample #1. Moreover, in order to reproduce magnetization recorded with a high density, it is imperative to provide superior reproducing-signal quality in the range with shorter mark-lengths.

As described above, the magneto-optical recording medium of the present embodiment is constituted by: a recording layer 3 made of a perpendicular magnetization film; a reproducing layer 1 made of a magnetic film which exhibits in-plane magnetization at room temperature and comes to exhibit perpendicular magnetization at a temperature not less than a critical temperature Tp1 in such a manner that a portion having a perpendicular magnetization state (magnetic domain 71b') is magnetically coupled to the recording layer 3 so as to copy the magnetization of a recording magnetic domain 71b while a portion having an in-plane magnetization state is not allowed to copy any recording magnetic domain in the recording layer 3; and a flux adjustment layer 4 made of a perpendicular magnetization film which is stacked adjacent to the recording layer 3, has a magnetic polarity different from that of the recording layer 3, and also has a Curie temperature Tc4 lower than the Curie temperature Tc3 of the recording layer 3.

With the formation of the flux adjustment layer 4 adjacent to the recording layer 3, a leakage magnetic flux 70, released from the recording layer 3 and the flux adjustment layer 4, is made to rapidly grow with a temperature rise. In other words, since the recording layer 3 and the flux adjustment layer 4, which are stacked adjacent to each other, have mutually different magnetic polarities, their magnetizations are countervailed at room temperature so that the leakage magnetic flux 70 is weakened. Upon reproducing a recording magnetic domain 71b of the recording layer 3, an area including the recording magnetic domain 71b related to the reproducing process is heated. At this time, since the Curie temperature of the flux adjustment layer 4 is lower than that of the recording layer 3, the magnetization of an area of the flux adjustment layer 4 corresponding to the recording magnetic domain to be reproduced is allowed to decrease or disappear. As a result, a leakage magnetic flux 70, which is strengthened by a corresponding decrement of the magnetization of the flux adjustment layer 4, appears and is copied onto the reproducing layer 1.

Thus, the greater leakage magnetic flux 70 is generated from the recording layer 3 and the flux adjustment layer 4 only at areas having a temperature rise by irradiation with a light beam 5. In other words, since, upon irradiation with the light beam 5, a greater leakage magnetic flux 70 is generated only from the inside of a rear aperture region 8 having a greater temperature rise, it is possible to form a smaller rear aperture region 8 in a stable manner.

Therefore, only the magnetization of the recording magnetic domain 71b to be reproduced is copied from the recording layer 3 to the reproducing layer 1 so that it is possible to reproduce only the copied magnetic domain 71b' stably. Consequently, it becomes possible to provide a super-resolution reproducing operation with a high reproducing resolution.

Moreover, the magneto-optical recording medium of the present embodiment has either a construction in which, on the substrate 13, the transparent dielectric protective layer 14, the reproducing layer 1, the non-magnetic intermediate layer 2, the recording layer 3, the flux adjustment layer 4, and the protective layer 15 are stacked in this order, or a construction in which, on the substrate 13, the transparent dielectric protective layer 14, the reproducing layer 1, the non-magnetic intermediate layer 2, the flux adjustment layer 4, the recording layer 3 and the protective layer 15 are stacked in this order.

With the above-mentioned constructions, since the reproducing layer 1 is installed on the light-incidence side of the light beam 5, it is possible to obtain a magnetic super-resolution reproducing operation with the above-mentioned high reproducing resolution, and since the non-magnetic intermediate layer 2 completely intercept an exchange coupling exerted between the reproducing layer 1 and the recording layer 3 plus the flux adjustment layer 4, it is possible to realize a superior magnetostatic coupling between the reproducing layer 1 and the recording layer 3 plus the flux adjustment layer 4.

Embodiment 2

Referring to FIGS. 10 through 13, the following description will discuss another embodiment of the present invention. Here, for convenience of explanation, those members having the same construction as those explained in Embodiment 1 are indicated by the same reference numerals and the description thereof is omitted.

Figure 11:
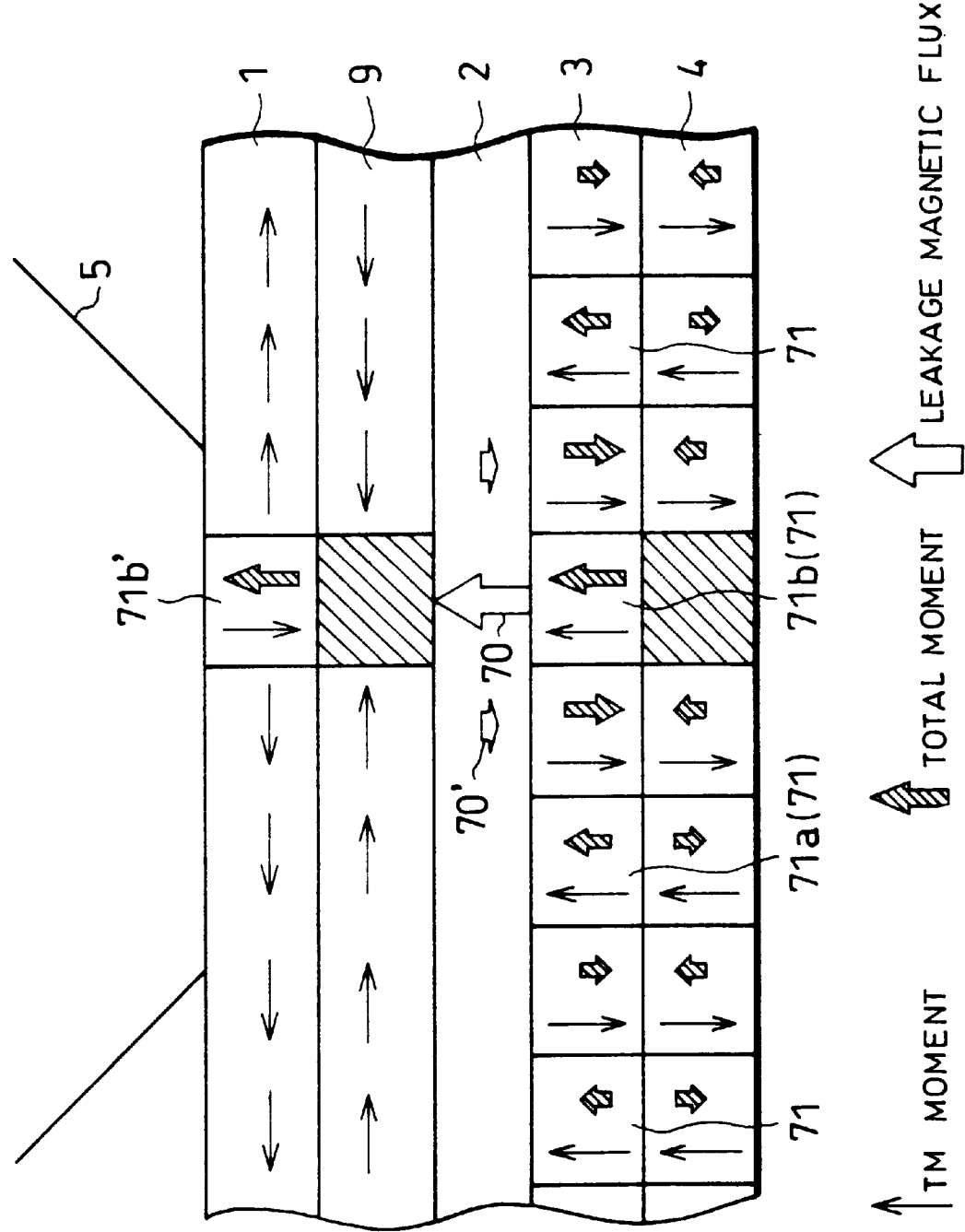
FIG. 11 is an explanatory drawing that shows magnetized states of the reproducing layer, a recording layer and a flux adjustment layer of the magneto-optical recording medium at the time of reproducing the magneto-optical recording medium shown in FIG. 10.

As illustrated in FIG. 11, the magneto-optical recording medium of the present embodiment has a construction in which an in-plane magnetization layer 9 having a Curie temperature Tc9 in the vicinity of the critical temperature Tp1 of the reproducing layer 1 at which it comes to exhibit perpendicular magnetization from in-plane magnetization is stacked in contact with the reproducing layer 1 of the magneto-optical recording medium (see FIG. 2) of Embodiment 1. Here, with respect to arrows shown in FIG. 11, each of the thin arrows indicates the direction of a magnetic moment of a transition metal (TM), each of the thick arrows indicates the size and direction of a total moment, and each of void arrows indicates the size and direction of a leakage magnetic flux.

Figure 12:
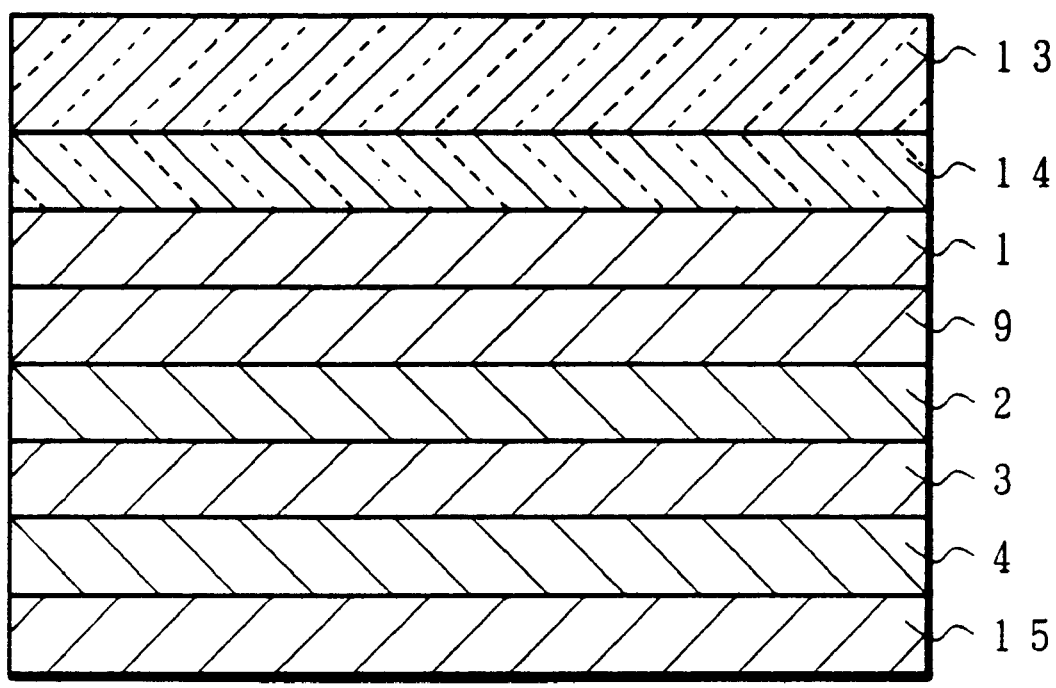
FIG. 12 is a cross-sectional view that schematically shows the construction of a magneto-optical disk to which the magneto-optical recording medium of FIG. 10 is applied.

Referring to FIG. 12, an explanation will be given of the construction of the magneto-optical recording medium in accordance with the present embodiment. Here, the explanation exemplifies a case in which the magneto-optical recording medium is applied to a magneto-optical disk.

The magneto-optical disk to which the magneto-optical recording medium of the present embodiment is applied has a construction in which a transparent dielectric protective layer 14, a reproducing layer 1, an in-plane magnetization layer 9, a non-magnetic intermediate layer 2, a recording layer 3, a flux adjustment layer 4 and a protective layer 15 are successively stacked on a substrate 13.

Here, with respect to the above-mentioned substrate 13, the transparent dielectric protective layer 14, the reproducing layer 1, the non-magnetic intermediate layer 2, the recording layer 3, the flux adjustment layer 4 and the protective layer 15, the same materials as described in Embodiment 1 may be used in the same manner. Moreover, as explained in Embodiment 1, the order of layer formation of the recording layer 3 and the flux adjustment layer 4 may be reversed to that of FIG. 12.

With respect to its magnetic property, the in-plane magnetization layer 9 needs to always exhibit in-plane magnetization from room temperature to its Curie temperature Tc9. Further, the Curie temperature Tc9 of the in-plane magnetization layer 9 is preferably set in the range of not less than 60° C. to not more than 200° C., and the Curie temperature Tc9 of the in-plane magnetization layer 9 is also preferably set at virtually the same temperature as the critical temperature Tp1 at which the reproducing layer 1 changes to exhibit perpendicular magnetization from in-plane magnetization.

With this construction, the application of the flux adjustment layer 4 allows the leakage magnetic flux 70 released from the recording layer 3 and the flux adjustment layer 4 upon temperature rise to have a more abrupt increase, and the application of the in-plane magnetization layer 9 allows the transition from in-plane magnetization to perpendicular magnetization of the recording layer 1 at the time of a temperature rise to take place more abruptly. Therefore, it is possible to further improve the reproducing resolution of the magneto-optical disk.

Next, explanations will be given of specific examples of the formation method and the recording and reproducing characteristics of the magneto-optical disk (FIG. 12) having the above-mentioned construction.

(1) Formation method of the magneto-optical disk

The formation method of the magneto-optical disk is explained as follows:

First, in the same manner as Embodiment 1, a transparent dielectric protective layer 14 made of AlN having a film-thickness of 80 nm and a reproducing layer 1 made of $Gd_{0.31}(Fe_{0.8}Co_{0.20})_{0.69}$ having a film-thickness of 40 nm are formed on a substrate 13. After formation of the reproducing layer 1, electric power is successively supplied to a GdFeAl target under a gas pressure of $4\times10^{-3}$ Torr; thus, an in-plane magnetization layer 9 made of $(Gd_{0.11}Fe_{0.89})_{0.75}Al_{0.25}$ having a film-thickness of 20 nm is formed. Here, the in-plane magnetization layer 9 thus formed is an in-plane magnetization film which has a Curie temperature Tc9 at 120° C. and exhibits magnetization in a direction in parallel with the film plane from room temperature to the Curie temperature Tc9.

Thereafter, in the same manner as Embodiment 1, on the above-mentioned in-plane magnetization layer 9 are successively formed a non-magnetic intermediate layer 2 made of AlN having a film-thickness of 3 nm, a recording layer 3 made of $Tb_{0.23}(Fe_{0.88}Co_{0.12})_{0.77}$ having a film-thickness of 40 nm, a flux adjustment layer 4 made of $Tb_{0.30}Fe_{0.70}$ having a film-thickness of 40 nm and a protective layer 15 made of AlN having a film-thickness of 20 nm.

(2) Recording and reproducing characteristics

Figure 13:
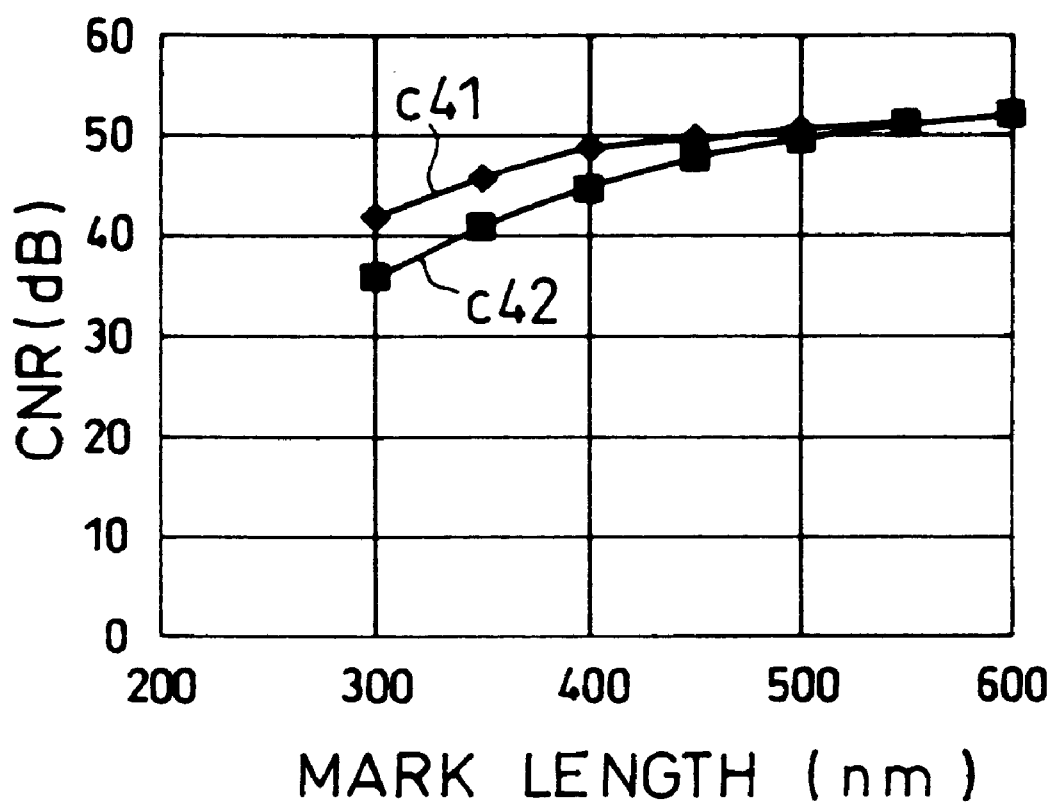
FIG. 13 is a graph that shows one example of mark-length dependence of the carrier-to-noise ratio of a magneto-optical disk to which the magneto-optical recording medium of FIG. 10 is applied.

The recording and reproducing characteristics of the above-mentioned magneto-optical disk will be explained as follows:

FIG. 13 is a graph that shows a mark-length dependence of CNR (signal-to-noise ratio) obtained by carrying out measurements on the above-mentioned magneto-optical disk (referred to as sample #2) by using an optical pickup and a semiconductor laser having a wavelength of 680 nm (c41). Here, these measurements were carried out by adjusting the line speed to 5 m/s and the reproducing power to 2.8 mW. Moreover, the mark-length dependence of CNR shown here represents a signal-to-noise ratio of a reproducing signal obtained when recording magnetic domains, each having a length corresponding to a mark length, are successively formed with a pitch twice as long as the mark-length by using a magnetic-field modulation recording system.

Moreover, for comparative purposes, another graph is also shown in which a mark-length dependence of CNR is obtained by carrying out measurements on a magneto-optical disk (referred to as comparative sample #r2) having no flux adjustment layer 4 in the above-mentioned construction (c42). In this case, since no flux adjustment layer 4 exists, the reproducing power of comparative sample #r2 was set at 2.5 mW, which was lower than the reproducing power of sample #2.

When sample #2 (c41) and comparative sample #r2 (c42) in FIG. 13 are respectively compared with sample #1 (c31) and comparative sample #r1 (c32) shown in FIG. 9, it is confirmed that the CNRs of sample #2 and comparative sample #r2 are higher by 4 dB to 5 dB in a range with short mark-lengths. This is because the installation of the in-plane magnetization film 9 has strengthened the in-plane magnetization mask (front mask) in the reproducing layer 1 and consequently, the reproducing resolution has improved.

Moreover, in FIG. 13, comparison made between sample #2 (c41) and comparative sample #r2 (c42) indicates that the CNR of sample #2 is higher than the CNR of comparative sample #r2 in a range having short mark-lengths not more than a mark length of 550 nm. This shows that, in the same manner as Embodiment 1, in sample #2, since the flux adjustment layer 4 is installed, a leakage magnetic flux 70, released from the recording layer 3 and the flux adjustment layer 4, is allowed to increase more abruptly as the temperature rises; therefore, it is confirmed that narrower rear aperture regions 21 are formed stably and that the reproducing resolution has improved. Thus, it becomes possible to improve quality in the reproducing signal in the range with short mark-lengths, and consequently to reproduce information recording with a higher density.

Additionally, in a range with longer mark-lengths not less than a mark-length of 500 nm, the CNRs of sample #2 and comparative sample #r2 are virtually the same, which indicates that sufficient quality in the reproducing signal is achieved in the range with long mark-lengths in both of the cases.

As described above, in addition to the reproducing layer 1, the recording layer 3 and the flux adjustment layer 4 related to Embodiment 1, the magneto-optical recording medium of the present embodiment is provided with the in-plane magnetization layer 9 in which a magnetic film, which exhibits in-plane magnetization at room temperature and has a Curie temperature Tc9 in the vicinity of the critical temperature Tp1 of the reproducing layer 1, is stacked between the reproducing layer 1 and the recording layer 3.

The formation of the in-plane magnetization layer 9 between the reproducing layer 1 and the recording layer 3 makes it possible to further strengthen the in-plane magnetization mask in the reproducing layer 1. In other words, at room temperature, the in-plane magnetization layer 9 forms an in-plane magnetization mask against a leakage magnetic flux released from the recording layer 3 and the flux adjustment layer 4. Then, upon reproducing, since an area including the recording magnetic domain 71b to be reproduced is heated to the vicinity of the critical temperature Tp1 of the reproducing layer 1 due to irradiation with the light beam 5, this area in the in-plane magnetization layer 9 has reached the Curie temperature Tc9, thereby losing magnetization. Consequently, only the in-plane magnetization mask at the area including the recording magnetic domain 71b to be reproduced is released.

This allows a transition from in-plane magnetization to perpendicular magnetization in the reproducing layer 1 at the time of a temperature rise to take place more abruptly.

Therefore, only the magnetization of the recording magnetic domain 71b is copied from the recording layer 3 to the reproducing layer 1 so that it is possible to reproduce only the copied magnetic domain 71b' stably. Consequently, it becomes possible to provide a super-resolution reproducing operation with a high reproducing resolution.

Moreover, the magneto-optical recording medium of the present embodiment has either a construction in which a transparent dielectric protective layer 14, a reproducing layer 1, an in-plane magnetization layer 9, a non-magnetic intermediate layer 2, a recording layer 3, a flux adjustment layer 4 and a protective layer 15 are successively stacked on a substrate 13, or a construction in which a transparent dielectric protective layer 14, a reproducing layer 1, an in-plane magnetization layer 9, a non-magnetic intermediate layer 2, a flux adjustment layer 4, a recording layer 3 and a protective layer 15 are successively stacked on a substrate 13.

With the above-mentioned constructions, since the reproducing layer 1 is installed on the light-incidence side of the light beam 5 and since the in-plane magnetization mask of the reproducing layer 1 is strengthened by the in-plane magnetization layer 9, it is possible to obtain a magnetic super-resolution reproducing operation with the above-mentioned high reproducing resolution, and since the non-magnetic intermediate layer 2 completely intercept an exchange coupling exerted between the reproducing layer 1 plus the in-plane magnetization layer 9 and the recording layer 3 plus the flux adjustment layer 4, it is possible to realize a superior magnetostatic coupling between the reproducing layer 1 plus the in-plane magnetization layer 9 and the recording layer 3 plus the flux adjustment layer 4.

Additionally, in the above-mentioned Embodiment 1 and Embodiment 2, the explanations exemplified cases in which GdFeCo is used as the reproducing layer 1, GdFeAl is used as the in-plane magnetization layer 9, TbFeCo is used as the recording layer 3, and TbFe is used as the flux adjustment layer 4; however, the present invention is not intended to be limited by these materials, and any material may be used as long as it satisfies the required magnetic properties.

With respect to the recording layer 3, besides TbFeCo, rare-earth transition metal alloy thin films made of materials such as DyFeCo, TbDyFeCo, GdDyFeCo, GdTbFeCo and GdTbDyFeCo may be adopted.

With respect to the flux adjustment layer 4, besides TbFe, rare-earth transition metal alloy thin films made of materials such as DyFe, TbFeCo, DyFeCo, TbDyFeCo, GdDyFeCo, GdTbFeCo and GdTbDyFeCo may be adopted.

With respect to the reproducing layer 1, any material is adopted as long as it exhibits in-plane magnetization at room temperature and comes to exhibit perpendicular magnetization as the temperature rises, and besides GdFeCo, rare-earth transition metal alloy films made of materials such as GdDyFeCo and GdTbFeCo may be adopted.

With respect to the in-plane magnetization layer 9, besides GdFeAl, in-plane magnetization films made of the following materials may be adopted: GdFe and GdFeD, or GdFeCoD (where D is made of at least one element selected from the group consisting of Y, Ti, V, Cr, Pd, Cu and Si or two or more elements of these), and GdHRFe, or GdHRFeCo, or GdHRFeCoD (where HR is a heavy rare earth metal that is made of at least one element selected from the group consisting of Tb, Dy, Ho and Er, or two or more elements of these, and D is made of at least one element selected from the group consisting of Y, Ti, V, Cr, Pd, Cu, Al and Si or two or more elements of these), and GdLRfe, or GdLRFeCo, or GdLRFeCoD (where LR is a light rare earth metal made of at least one element selected from the group consisting of Ce, Pr, Nd and Sm, or two or more elements of these, and D is made of at least one element selected from the group consisting of Y, Ti, V, Cr, Pd, Cu, Al and Si, or two or more elements of these).

Moreover, in the above-mentioned Embodiments 1 and 2, a recording assist layer, which is made of, for example, GdFeCo, and has a higher Curie temperature and a smaller coercive force than the recording layer 3, may be formed in contact with the recording layer 3, in order to achieve a low-magnetic field recording operation.

Embodiment 3

Referring to FIGS. 14 through 18, the following description will discuss still another embodiment of the present invention. Here, for convenience of description, those members having the same constructions as those explained in Embodiment 1 and Embodiment 2 are indicated by the same reference numerals, and the description thereof is omitted.

First, referring to FIGS. 14 through 18, an explanation will be given of a reproducing state of the magneto-optical recording medium of the present embodiment.

The magneto-optical recording medium of the present embodiment, which has the same construction as the magneto-optical recording medium (FIG. 2) of Embodiment 1 having the flux adjustment layer 4, is modified in such a manner that upon reproduction, a temperature-rise area not less than the Curie temperature is formed within the area that is being irradiated with a light beam 5.

First, referring to FIGS. 14 through 16, an explanation will be given of a reproducing state of the magneto-optical recording medium of the present embodiment.

Figure 15:
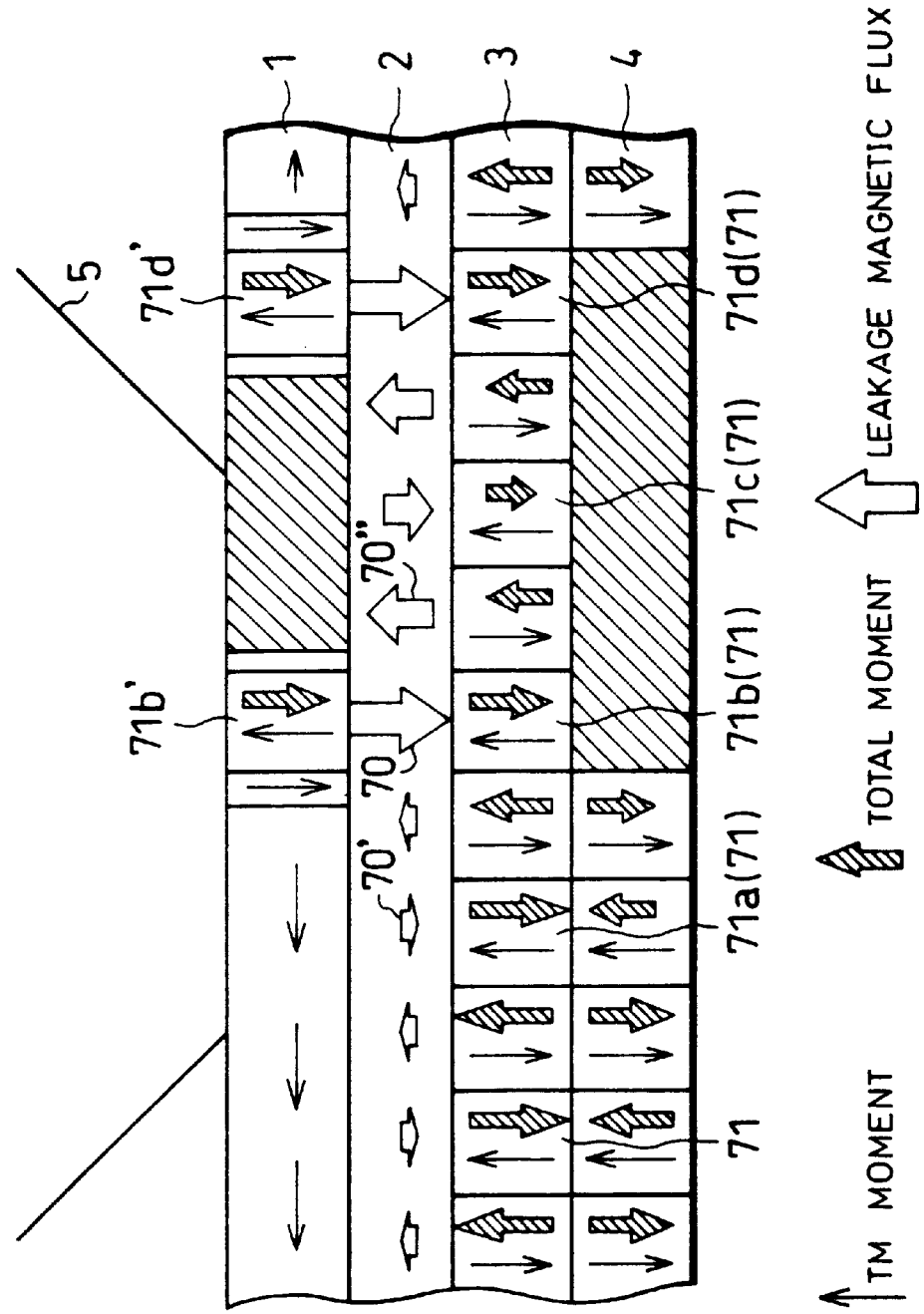
FIG. 15 is an explanatory drawing that shows magnetized states of the reproducing layer, a recording layer and a flux adjustment layer of the magneto-optical recording medium at the time of reproducing the magneto-optical recording medium shown in FIG. 14.

As illustrated in FIG. 15, in a magneto-optical recording medium of the present embodiment, a flux adjustment layer 4 is formed on the substrate in addition to the reproducing layer 1, the non-magnetic intermediate layer 2 and the recording layer 3 in the same manner as embodiment 1. Here, with respect to arrows shown in FIG. 15, each of the thin arrows indicates the direction of a magnetic moment of a transition metal (TM), each of the thick arrows indicates the size and direction of a total moment, and each of void arrows indicates the size and direction of a leakage magnetic flux.

The above-mentioned reproducing layer 1 is a magnetic film that is adjusted in its composition so that it exhibits in-plane magnetization at room temperature and also exhibits perpendicular magnetization from the critical temperature Tp1, at which a transition occurs from in-plane magnetization to perpendicular magnetization, to the Curie temperature Tc1. Then, in the reproducing layer 1, a portion that is in the perpendicular magnetization state is magnetically coupled to the recording layer 3 so as to copy the magnetization of the recording layer 3, while a portion that is in the in-plane magnetization state and a portion that has a temperature-rise not less than the Curie temperature Tc1 are not allowed to copy the magnetization of the recording layer 3.

Figure 14:
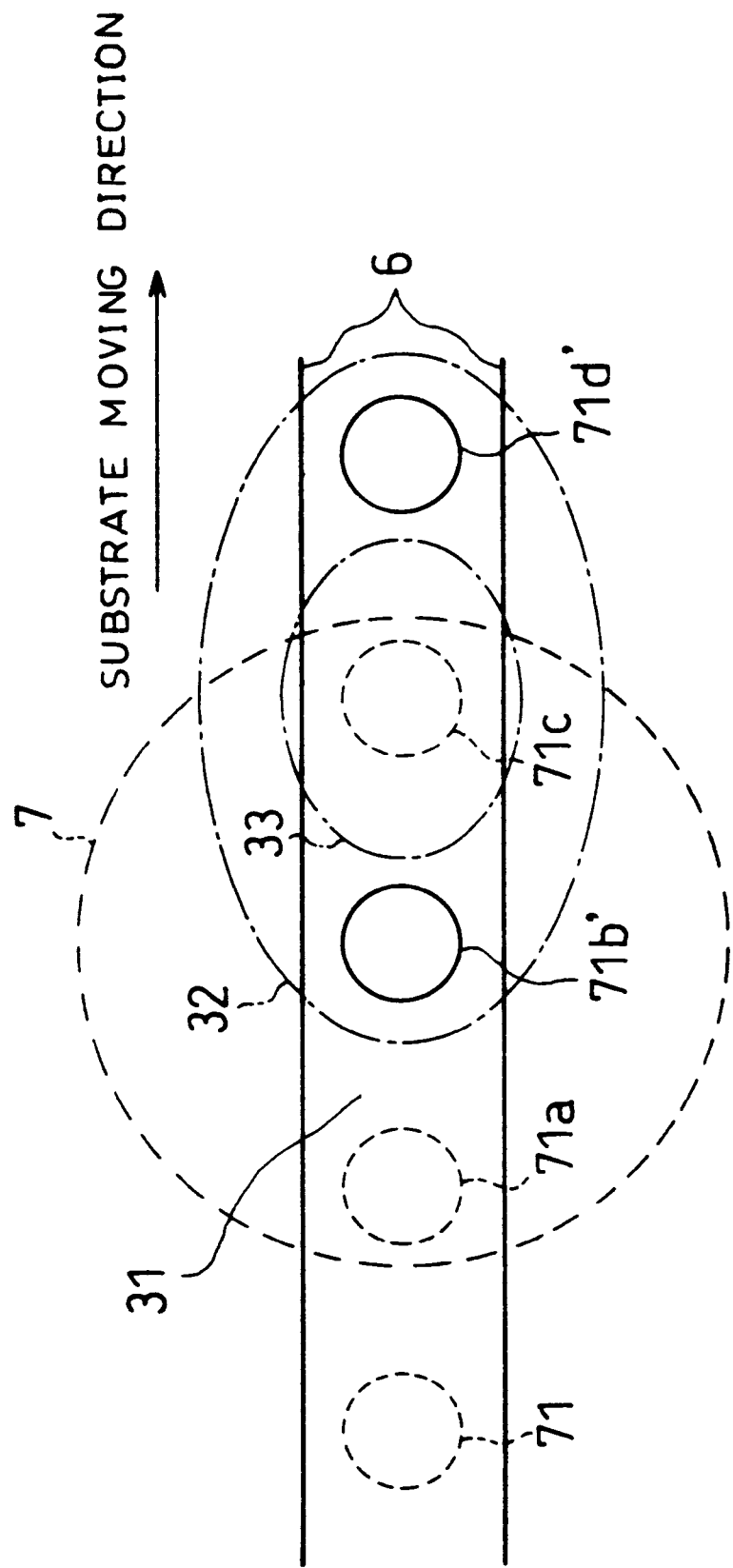
FIG. 14 is an explanatory drawing that shows a temperature distribution of a reproducing layer at the time of reproducing a magneto-optical recording medium related to still another embodiment of the present invention.

As illustrated in FIG. 14, in the above-mentioned magneto-optical recording medium, a light beam 5 is beam-condensed and directed onto the reproducing layer 1 so as to carry out recording and reproducing operations. In this case, recording magnetic domains 71 are recorded along a guide groove 6, which shows a reproducing state.

When the above magneto-optical recording medium is irradiated with a light beam 5, three temperature areas are formed. These temperature areas include a first temperature area 31 that does not have a temperature rise exceeding the critical temperature Tp1 of the reproducing layer 1, a second temperature area 32 that has a temperature not less than the critical temperature Tp1 of the reproducing layer 1 and not more than the Curie temperature Tc1 of the reproducing layer 1, and a third temperature area 33 that has a temperature rise not less than the Curie temperature Tc1 of the reproducing layer 1.

In the first temperature area 31, since the reproducing layer 1 exhibits in-plane magnetization, a leakage magnetic flux 70', released from the recording layer 3 that is in the perpendicular magnetization state, is not magnetostatically coupled to the magnetization of the reproducing layer 1 through the non-magnetic intermediate layer 2. In other words, the magnetizations of recording magnetic domains 71 and 71a are masked by the first temperature area 31 and not copied.

In the third temperature area 33 also, since the reproducing layer 1 has a temperature rise not less than the Curie temperature Tc1, a leakage magnetic flux 70" released from the recording layer 3 is not magnetostatically copied to the magnetization of the reproducing layer 1 through the non-magnetic intermediate layer 2. In other words, the magnetization of a magnetic domain 71c on the recording layer 3 is masked by the third temperature area 33, and not copied.

Therefore, double masks are formed by the first temperature area 31 and the third temperature area 33 which respectively mask recording magnetic domains 71a and 71c adjacent to the recording magnetic domain 71b to be reproduced. Consequently, among the three temperature areas formed in the above-mentioned magneto-optical recording medium, only the second temperature area 32 is allowed to copy the magnetization of the recording layer 3. In other words, the leakage magnetic flux 70 released from the recording layer 3 is magnetostatically coupled to the magnetization of the reproducing layer 1 through the non-magnetic intermediate layer 2 so that the magnetizations of the recording magnetic domains 71b and 71d of the recording layer 3 are copied on the reproducing layer 1 as magnetic domains 71b' and 71d'. Here, of the magnetic domains 71b' and 71d' that are copied in an area within the second temperature area 32 in the reproducing layer 1, only the magnetic domain 71b' that is located within the range of a light beam spot 7 is reproduced, and the magnetic domain 71d' that is not adjacent to the magnetic domain 71b' does not contribute to the reproducing operation.

Thus, it is possible to greatly narrow the area which copies the magnetization of the recording layer 3 and is located within the spot of the light beam 5 that has been directed. Therefore, even if the recording-bit diameter and the recording-bit intervals of the recording layer 3 are very small, a recording bit to be reproduced is reproduced in a separated manner from recording bits adjacent to this recording bit, thereby making it possible to carry out a magnetic super-resolution reproducing process with a higher reproducing resolution even in the case of the application of a shorter mark length.

Moreover, in the above-mentioned magneto-optical recording medium, by stacking the flux adjustment layer 4 in contact with the recording layer 3, it is possible to realize an abrupt increase in the leakage magnetic flux released from the recording layer 3 and the flux adjustment layer 4 with a temperature rise. As compared with a case in which no flux adjustment layer 4 is adopted, this allows a transition from in-plane magnetization to perpendicular magnetization in the reproducing layer 1 to take place more abruptly, thereby making it possible to improve the reproducing resolution.

In Embodiment 1, the explanation was given of a case in which TbFeCo having a TMrich composition is used as the recording layer 3 and TbFe having a RErich composition is used as the flux adjustment layer 4; however, in the present embodiment, an explanation will be given of a case in which TbFeCo having a RErich composition is used as the recording layer 3 and TbFe having a TMrich composition is used as the flux adjustment layer 4.

As illustrated in FIG. 15, since the recording layer 3 has the RErich composition, the direction of its TM moment is anti-parallel to the direction of the total moment. In contrast, since the flux adjustment layer 4 has the TMrich composition, the direction of its TM moment is parallel to the direction of the total moment. Then, the recording layer 3 and the flux adjustment layer 4 are stacked in contact with each other, with the result that an exchange coupling force is exerted between the two layers; therefore, since the directions of TM moments of the two layers are parallel to each other, the total moments of the two layers are set anti-parallel to each other.

Figure 16:
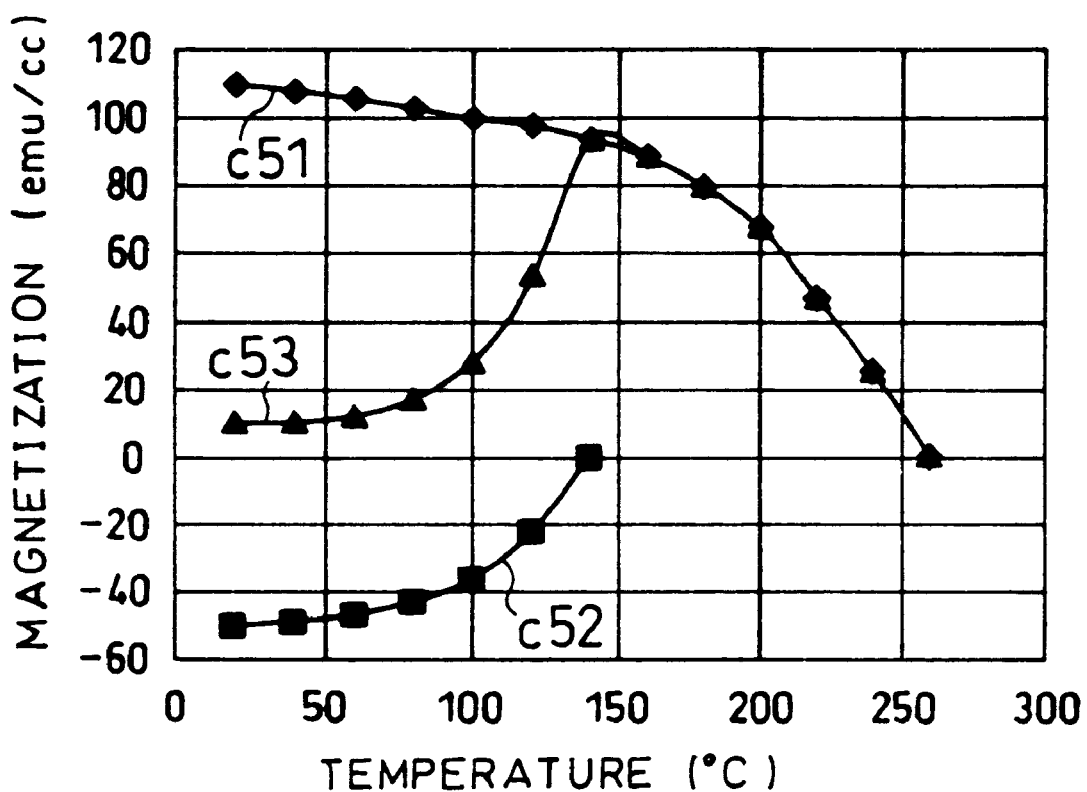
FIG. 16 is a graph that shows magnetic properties of the recording layer and the flux adjustment layer in the magneto-optical recording medium shown in FIG. 14.

FIG. 16 shows a specific example that indicates the temperature dependence of the total moment of the recording layer 3 and the total moment of the flux adjustment layer 4 and the total magnetization that is obtained by adding the total moments of the two layers. Here, since the total moment of the flux adjustment layer 4 is anti-parallel to the total moment of the recording layer 3, the total moment of the flux adjustment layer 4 is indicated by a minus value.

The recording layer 3 is made of TbFeCo with a film thickness of 30 nm, which is maintained in the RErich composition from room temperature to the Curie temperature Tc3 (260° C.) and which has a coercive force of 500 kA/m at room temperature. The total moment (c51) of the recording layer 3, which is 110 emu/cc at 25° C., gradually decreases as the temperature rises, and reaches zero at the Curie temperature Tc3 (260° C.).

The flux adjustment layer 4 is made of TbFe with a film thickness of 60 nm, which is maintained in the TMrich composition at room temperature and which has a coercive force of 600 kA/m at room temperature and a Curie temperature Tc4 of 120° C. The total moment (c52) of the flux adjustment layer 4, which is—50 emu/cc at 25° C., gradually increases as the temperature rises, and reaches zero at the Curie temperature Tc4 (140° C.).

Here, the total magnetization (c53), which is formed by the recording layer 3 and the flux adjustment layer 4 by adding the total moments of the two layers, while taking into consideration the film thicknesses of the recording layer 3 and the flux adjustment layer 4, shows an abrupt rise in the range of 25° C. to 140° C.

In this manner, even in the case when the TbFeCo having an RErich composition is used as the recording layer 3 and the TbFe having a TMrich composition is used as the flux adjustment layer 4, it is possible to realize an abrupt increase in the total magnetization with a temperature rise in the same manner as Embodiment 1, and consequently to improve the reproducing resolution.

Referring to FIG. 17, an explanation will be given of the construction of the magneto-optical recording medium in accordance with the present embodiment. Here, the explanation exemplifies a case in which the magneto-optical recording medium is applied to a magneto-optical disk.

The magneto-optical recording medium of the present embodiment is constituted by a transparent dielectric protective layer 14, a reproducing layer 1, a non-magnetic intermediate layer 2, a recording layer 3, a flux adjustment layer 4 and a protective layer 15 that are successively stacked on a substrate 13.

Here, with respect to the above-mentioned substrate 13, the transparent dielectric protective layer 14, the non-magnetic intermediate layer 2, the recording layer 3, the flux adjustment layer 4 and the protective layer 15, the same materials as described in Embodiment 1 may be used in the same manner. Moreover, as explained in Embodiment 1, the order of layer formation of the recording layer 3 and the flux adjustment layer 4 may be reversed to that of FIG. 17.

The reproducing layer 1 is preferably designed so that it exhibits in-plane magnetization at room temperature, comes to exhibit perpendicular magnetization at a temperature not less than the critical temperature Tp1, and allows a temperature-rise area not less than the Curie temperature Tc1 to be formed within the light beam spot 7 on the reproducing layer 1 to which the light beam 5 is being directed, during a reproducing operation. More specifically, an alloy thin film mainly made of a rare-earth transition metal alloy may be adopted, and its Curie temperature Tc1 is preferably set in the range of not less than 150° C. to not more than 250° C.

In the case when the Curie temperature Tc1 of the reproducing layer 1 is lower than 150° C., the polar Kerr rotation angle becomes smaller as the Curie temperature Tc1 of the reproducing layer 1 decreases, thereby failing to provide a sufficient reproducing signal. Moreover, when the Curie temperature Tc1 of the reproducing layer 1 exceeds 250° C., the Curie temperature Tc1 of the reproducing layer 1 and the Curie temperature Tc3 of the recording layer 3 come closer to each other, thereby causing a reduction in the reproducing power margin.

Moreover, the reproducing layer 1 is set to have a film thickness of 20 nm to 80 nm. Here, the film thickness of the reproducing layer 1 thinner than 20 nm causes an increase in the quantity of light to be transmitted therethrough, thereby failing to provide a desired masking effect. Further, the film thickness of the reproducing layer 1 thicker than 80 nm causes degradation in the recording sensitivity due to the increase in the film thickness.

Next, explanations will be given of specific examples of the formation method and the recording and reproducing characteristics of the magneto-optical disk (FIG. 17) having the above-mentioned construction.

(1) Formation method of the magneto-optical disk

The formation method of the magneto-optical disk is explained as follows:

First, in the same manner as Embodiment 1, a transparent dielectric protective layer 14 made of AlN having a film-thickness of 80 nm is formed on a substrate 13.

Second, after the sputter equipment has been evacuated again to $1 \times 10^{-6}$ Torr, argon gas is introduced and electric power is supplied to the GdFeAl alloy target under a gas pressure of $4 \times 10^{-3}$ Torr; thus, a reproducing layer 1 made of $(Gd_{0.30}Fe_{0.70})_{0.93}Al_{0.07}$ is formed on the transparent dielectric protective layer 14, with a film-thickness of 40 nm. Here, the reproducing layer 1 thus formed exhibits in-plane magnetization at room temperature and comes to exhibit perpendicular magnetization at 120° C., and its Curie temperature Tc1 is 200° C.

Third, a mixed gas of argon and nitrogen is introduced and electric power is supplied to the Al target under a gas pressure of $4 \times 10^{-3}$ Torr; thus, a non-magnetic intermediate layer 2 made of AlN is formed on the reproducing layer 1, with a film thickness of 3 nm.

Fourth, after the sputter equipment has been evacuated to $1 \times 10^{-6}$ Torr, argon gas is introduced and electric power is supplied to TbFeCo alloy target under a gas pressure of $4\times10^{-3}$ Torr; thus, a recording layer 3 made of $Tb_{0.28}(Fe_{0.86}Co_{0.14})_{0.72}$ is formed on the above non-magnetic intermediate layer 2, with a film-thickness of 30 nm. Here, the recording layer 3 thus formed serves as a perpendicular magnetization film of a RErich composition at temperatures higher than room temperature, has a coercive force of 500 kA/m at room temperature, and also has its Curie temperature Tc3 at 260° C.

Fifth, electric power is supplied to the TbFe alloy target under a gas pressure of $4\times10^{-3}$ Torr; thus, a flux adjustment layer 4 made of $Tb_{0.23}Fe_{0.77}$ is formed on the above-mentioned recording layer 3, with a film-thickness of 60 nm. Here, the flux adjustment layer 4 thus formed serves as a perpendicular magnetization film of a TMrich composition at temperatures higher than room temperature, has a coercive force of 600 kA/m at room temperature, and also has its Curie temperature Tc4 at 140° C.

Sixth, a mixed gas of argon and nitrogen is introduced and electric power is supplied to the Al target under a gas pressure of $4\times10^{-3}$ Torr; thus, a protective layer 15 made of AlN is formed on the above-mentioned flux adjustment layer 4, with a film-thickness of 20 nm.

(2) Recording and reproducing characteristics

Figure 18:
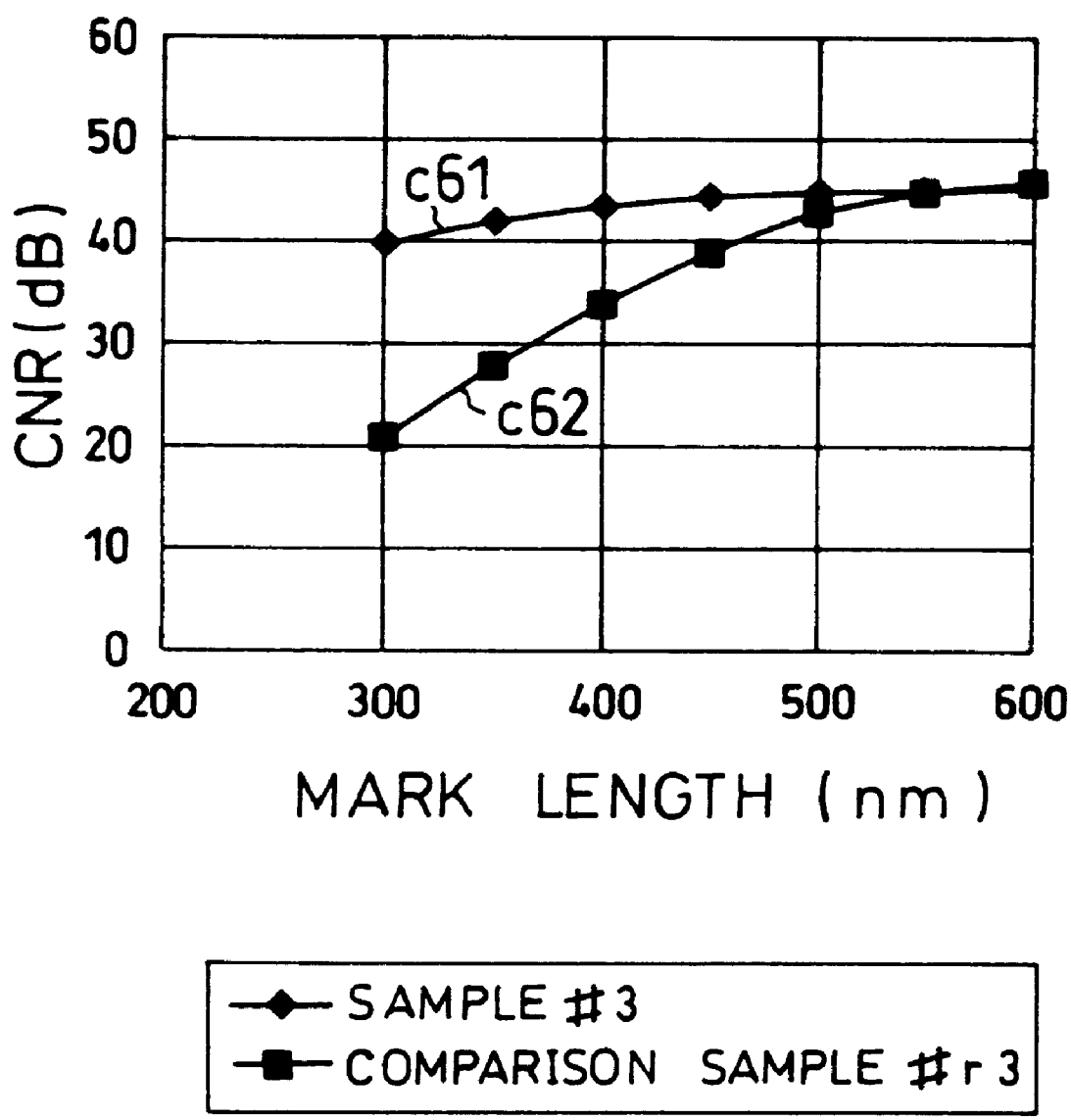
FIG. 18 is a graph that shows one example of mark-length dependence of the carrier-to-noise ratio of a magneto-optical disk to which the magneto-optical recording medium of FIG. 14 is applied.

The recording and reproducing characteristics of the above-mentioned magneto-optical disk will be explained as follows:

FIG. 18 is a graph that shows a mark-length dependence of CNR (signal-to-noise ratio) obtained by carrying out measurements on the above-mentioned magneto-optical disk (referred to as sample #3) by using by using an optical pickup and a semiconductor laser having a wavelength of 680 nm (c61). Here, these measurements were carried out by adjusting the line speed to 5 m/s and the reproducing power to 3.0 mW. Moreover, the mark-length dependence of CNR shown here represents a signal-to-noise ratio of a reproducing signal obtained when recording magnetic domains, each having a length corresponding to a mark length, are successively formed with a pitch twice as long as the mark-length by using a magnetic-field modulation recording system.

Moreover, for comparative purposes, another graph is also shown in which a mark-length dependence of CNR is obtained by carrying out measurements on a magneto-optical disk (referred to as comparative sample #r3) having no flux adjustment layer 4 in the above-mentioned construction (c62). In this case, since no flux adjustment layer 4 exists, the reproducing power of comparative sample #r 3 was set at 2.6 mW, which was lower than the reproducing power of sample #3.

In FIG. 18, comparison made between sample #3 (c61) and comparative sample #r3 (c62) shows that the CNR of sample #3 is higher than the CNR of comparative sample #r3. In particular, in the case of a short mark-length (300 nm) the CNR of sample #3 is approximately three times higher than the CNR of sample #r3. The reason for this is explained as follows: In sample #3, since the total magnetization abruptly increases as the temperature rises, and since the leakage magnetic flux 70 simultaneously increases abruptly as the temperature rises, a desired in-plane magnetization mask is formed on the reproducing layer 1. In contrast, in comparative sample #r3, since a leakage magnetic flux is released only from the recording layer 3 having an RErich composition because of non-existence of the flux adjustment layer 4, a great leakage magnetic flux is exerted even at room temperature, and the leakage magnetic flux is not allowed to increase even as the temperature rises, thereby failing to provide a desired in-plane magnetization mask on the reproducing layer 1.

When sample #3 (c61) and comparative sample #r3 (c62) in FIG. 18 are respectively compared with sample #1 (c31) and comparative sample #r1 (c32) shown in FIG. 9, it is found that the CNR of sample #3 is higher approximately by 3 dB at a short mark length (300 nm) which is required for high-density recording and reproducing operations. This shows that sample #3 is more advantageous than sample #1 in carrying out high-density recording and reproducing operations. Additionally, in the short mark length (300 nm), the CNR of comparative sample #r3 is lower than that of comparative sample #r1; this is because, since the recording layer 3 having an RErich composition is used in comparative sample #r3, a desired in-plane magnetization mask is not formed.

Additionally, at a long mark length (600 nm), the CNRs of sample #3 and comparative sample #r3 become lower by approximately 3 dB to 5 dB. This is because the Curie temperature Tc1 of the reproducing layer 1 is lowered, and because the application of double masks for reproducing narrows the aperture region, with the result that the reproducing signal becomes smaller and the CNR is lowered.

As described above, the magneto-optical recording medium of the present embodiment is constituted by: a recording layer 3 made of a perpendicular magnetization film; a reproducing layer 1 made of a magnetic film which exhibits in-plane magnetization at room temperature, and comes to exhibit perpendicular magnetization from the critical temperature Tp1 to the Curie temperature in such a manner that a portion having a perpendicular magnetization state (the second temperature area 32) is magnetically coupled to the recording layer 3 so as to copy the magnetization of a recording magnetic domain 71b while a portion having an in-plane magnetization state (the first temperature area 31) and a portion having a temperature rise not less than the Curie temperature Tc1 (the third temperature area 33) are not allowed to copy any recording magnetic domain in the recording layer; and a flux adjustment layer 4 made of a perpendicular magnetization film which is stacked adjacent to the recording layer 3, has a magnetic polarity different from that of the recording layer 3, and also has a Curie temperature Tc4 lower than the Curie temperature Tc3 of the recording layer 3.

In this manner, upon application of heat to the magneto-optical recording medium, the three temperature areas (the first temperature area 31, the second temperature area 32, the third temperature area 33) are formed so that the recording magnetic domain 71b is copied to the magnetic domain 71b′ of the reproducing layer 1 while the recording magnetic domains 71a and 71c adjacent to the recording magnetic domain 71b to be reproduced are being masked. In other words, in the first temperature area 31, the reproducing layer 1, which is in an in-plane magnetization state, is not allowed to copy the recording layer 3 that is in a perpendicular magnetization state. Therefore, the first temperature area 31 serves as a front mask for masking the recording magnetic domain 71a. Moreover, in the third temperature area 33, the reproducing layer 1, which has a temperature rise not less than the Curie temperature Tc1, is not allowed to copy the magnetization of the recording layer 3. Therefore, the third temperature area 33 serves as a rear mask for masking the recording magnetic domain 71c.

With this arrangement, it is possible to greatly narrow the area that is allowed to copy the magnetization of the recording layer 3 and that is located within the beam spot 7.

Therefore, even if the recording-bit diameter and the recording-bit intervals of the recording layer 3 are very small, a recording bit to be reproduced is reproduced in a separated manner from recording bits adjacent to this recording bit, thereby making it possible to carry out a magnetic super-resolution reproducing process with a higher reproducing resolution even in the case of the application of a shorter mark length.

Moreover, the magneto-optical recording medium of the present embodiment has either a construction in which, on the substrate 13, the transparent dielectric protective layer 14, the reproducing layer 1, the non-magnetic intermediate layer 2, the recording layer 3, the flux adjustment layer 4, and the protective layer 15 are stacked in this order, or a construction in which, on the substrate 13, the transparent dielectric protective layer 14, the reproducing layer 1, the non-magnetic intermediate layer 2, the flux adjustment layer 4, the recording layer 3 and the protective layer 15 are stacked in this order.

With the above-mentioned constructions, since the reproducing layer 1 is installed on the light-incidence side of the light beam 5, it is possible to obtain a magnetic super-resolution reproducing operation with the above-mentioned high reproducing resolution, and since the non-magnetic intermediate layer 2 completely intercept an exchange coupling exerted between the reproducing layer 1 and the recording layer 3 plus the flux adjustment layer 4, it is possible to realize a superior magnetostatic coupling between the reproducing layer 1 and the recording layer 3 plus the flux adjustment layer 4.

Embodiment 4

Referring to FIGS. 19 through 22, the following description will discuss still another embodiment of the present invention. Here, for convenience of description, those members having the same constructions as those explained in Embodiments 1 through 3 are indicated by the same reference numerals, and the description thereof is omitted.

Figure 20:
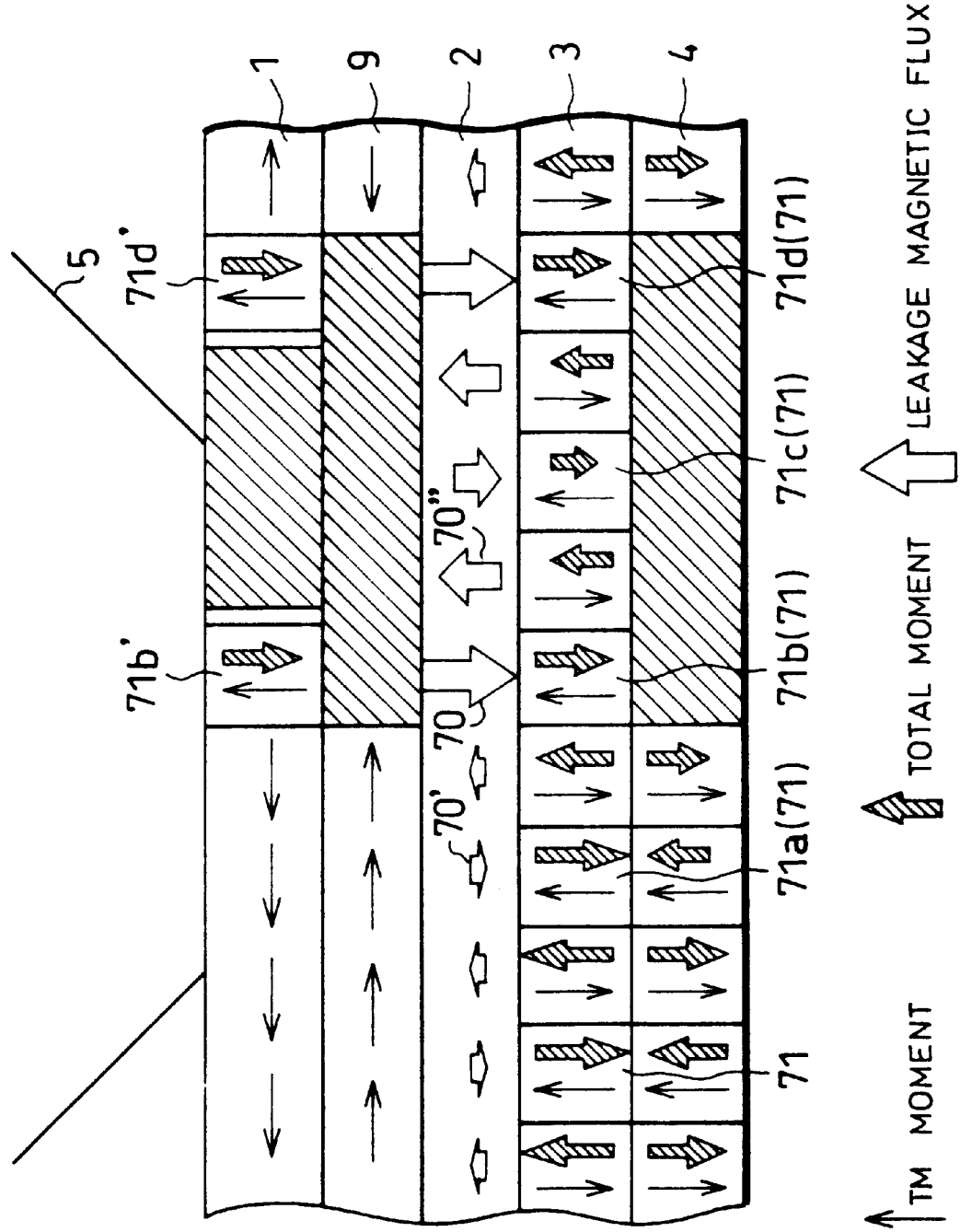
FIG. 20 is an explanatory drawing that shows magnetized states of the reproducing layer, an in-plane magnetization layer, a recording layer and a flux adjustment layer of the magneto-optical recording medium at the time of reproducing the magneto-optical recording medium shown in FIG. 19.

As illustrated in FIG. 20, the magneto-optical recording medium of the present embodiment has a construction in which an in-plane magnetization layer 9 having a Curie temperature Tc9 in the vicinity of the critical temperature Tp1 of the reproducing layer 1 at which it comes to exhibit perpendicular magnetization from in-plane magnetization is stacked in contact with the reproducing layer 1 of the magneto-optical recording medium (see FIG. 15) of Embodiment 3. Here, with respect to arrows shown in FIG. 20, each of the thin arrows indicates the direction of a magnetic moment of a transition metal (TM), each of the thick arrows indicates the size and direction of a total moment, and each of void arrows indicates the size and direction of a leakage magnetic flux.

Figure 19:
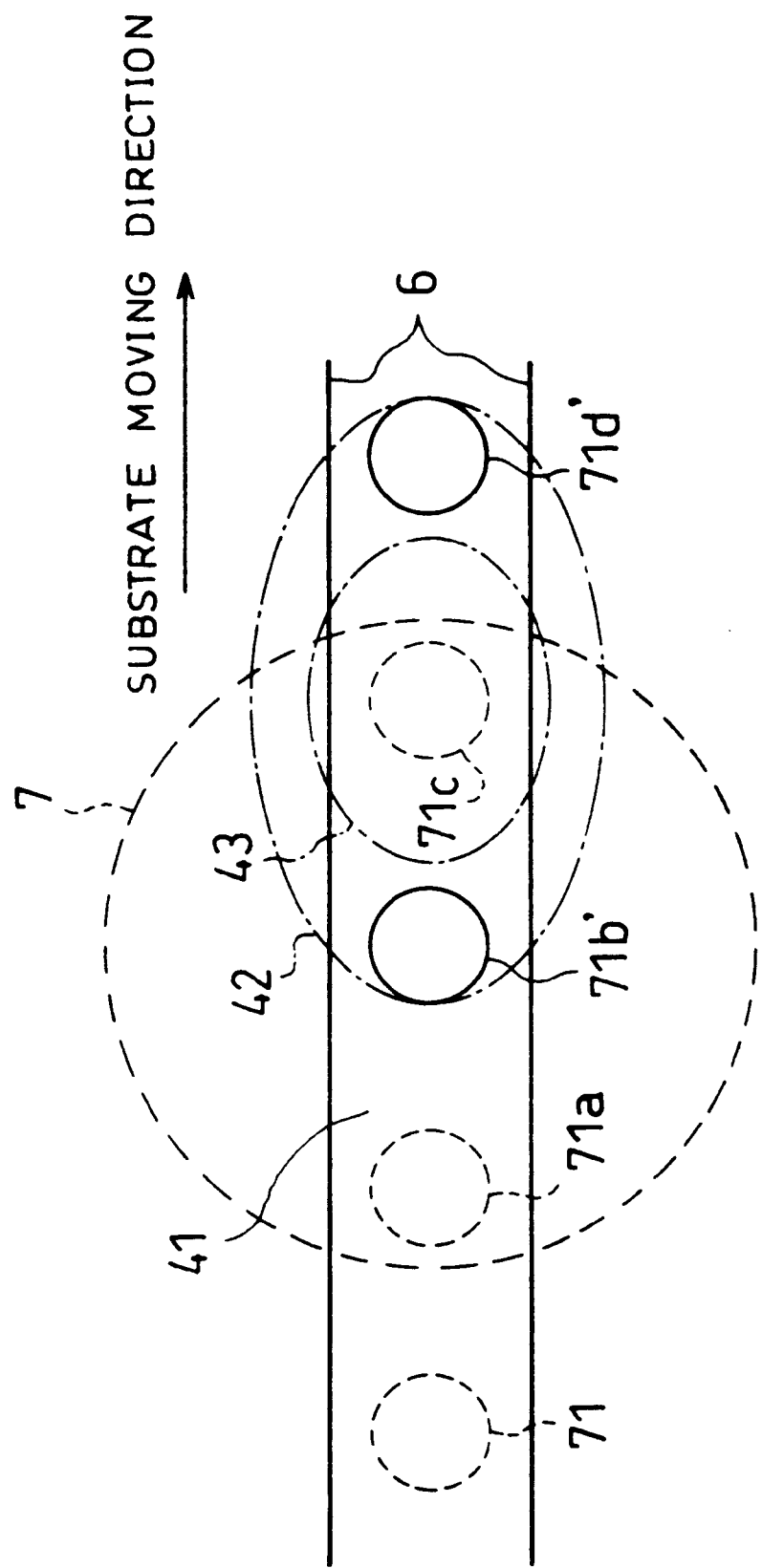
FIG. 19 is an explanatory drawing that shows a temperature distribution of a reproducing layer at the time of reproducing a magneto-optical recording medium related to still another embodiment of the present invention.

As illustrated in FIG. 19, in the above-mentioned magneto-optical recording medium, a light beam 5 is beam-condensed and directed onto the reproducing layer 1 so as to carry out recording and reproducing operations. In this case, recording magnetic domains 71 are recorded along a guide groove 6, which shows a reproducing state.

When the above magneto-optical recording medium is irradiated with the light beam 5, three temperature areas are formed in the same manner as Embodiment 3 (see FIG. 14). These temperature areas include a first temperature area 41 that does not have a temperature rise exceeding the critical temperature Tp1 of the reproducing layer 1, a second temperature area 42 that has a temperature not less than the critical temperature Tp1 of the reproducing layer 1 and not more than the Curie temperature Tc1 of the reproducing layer 1, and a third temperature area 43 that has a temperature rise not less than the Curie temperature Tc1 of the reproducing layer 1.

In the first temperature area 41, since the reproducing layer 1 exhibits in-plane magnetization, the magnetizations of the recording magnetic domains 71 and 71a of the recording layer 3 are masked and are not copied to the reproducing layer 1. In the third temperature area 43 also, since the reproducing layer 1 has a temperature rise not less than the Curie temperature Tc1, the magnetization of the recording magnetic domain 71c of the recording layer 3 is masked, and is not copied to the reproducing layer 1. Therefore, double masks are formed by the first temperature area 41 and the third temperature area 43 which respectively mask recording magnetic domains 71a and 71c adjacent to the recording magnetic domain 71b to be reproduced. Consequently, among the three temperature areas formed in the above-mentioned magneto-optical recording medium, only the second temperature area 42 is allowed to copy the magnetization of the recording layer 3. In other words, the recording magnetic domains 71b and 71d of the recording layer 3 are copied to the reproducing layer 1 as magnetic domains 71b' and 71d'. Here, of the magnetic domains 71b' and 71d' that are copied in an area within the second temperature area 42 in the reproducing layer 1, only the magnetic domain 71b', that is located within the range of a light beam spot 7 is reproduced, and the magnetic domain 71d' that is not adjacent to the magnetic domain 71b' does not contribute to the reproducing operation.

Figure 21:
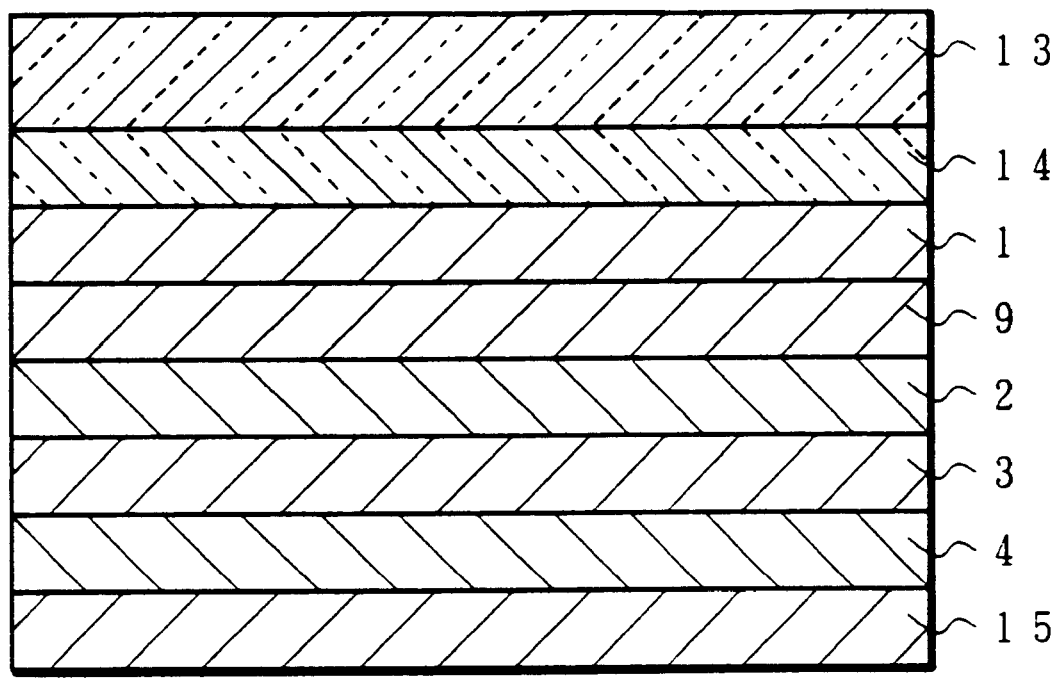
FIG. 21 is a cross-sectional view that schematically shows the construction of a magneto-optical disk to which the magneto-optical recording medium of FIG. 19 is applied.

Referring to FIG. 21, an explanation will be given of the construction of the magneto-optical recording medium in accordance with the present embodiment. Here, the explanation exemplifies a case in which the magneto-optical recording medium is applied to a magneto-optical disk.

The magneto-optical recording medium of the present embodiment is constituted by a transparent dielectric protective layer 14, a reproducing layer 1, an in-plane magnetization layer 9, a non-magnetic intermediate layer 2, a recording layer 3, a flux adjustment layer 4 and a protective layer 15 that are successively stacked on a substrate 13.

Here, with respect to the above-mentioned substrate 13, the transparent dielectric protective layer 14, the reproducing layer 1, the non-magnetic intermediate layer 2, the recording layer 3, the flux adjustment layer 4 and the protective layer 15, the same materials as described in Embodiment 3 may be used in the same manner. Moreover, as explained in Embodiment 3, the order of layer formation of the recording layer 3 and the flux adjustment layer 4 may be reversed to that of FIG. 21.

With respect to its magnetic property, the in-plane magnetization layer 9 needs to always exhibit in-plane magnetization from room temperature to its Curie temperature Tc9. Further, the Curie temperature Tc9 of the in-plane magnetization layer 9 is preferably set in the range of not less than 60° C. to not more than 150° C., and the Curie temperature Tc9 of the in-plane magnetization layer 9 is also preferably set at virtually the same temperature as the critical temperature Tp1 at which the reproducing layer 1 changes to exhibit perpendicular magnetization from in-plane magnetization.

With this construction, the application of the flux adjustment layer 4 allows the leakage magnetic flux 70 released from the recording layer 3 and the flux adjustment layer 4 upon temperature rise to have a more abrupt increase, and the application of the in-plane magnetization layer 9 allows the transition from in-plane magnetization to perpendicular magnetization of the recording layer 1 at the time of a temperature rise to take place more abruptly. Therefore, it is possible to further improve the reproducing resolution of the magneto-optical disk.

Next, explanations will be given of specific examples of the formation method and the recording and reproducing characteristics of the magneto-optical disk (FIG. 21) having the above-mentioned construction.

(1) Formation method of the magneto-optical disk

The formation method of the magneto-optical disk is explained as follows:

First, in the same manner as Embodiment 3, a transparent dielectric protective layer 14 made of AlN having a film-thickness of 80 nm, a reproducing layer 1 made of $(Gd_{0.30}Fe_{0.70})_{0.93}Al_{0.07}$ having a film-thickness of 40 nm are formed on a substrate 13. After formation of the reproducing layer 1, electric power is successively supplied to a GdFeAl target under a gas pressure of $4 \times 10^{-3}$ Torr; thus, an in-plane magnetization layer 9 made of $(Gd_{0.11}Fe_{0.89})_{0.75}Al_{0.25}$ having a film-thickness of 20 nm is formed. Here, the in-plane magnetization layer 9 thus formed is an in-plane magnetization film which has a curie temperature Tc9 at 120° C. and exhibits magnetization in a direction in parallel with the film plane from room temperature to the Curie temperature Tc9.

Thereafter, in the same manner as Embodiment 3, on the above-mentioned in-plane magnetization layer 9 are successively formed a non-magnetic intermediate layer 2 made of AlN having a film-thickness of 3 nm, a recording layer 3 made of $Tb_{0.28}(Fe_{0.86}Co_{0.14})_{0.72}$ having a film-thickness of 30 nm, a flux adjustment layer 4 made of $Tb_{0.23}Fe_{0.77}$ having a film-thickness of 60 nm and a protective layer 15 made of AlN having a film-thickness of 20 nm.

(2) Recording and reproducing characteristics

Figure 22:
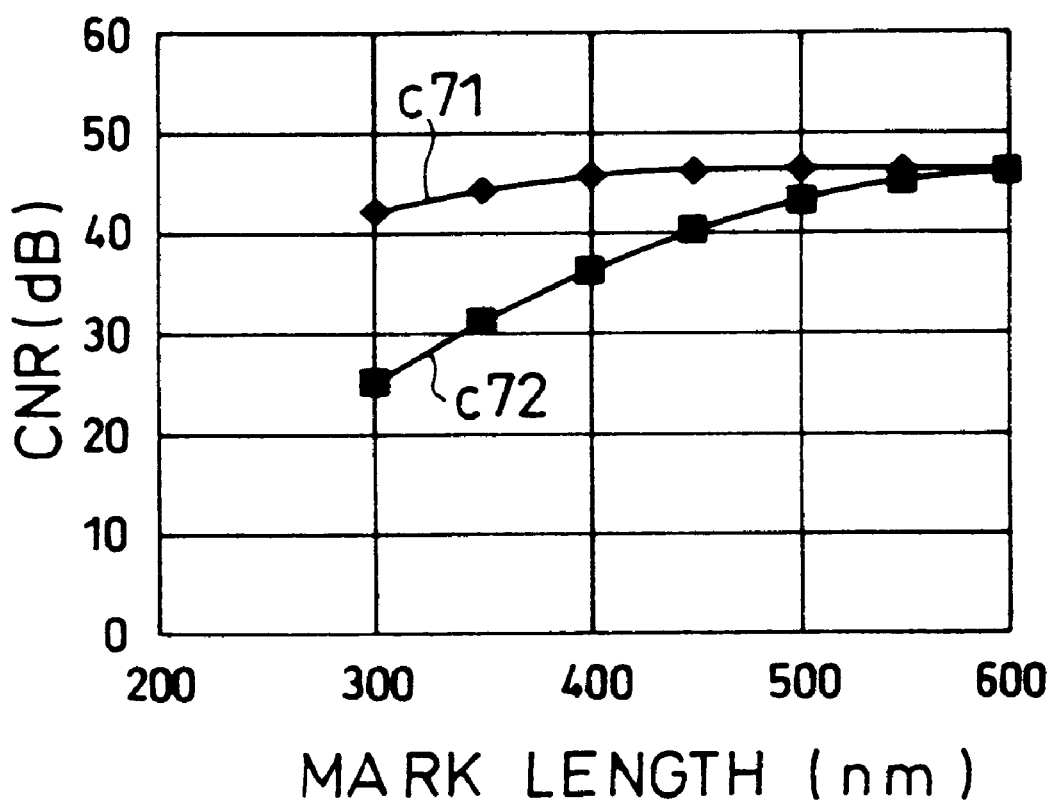
FIG. 22 is a graph that shows one example of mark-length dependence of the carrier-to-noise ratio of a magneto-optical disk to which the magneto-optical recording medium of FIG. 19 is applied.

The recording and reproducing characteristics of the above-mentioned magneto-optical disk will be explained as follows:

FIG. 22 is a graph that shows a mark-length dependence of CNR (signal-to-noise ratio) obtained by carrying out measurements on the above-mentioned magneto-optical disk (referred to as sample #4) by using an optical pickup and a semiconductor laser having a wavelength of 680 nm (c71). Here, these measurements were carried out by adjusting the line speed to 5 m/s and the reproducing power to 3.2 mW. Moreover, the mark-length dependence of CNR shown here represents a signal-to-noise ratio of a reproducing signal obtained when recording magnetic domains, each having a length corresponding to a mark length, are successively formed with a pitch twice as long as the mark-length by using a magnetic-field modulation system.

Moreover, for comparative purposes, another graph is also shown in which a mark-length dependence of CNR is obtained by carrying out measurements on a magneto-optical disk (referred to as comparative sample #r4) having no flux adjustment layer 4 in the above-mentioned construction (c72). In this case, since no flux adjustment layer 4 exists, the reproducing power of comparative sample #r4 was set at 2.8 mW, which was lower than the reproducing power of sample #4.

When sample #4 (c71) shown in FIG. 22 is compared with sample #3 (c61) shown in FIG. 18, it is confirmed that the CNR of sample #4 is higher than the CNR of sample #3 by 2 dB in all the range of mark-lengths. This is because the installation of the in-plane magnetization film 9 has strengthened the in-plane magnetization mask (front mask) in the reproducing layer 1 and consequently, the reproducing resolution has improved.

Moreover, in FIG. 22, comparison made between sample #4 (c71) and comparative sample #r4 (c72) indicates that the CNR of sample #4 is higher than the CNR of comparative sample #r4 in a range having short mark-lengths not more than a mark length of 550 nm. This shows that, in the same manner as Embodiment 3, in sample #4, since the flux adjustment layer 4 is installed, the total magnetization abruptly increases as the temperature rises, thereby allowing a leakage magnetic flux 70, released from the recording layer 3 and the flux adjustment layer 4, to increase more abruptly as the temperature rises; a desired in-plane magnetization mask is formed in the reproducing layer 1. In contract, in comparative sample #r4, since a leakage magnetic flux is released only from the recording layer 3 having an RErich composition because of non-existence of the flux adjustment layer 4, a great leakage magnetic flux is exerted even at room temperature, and the leakage magnetic flux is not allowed to increase even as the temperature rises, thereby failing to provide a desired in-plane magnetization mask on the reproducing layer 1.

Additionally, at a long mark length (600 nm), the CNRs of sample #4 and comparative sample #r4 are virtually the same, which ensures that both of the samples provide sufficient reproducing signal quality in long mark lengths.

As described above, in the magneto-optical recording medium of the present embodiment, since the flux adjustment layer 4 is formed adjacent to the recording layer 3 in the same manner as Embodiment 1, a leakage magnetic flux 70, released from the recording layer 3 and the flux adjustment layer 4, is made to rapidly grow with a temperature rise. Consequently, the greater leakage magnetic flux 70 is generated from the recording layer 3 and the flux adjustment layer 4 only at areas having a temperature rise by irradiation with a light beam 5.

Moreover, in the magneto-optical recording medium of the present embodiment, since the in-plane magnetization layer 9 is formed between the reproducing layer 1 and the recording layer 3 in the same manner as Embodiment 2, it is possible to strengthen the in-plane magnetization mask in the reproducing layer 1. This allows the reproducing layer 1 to have a transition from in-plane magnetization to perpendicular magnetization more abruptly with a temperature rise.

Furthermore, in the magneto-optical recording medium of the present embodiment, since, upon application of heat by the light beam 5, the three temperature areas (the first temperature area 31, the second temperature area 32, the third temperature area 33) are formed in the same manner as Embodiment 3; therefore, the recording magnetic domain 71b is copied to the magnetic domain 71b' of the reproducing layer 1 while the recording magnetic domains 71a and 71c adjacent to the recording magnetic domain 71b to be reproduced are being masked. Consequently, it is possible to greatly narrow the area that is allowed to copy the magnetization of the recording layer 3 and that is located within the beam spot 7.

Therefore, in the magneto-optical recording medium of the present embodiment, since only the magnetization of the recording magnetic domain 71b is copied from the recording layer 3 to the reproducing layer 1, it is possible to reproduce only the copied magnetic domain 71b' stably. In other words, even if the recording-bit diameter and the recording-bit intervals of the recording layer 3 are very small, the reproducing layer 1 reproduces a recording bit to be reproduced in a separated manner from recording bits adjacent to this recording bit, thereby making it possible to carry out a magnetic super-resolution reproducing process with a higher reproducing resolution even in the case of the application of a shorter mark length.

Moreover, the magneto-optical recording medium of the present embodiment has either a construction in which a transparent dielectric protective layer 14, a reproducing layer 1, an in-plane magnetization layer 9, a non-magnetic intermediate layer 2, a recording layer 3, a flux adjustment layer 4 and a protective layer 15 are successively stacked on a substrate 13, or a construction in which a transparent dielectric protective layer 14, a reproducing layer 1, an in-plane magnetization layer 9, a non-magnetic intermediate layer 2, a flux adjustment layer 4, a recording layer 3 and a protective layer 15 are successively stacked on a substrate 13.

With the above-mentioned constructions, since the reproducing layer 1 is installed on the light-incidence side of the light beam 5 and since the in-plane magnetization mask of the reproducing layer 1 is strengthened by the in-plane magnetization layer 9, it is possible to obtain a magnetic super-resolution reproducing operation with the above-mentioned high reproducing resolution, and since the non-magnetic intermediate layer 2 completely intercept an exchange coupling exerted between the reproducing layer 1 plus the in-plane magnetization layer 9 and the recording layer 3 plus the flux adjustment layer 4, it is possible to realize a superior magnetostatic coupling between the reproducing layer 1 plus the in-plane magnetization layer 9 and the recording layer 3 plus the flux adjustment layer 4.

Additionally, in the above-mentioned Embodiment 3 and Embodiment 4, the explanations exemplified cases in which GdFeAl is used as the reproducing layer 1, GdFeAl is used as the in-plane magnetization layer 9, TbFeCo is used as the recording layer 3, and TbFe is used as the flux adjustment layer 4; however, the present invention is not intended to be limited by these materials, and any material may be used as long as it satisfies the required magnetic properties.

With respect to the recording layer 3, besides TbFeCo, rare-earth transition metal alloy thin films made of materials such as DyFeCo, TbDyFeCo, GdDyFeCo, GdTbFeCo and GdTbDyFeCo may be adopted.

With respect to the flux adjustment layer 4, besides TbFe, rare-earth transition metal alloy thin films made of materials such as DyFe, TbFeCo, DyFeCo, TbDyFeCo, GbDyFeCo, GdTbFeCo and GdTbDyFeCo may be adopted.

Moreover, in Embodiment 3 and Embodiment 4, explanations were given of cases in which the recording layer 3 having an RErich composition and the flux adjustment layer 4 having a TMrich composition are used; however, in the same manner as Embodiment 1 and Embodiment 2, the recording layer 3 having a TMrich composition and the flux adjustment layer 4 having an RErich composition may be used with the same effect of improvement in the reproduction resolution.

With respect to the reproducing layer 1, any material is adopted as long as it exhibits in-plane magnetization at room temperature and comes to exhibit perpendicular magnetization as the temperature rises. With respect to the in-plane magnetization layer 9, any material is adopted as long as it has a Curie temperature Tc9 in the vicinity of a temperature at which the reproducing layer 1 comes to exhibit perpendicular magnetization. Therefore, with respect to the reproducing layer 1 and the in-plane magnetization layer 9, besides GdFeAl, in-plane magnetization films made of the following materials may be adopted: GdFe and GdFeD, or GdFeCoD (where D is made of at least one element selected from the group consisting of Y, Ti, V, Cr, Pd, Cu and Si or two or more elements of these), and GdHRFe, or GdHRFeCo, or GdHRFeCoD (where HR is a heavy rare earth metal that is made of at least one element selected from the group consisting of Tb, Dy, Ho and Er, or two or more elements of these, and D is made of at least one element selected from the group consisting of Y, Ti, V, Cr, Pd, Cu, Al and Si or two or more elements of these), and GdLRfe, or GdLRFeCo, or GdLRFeCoD (where LR is a light rare earth metal made of at least one element selected from the group consisting of Ce, Pr, Nd and Sm, or two or more elements of these, and D is made of at least one element selected from the group consisting of Y, Ti, V, Cr, Pd, Cu, Al and Si, or two or more elements of these).

Moreover, in the above-mentioned Embodiments 3 and 4, a recording assist layer, which is made of, for example, GdFeCo, and has a higher Curie temperature and a smaller coercive force than the recording layer 3, may be formed in contact with the recording layer 3, in order to achieve a low magnetic field recording operation.

Embodiment 5

Referring to FIGS. 23 through 26, the following description will discuss still another embodiment of the present invention. Here, for convenience of description, those members having the same constructions as those explained in Embodiments 1 through 4 are indicated by the same reference numerals, and the description thereof is omitted.

Figure 24:
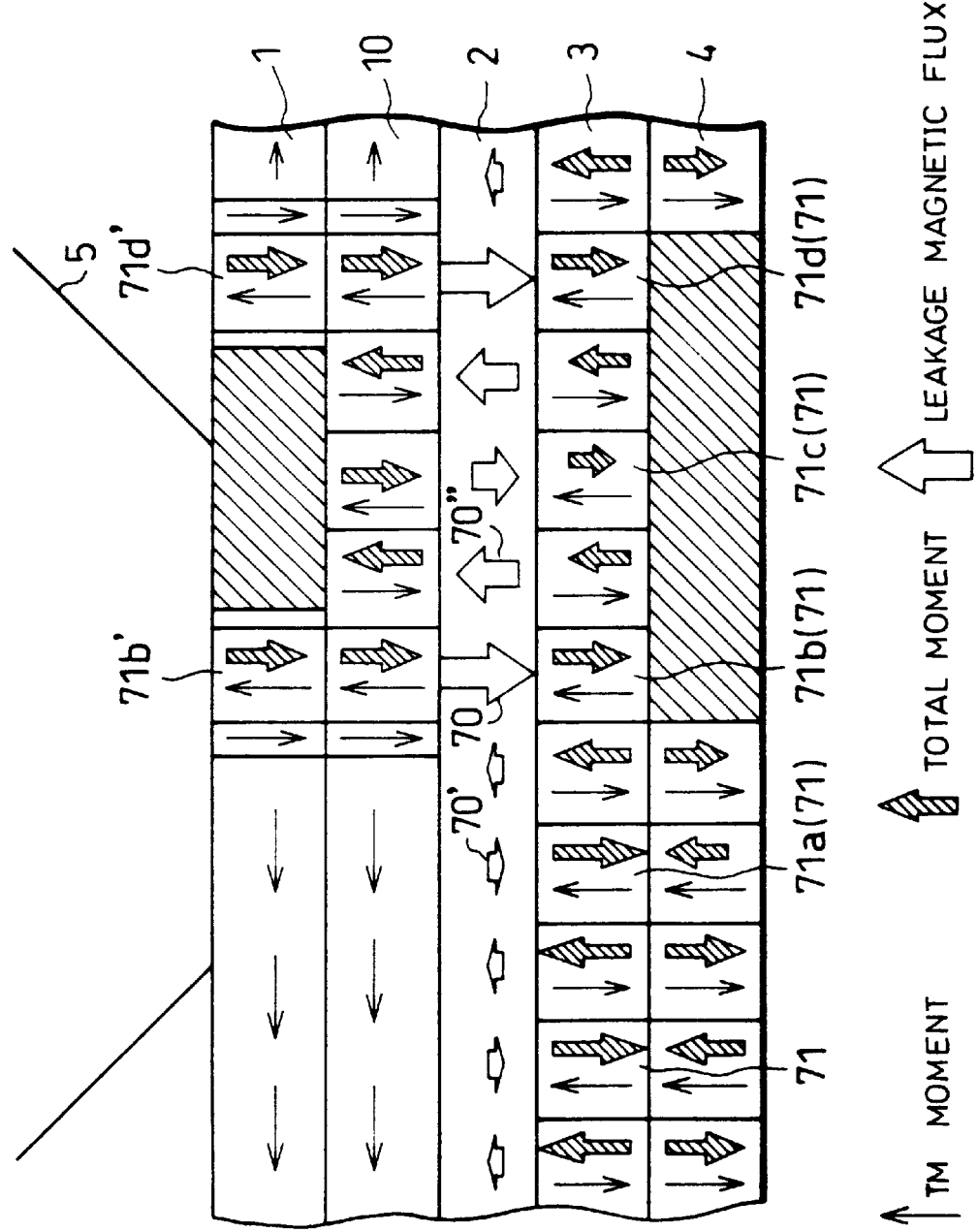
FIG. 24 is an explanatory drawing that shows magnetized states of the reproducing layer, a reproducing assist layer, a recording layer and a flux adjustment layer of the magneto-optical recording medium at the time of reproducing the magneto-optical recording medium shown in FIG. 23.

As illustrated in FIG. 24, in a magneto-optical recording medium of the present embodiment, a reproducing layer 1, a reproducing assist layer 10, a non-magnetic intermediate layer 2, a recording layer 3 and a flux adjustment layer 4 are successively stacked on a substrate. More specifically, the above-mentioned magneto-optical recording medium is designed so that, in the magneto-optical recording medium of Embodiment 3 (FIG. 15), the reproducing assist layer 10, which exhibits in-plane magnetization at room temperature, comes to exhibit perpendicular magnetization as the temperature rises, and has a Curie temperature Tc10 higher than that of the reproducing layer 1, is formed between the reproducing layer 1 and the non-magnetic intermediate layer 2. Here, with respect to arrows shown in FIG. 24, each of the thin arrows indicates the direction of a magnetic moment of a transition metal (TM), each of the thick arrows indicates the size and direction of a total moment, and each of void arrows indicates the size and direction of a leakage magnetic flux.

Figure 23:
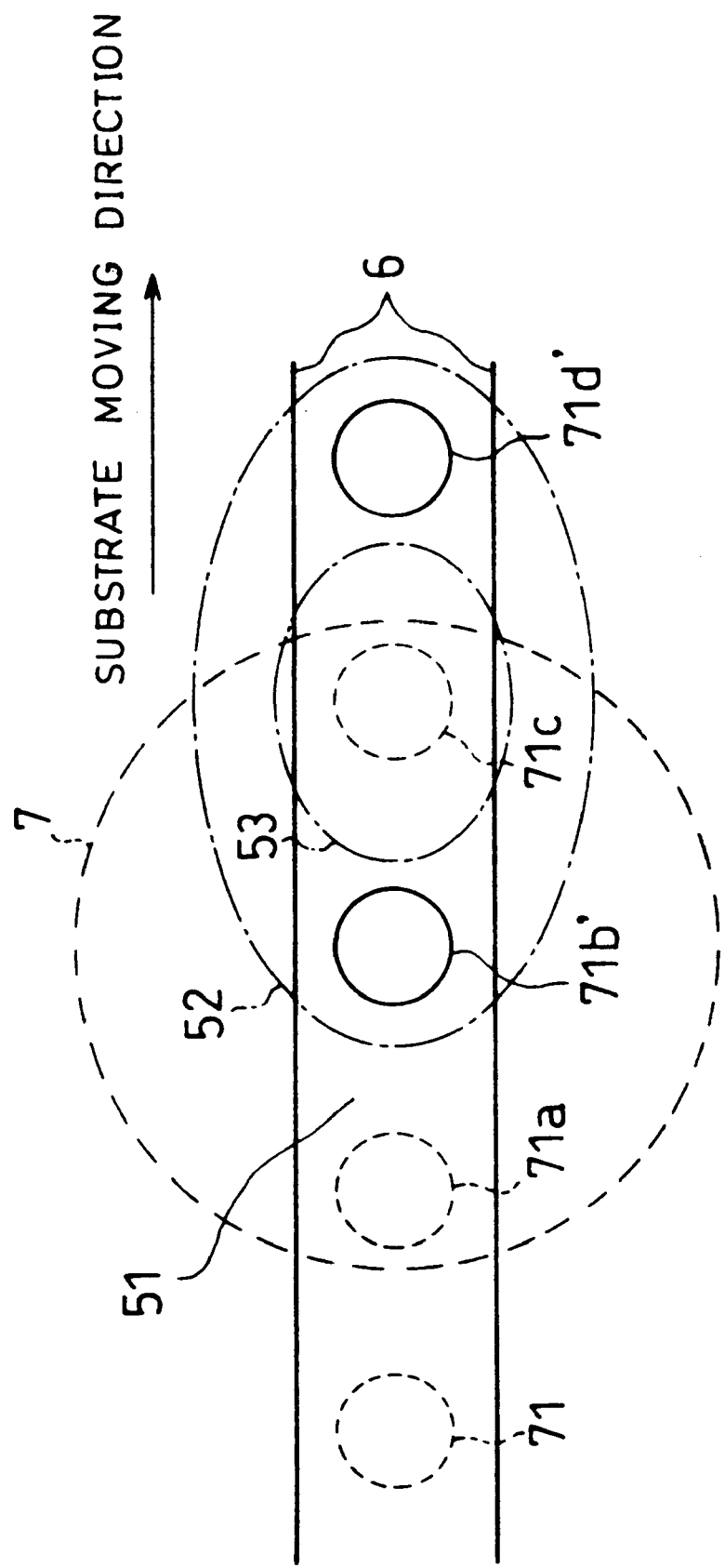
FIG. 23 is an explanatory drawing that shows a temperature distribution of a reproducing layer at the time of reproducing a magneto-optical recording medium related to still another embodiment of the present invention.

As illustrated in FIG. 23, in the above-mentioned magneto-optical recording medium, a light beam 5 is beam-condensed and directed onto the reproducing layer 1 so as to carry out recording and reproducing operations. In this case, recording magnetic domains 71 are recorded along a guide groove 6, which shows a reproducing state.

When the above magneto-optical recording medium is irradiated with the light beam 5, three temperature areas are formed in the same manner as Embodiment 3 (FIG. 14) . These temperature areas include a first temperature area 51 that does not have a temperature rise exceeding the critical temperature Tp1 of the reproducing layer 1, a second temperature area 52 that has a temperature not less than the critical temperature Tp1 of the reproducing layer 1 and not more than the Curie temperature Tc1 of the reproducing layer 1, and a third temperature area 53 that has a temperature rise not less than the Curie temperature Tc1 of the reproducing layer 1.

In the first temperature area 51, since the reproducing layer 1 exhibits in-plane magnetization, the magnetizations of recording magnetic domains 71 and 71a are masked, and are not copied to the reproducing layer 1. Moreover, in the third temperature area 53 also, since the reproducing layer 1 has a temperature rise not less than the Curie temperature Tc1, the magnetization of a recording magnetic domain 71c of the recording layer 3 is masked, and is not copied to the reproducing layer 1. Therefore, double masks are formed by the first temperature area 51 and the third temperature area 53 which respectively mask recording magnetic domains 71a and 71c adjacent to the recording magnetic domain 71b to be reproduced. Consequently, among the three temperature areas formed in the above-mentioned magneto-optical recording medium, only the temperature area 52 is allowed to copy the magnetization of the recording layer 3. In other words, the magnetizations of the recording magnetic domains 71b and 71d of the recording layer 3 are copied to the reproducing layer 1 as magnetic domains 71b' and 71d'. Here, of the magnetic domains 71b' and 71d' that are copied in an area within the second temperature area 52 in the reproducing layer 1, only the magnetic domain 71b' that is located within the range of a light beam spot 7 is reproduced, and the magnetic domain 71d' that is not adjacent to the magnetic domain 71b' does not contribute to the reproducing operation.

Thus, it is possible to greatly narrow the area which copies the magnetization of the recording layer 3, and is located within the spot of the light beam 5 that has been projected. In particular, the reproducing assist layer 10 is formed in such a manner that a comparatively large magnetization from the reproducing assist layer 10 and a leakage magnetic flux released from the recording layer 3 and the flux adjustment layer 4 are magnetostatically coupled in a stable manner; therefore, only the recording magnetic domain 71b to be reproduced is copied to the reproducing layer 1.

Therefore, even if the recording-bit diameter and the recording-bit intervals of the recording layer 3 are very small, a recording bit to be reproduced is reproduced in a separated manner from recording bits adjacent to this recording bit, thereby making it possible to carry out a magnetic super-resolution reproducing process with a higher reproducing resolution even in the case of the application of a shorter mark length.

Moreover, when an attempt is made to improve the reproducing resolution in a system with a short mark-length by utilizing the double masks, an aperture is formed in a temperature area in the vicinity of the Curie temperature Tc1 of the reproducing layer 1; therefore, the magnetization of the reproducing layer 1 that is to be magnetostatically coupled to the leakage magnetic flux released from the reproducing layer 3 and the flux adjustment layer 4 becomes extremely small, thereby failing to form a stable magnetostatically coupled state. In particular, when a recording operation has been carried out by using a long mark-length, the adverse effect becomes more noticeable, and a stable reproducing operation sometimes is not available in the case of a long mark-length. However, in the magneto-optical recording medium of the present invention, the formation of the reproducing assist layer 10 makes it possible to carry out a stable reproducing operation even in the case of a long mark-length.

Figure 25:
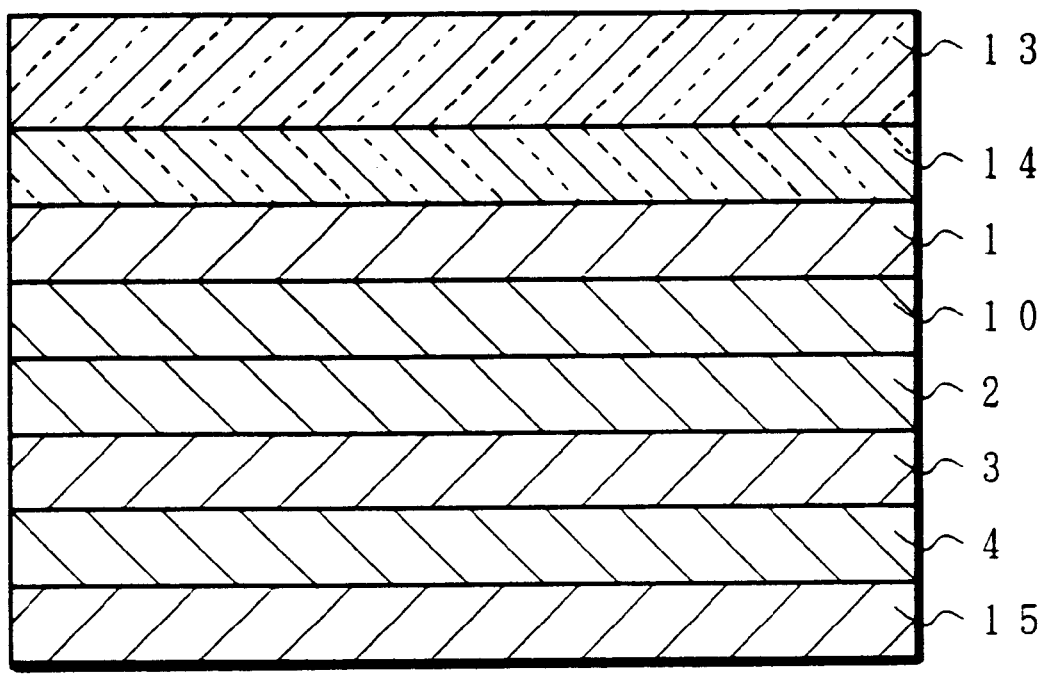
FIG. 25 is a cross-sectional view that schematically shows the construction of a magneto-optical disk to which the magneto-optical recording medium of FIG. 23 is applied.

Referring to FIG. 25, an explanation will be given of the construction of the magneto-optical recording medium in accordance with the present embodiment. Here, the explanation exemplifies a case in which the magneto-optical recording medium is applied to a magneto-optical disk.

The magneto-optical recording medium of the present embodiment is constituted by a transparent dielectric protective layer 14, a reproducing layer 1, a reproducing assist layer 10, a non-magnetic intermediate layer 2, a recording layer 3, a flux adjustment layer 4 and a protective layer 15 that are successively stacked on a substrate 13.

Here, with respect to the above-mentioned substrate 13, the transparent dielectric protective layer 14, the reproducing layer 1, the non-magnetic intermediate layer 2, the recording layer 3, the flux adjustment layer 4 and the protective layer 15, the same materials as described in Embodiment 3 may be used in the same manner. Moreover, as explained in Embodiment 1, the order of layer formation of the recording layer 3 and the flux adjustment layer 4 may be reversed to that of FIG. 25.

The reproducing assist layer 10 is stacked between the reproducing layer 1 and the non-magnetic intermediate layer 2 so as to improve the reproducing characteristic. Therefore, the reproducing assist layer 10 needs to exhibit in-plane magnetization at room temperature and come to exhibit perpendicular magnetization as the temperature rises, and upon reproduction, prevents the reproducing layer 1 from forming an area having a temperature rise not less than the Curie temperature Tc10 within the beam spot 7 to which the light beam 5 is directed. More specifically, an alloy thin film, which has a rare-earth transition metal alloy as its main component, exhibits in-plane magnetization at room temperature, comes to exhibit perpendicular magnetization as the temperature rises, and has a Curie temperature Tc10 higher than that of the reproducing layer 1, may be adopted.

Moreover, the reproducing assist layer 10 is preferably set to have a film thickness in the range of 20 nm to 80 nm. In the case of the film thickness of the reproducing assist layer 10 below 20 nm, it is difficult to maintain a preferable magnetostatically coupled state between it and the recording layer 3. Further, the film thickness of the reproducing assist layer 10 exceeding 80 nm causes degradation in the recording sensitivity due to an increase in the film thickness.

Furthermore, the transition temperature Tp10 at which the reproducing assist layer 10 has a transition from in-plane magnetization to perpendicular magnetization is preferably set in the range of not less than 60° C. to not more than 200° C. In the case of the transition temperature Tp10 of the reproducing assist layer 10 lower than 60° C., since the reproducing assist layer 10 comes to exhibit perpendicular magnetization at a comparatively low temperature, the front mask in the reproducing layer 1 becomes weaker, thereby failing to provide a preferable reproducing resolution. In the case of the transition temperature Tp10 of the reproducing assist layer 10 exceeding 200° C., since the reproducing assist layer 10 needs to have a temperature rise higher than 200° C., it is necessary to provide an extremely great reproducing power; this causes degradation in the service life of the laser light source.

In this case, it is preferably to make the transition temperature Tp1 of the reproducing layer 1 and the transition temperature Tp10 of the reproducing assist layer 10 coincident with each other. By making the transition temperatures Tp1 and Tp10 of the reproducing layer 1 and the reproducing assist layer 10 coincident with each other, a transition from in-plane magnetization to perpendicular magnetization occurs in the reproducing layer 1 and the reproducing assist layer 10 at the same temperature, thereby making it possible to form a preferably in-plane magnetization mask in the reproducing layer 1.

In addition, it is necessary to set the Curie temperature Tc10 of the reproducing assist layer 10 at a temperature that is at least higher than the Curie temperature Tc1 of the reproducing layer 1. More specifically, in order to maintain a preferably magnetostatically coupled state between it and the reproducing layer 3, the reproducing assist layer 10 is preferably set so as to have its Curie temperature Tc10 at not less than 200° C.

Next, explanations will be given of specific examples of the formation method and the recording and reproducing characteristics of the magneto-optical disk (FIG. 25) having the above-mentioned construction.

(1) Formation method of the magneto-optical disk

The formation method of the magneto-optical disk is explained as follows:

First, in the same manner as Embodiment 3, a transparent dielectric protective layer 14 made of AlN having a film-thickness of 80 nm is formed on a substrate 13.

Second, after the sputter equipment has been evacuated again to $1 \times 10^{-6}$ Torr, argon gas is introduced and electric power is supplied to the GdFeAl alloy target under a gas pressure of $4 \times 10^{-3}$ Torr; thus, a reproducing layer 1 made of $(Gd_{0.30}Fe_{0.70})_{0.93}Al_{0.07}$ is formed on the transparent dielectric protective layer 14, with a film-thickness of 40 nm. Here, the reproducing layer 1 thus formed exhibits in-plane magnetization at room temperature and comes to exhibit perpendicular magnetization at 120° C., and its Curie temperature Tc1 is 200° C.

Third, electric power is supplied to a GdFeCo alloy target under a gas pressure of $4 \times 10^{-3}$ Torr; thus, a reproducing assist layer 10 made of $Gd_{0.31}(Fe_{0.75}Co_{0.25})_{0.69}$ is formed on the reproducing layer 1 with a film thickness of 25 nm. Here, the reproducing assist layer 10 thus formed exhibits in-plane magnetization at room temperature, comes to exhibit perpendicular magnetization state at 120° C., and has its Curie temperature Tc10 at 340° C.

Fourth, a mixed gas is introduced and electric power is supplied to the Al target under a gas pressure of $4 \times 10^{-3}$ Torr; thus, a non-magnetic intermediate layer 2 made of AlN is formed on the reproducing assist layer 10, with a film thickness of 3 nm.

Fifth, after the sputter equipment has been evacuated to $1 \times 10^{-6}$ Torr, argon gas is introduced and electric power is supplied to the TbFeCo alloy target under a gas pressure of $4 \times 10^{-3}$ Torr; thus, a recording layer 3 made of $Tb_{0.28}(Fe_{0.86}Co_{0.14})_{0.72}$ is formed on the above non-magnetic intermediate layer 2, with a film-thickness of 30 nm. Here, the recording layer 3 thus formed serves as a perpendicular magnetization film of a RErich composition at temperatures higher than room temperature, has a coercive force of 500 kA/m at room temperature, and also has its Curie temperature Tc3 at 260° C.

Sixth, electric power is supplied to the TbFe alloy target under a gas pressure of $4 \times 10^{-3}$ Torr; thus, a flux adjustment layer 4 made of $Tb_{0.23}Fe_{0.77}$ is formed on the above-mentioned recording layer 3, with a film-thickness of 60 nm. Here, the flux adjustment layer 4 thus formed serves as a perpendicular magnetization film of a TMrich composition at a temperature not less than room temperature, has a coercive force of 600 kA/m at room temperature, and also has its Curie temperature Tc4 at 140° C.

Seventh, a mixed gas of argon and nitrogen is introduced and electric power is supplied to the Al target under a gas pressure of $4 \times 10^{-3}$ Torr; thus, a protective layer 15 made of AlN is formed on the above-mentioned flux adjustment layer 4, with a film-thickness of 20 nm.

(2) Recording and reproducing characteristics

Figure 26:
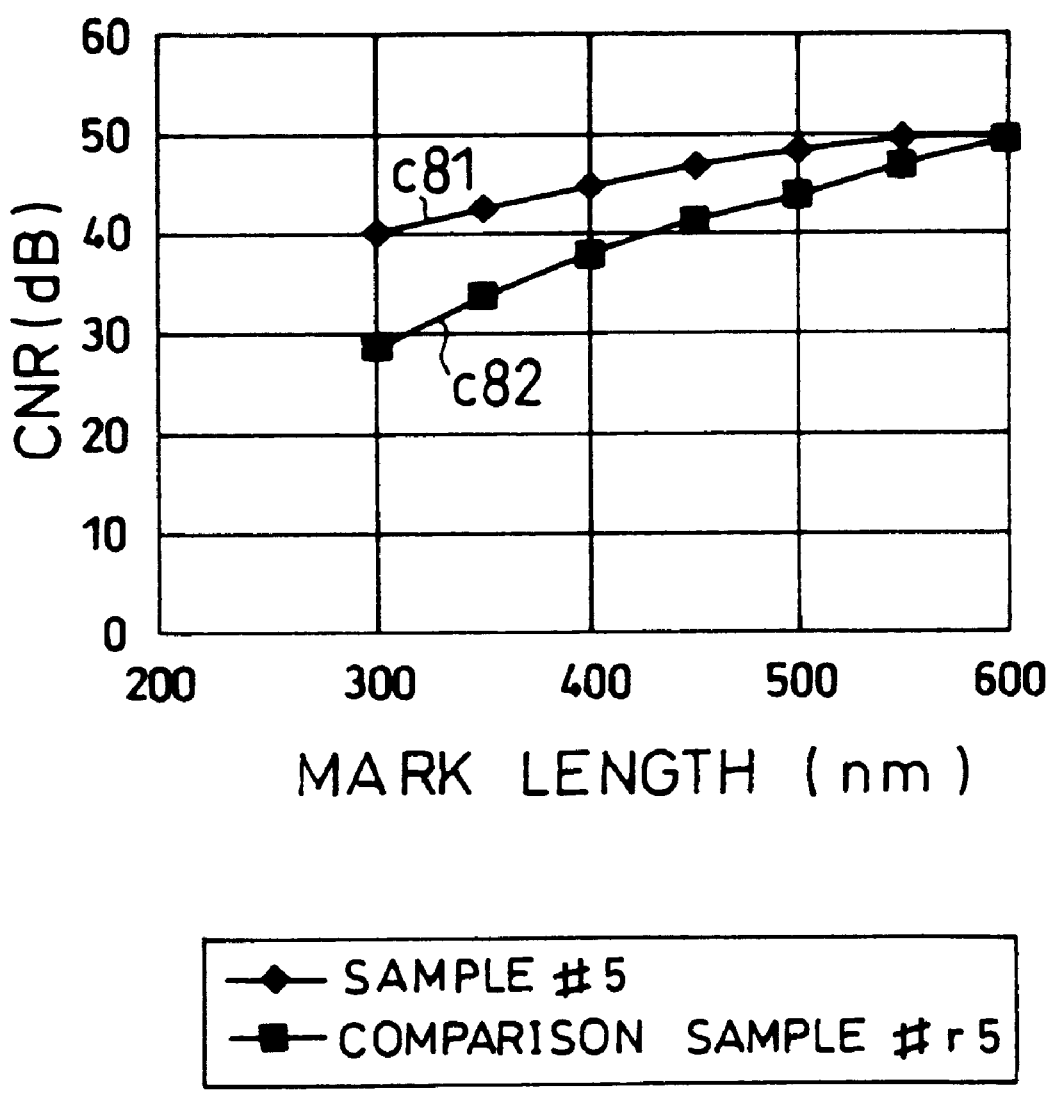
FIG. 26 is a graph that shows one example of mark-length dependence of the carrier-to-noise ratio of a magneto-optical disk to which the magneto-optical recording medium of FIG. 23 is applied.

The recording and reproducing characteristics of the above-mentioned magneto-optical disk will be explained as follows:

FIG. 26 is a graph that shows a mark-length dependence of CNR (signal-to-noise ratio) obtained by carrying out measurements on the above-mentioned magneto-optical disk (referred to as sample #5) by using an optical pickup and a semiconductor laser having a wavelength of 680 nm (c81). Here, these measurements were carried out by adjusting the line speed to 5 m/s and the reproducing power to 3.2 mW. Moreover, the mark-length dependence of CNR shown here represents a signal-to-noise ratio of a reproducing signal obtained when recording magnetic domains, each having a length corresponding to a mark length, are successively formed with a pitch twice as long as the mark-length by using a magnetic-field modulation recording system.

Moreover, for comparative purposes, another graph is also shown in which a mark-length dependence of CNR is obtained by carrying out measurements on a magneto-optical disk (referred to as comparative sample #r5) having no flux adjustment layer 4 in the above-mentioned construction (c82). In this case, since no flux adjustment layer 4 exists, the reproducing power of comparative sample #r5 was set at 2.8 mW, which was lower than the reproducing power of sample #5.

In FIG. 26, comparison made between sample #5 (c81) and comparative sample #r5 (c82) shows that the CNR of sample #5 is higher than the CNR of comparative sample #r5. In particular, in the case of a short mark-length (300 nm) the CNR of sample #5 is higher than the CNR of sample #r5 by not less than 10 dB. The reason for this is explained as follows: In sample #5, since the total magnetization abruptly increases as the temperature rises, and since the leakage magnetic flux 70 simultaneously increases abruptly as the temperature rises, a desired in-plane magnetization mask is formed on the reproducing layer 1. In contrast, in comparative sample #r5, since a leakage magnetic flux is released only from the recording layer 3 having an REricch composition because of non-existence of the flux adjustment layer 4, a great leakage magnetic flux is exerted even at room temperature, and the leakage magnetic flux is not allowed to increase even as the temperature rises, thereby failing to provide a desired in-plane magnetization mask on the reproducing layer 1.

When sample #5 (c81) shown in FIG. 26 is compared with sample #3 (c61) shown in FIG. 18, there is no difference in the CNR at a short mark length (300 nm) which is required for high-density recording and reproducing operations. This shows that sample #5 makes it possible to provide a high reproducing resolution by forming double masks in the same manner as sample #3. Moreover, at a long mark length (600 nm), the CNR of sample #5 is higher than the CNR of sample #3 by approximately 4 dB. This is because the formation of the recording assist layer 10 allows a comparatively large magnetization of the reproducing assist layer 10 and a leakage magnetic flux released from the recording layer 3 and the flux adjustment layer 4 to be magnetostatically coupled in a stable manner, thereby making it possible to carry out a reproducing operation stably even at a long mark length.

Additionally, the CNR of the comparative sample #r5 (c82) in the short mark length (300 nm) is low in the same manner as comparative sample #r3 (c62). This is because, since comparative sample #r5 uses the recording layer 3 having an REricch composition as in comparative sample #r3, it fails to form a preferable in-plane magnetization mask.

As described above, the magneto-optical recording medium of the present embodiment is provided with the reproducing assist layer 10 that is made of a magnetic film stacked between the reproducing layer 1 and the recording layer 3 in contact with the reproducing layer 1, which exhibits in-plane magnetization at room temperature, has a Curie temperature Tc10 higher than the Curie temperature Tc1 of the reproducing layer 1, and comes to exhibit perpendicular magnetization at a temperature in the vicinity of the critical temperature Tp1 of the reproducing layer 1.

In this arrangement in which the reproducing assist layer 10 is interpolated between the reproducing layer 1 and the recording layer 3 in contact with the reproducing layer 1, since the reproducing assist layer 10 has the Curie temperature Tc10 higher than the Curie temperature Tc1 of the reproducing layer 1, it maintains a perpendicular magnetization state even if, upon reproduction, the reproducing layer 1 is heated to the vicinity of its Curie temperature Tc1, thereby making it possible to copy the magnetization that has been copied from the recording layer 3 onto the reproducing layer 1.

Consequently, since a comparatively large magnetization of the reproducing assist layer 10 and a leakage magnetic flux 70 released from the recording layer 3 and the flux adjustment layer 4 are magnetostatically coupled to each other firmly in a stable manner, it is possible to copy the recording magnetic domain 71$b$ to the magnetic domain 71$b'$ stably even at a short mark length as well as at a long mark length. Therefore, it becomes possible to carry out a magnetic super-resolution reproducing operation with a great reproducing resolution which ensures a stable reproducing operation.

Moreover, the magneto-optical recording medium of the present embodiment has either a construction in which a transparent dielectric protective layer 14, a reproducing layer 1, a reproducing assist layer 10, a non-magnetic intermediate layer 2, a recording layer 3, a flux adjustment layer 4 and a protective layer 15 are successively stacked on a substrate 13, or a construction in which a transparent dielectric protective layer 14, a reproducing layer 1, a reproducing assist layer 10, a non-magnetic intermediate layer 2, a flux adjustment layer 4, a recording layer 3 and a protective layer 15 are successively stacked on a substrate 13.

With the above-mentioned constructions, since the reproducing layer 1 is installed on the light-incidence side of the light beam 5, it is possible to obtain a magnetic super-resolution reproducing operation with the above-mentioned high reproducing resolution, and since the non-magnetic intermediate layer 2 completely intercepts an exchange coupling exerted between the reproducing layer 1 plus the reproducing assist layer 10 and the recording layer 3 plus the flux adjustment layer 4, it is possible to realize a superior magnetostatic coupling between the reproducing layer 1 plus the reproducing assist layer 10 and the recording layer 3 plus the flux adjustment layer 4.

Embodiment 6

Referring to FIGS. 27 through 30, the following description will discuss still another embodiment of the present invention. Here, for convenience of description, those members having the same constructions as those explained in Embodiments 1 through 5 are indicated by the same reference numerals, and the description thereof is omitted.

Figure 28:
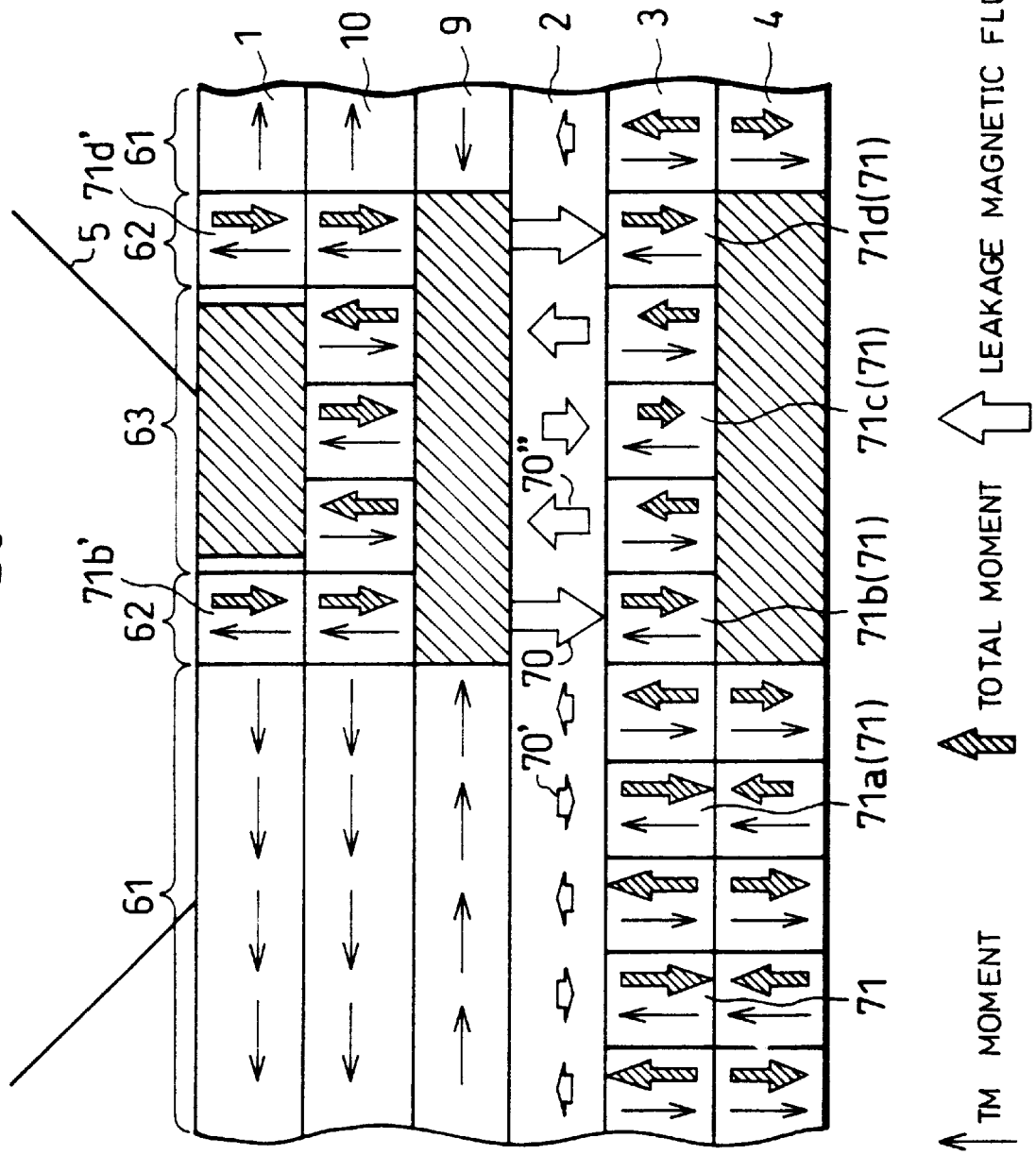
FIG. 28 is an explanatory drawing that shows magnetized states of the reproducing layer, a reproducing assist layer, an in-plane magnetization layer, a recording layer and a flux adjustment layer of the magneto-optical recording medium at the time of reproducing the magneto-optical recording medium shown in FIG. 27.

As illustrated in FIG. 28, the magneto-optical recording medium of the present embodiment has a construction in which an in-plane magnetization layer 9 having a Curie temperature Tc9 in the vicinity of the critical temperature Tp1 of the reproducing layer 1 at which it comes to exhibit perpendicular magnetization from in-plane magnetization is stacked between the reproducing assist layer 10 and the non-magnetic intermediate layer 2 of the magneto-optical recording medium (FIG. 24) of Embodiment 5. Here, with respect to arrows shown in FIG. 28, each of the thin arrows indicates the direction of a magnetic moment of a transition metal (TM), each of the thick arrows indicates the size and direction of a total moment, and each of void arrows indicates the size and direction of a leakage magnetic flux.

Figure 27:
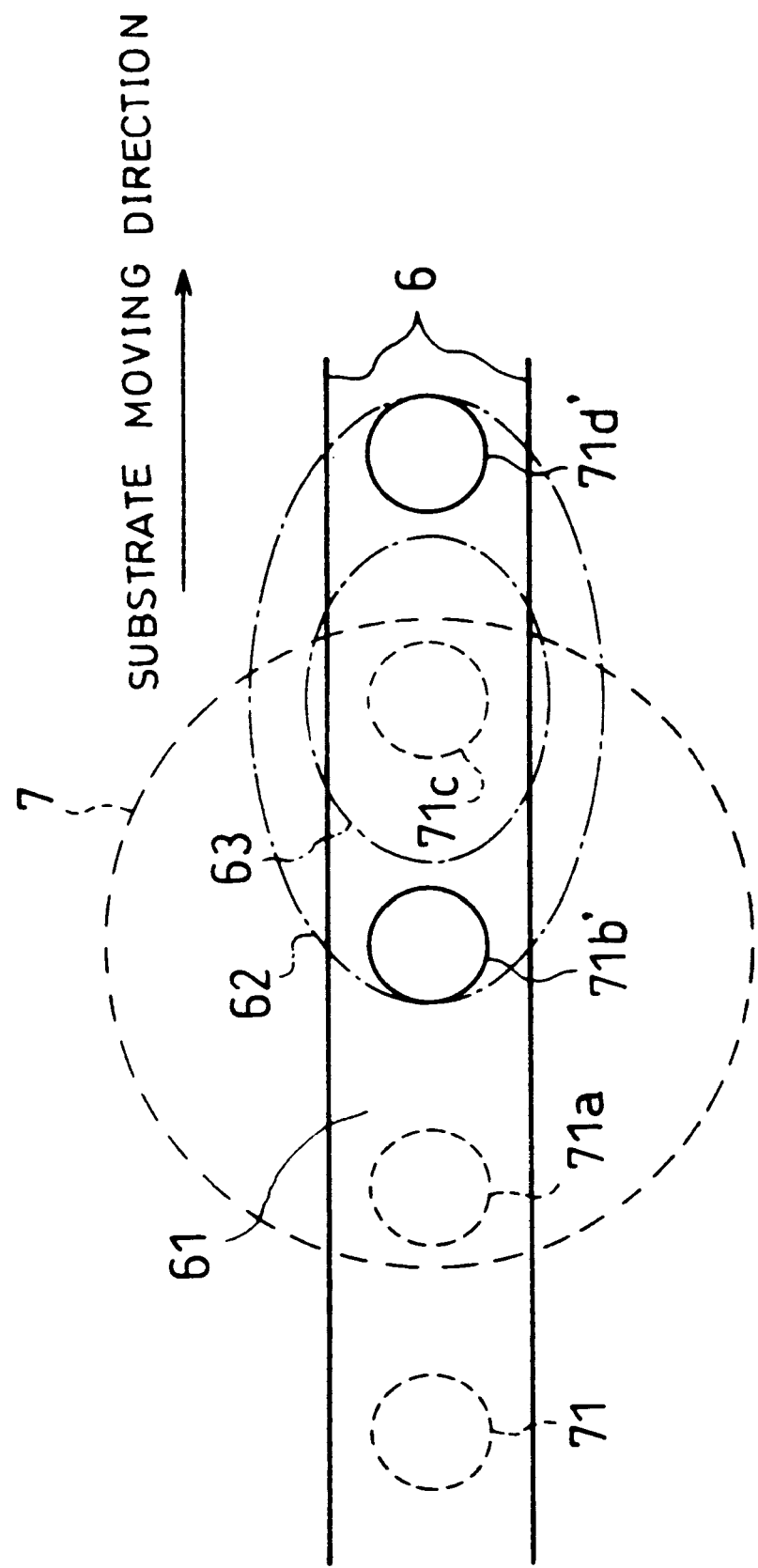
FIG. 27 is an explanatory drawing that shows a temperature distribution of a reproducing layer at the time of reproducing a magneto-optical recording medium related to still another embodiment of the present invention.

As illustrated in FIG. 27, in the above-mentioned magneto-optical recording medium, a light beam 5 is beam-condensed and directed onto the reproducing layer 1 so as to carry out recording and reproducing operations. In this case, recording magnetic domains 71 are recorded along a guide groove 6, which shows a reproducing state.

When the above magneto-optical recording medium is irradiated with the light beam 5, three temperature areas are formed in the same manner as Embodiment 5 (see FIG. 23). These temperature areas include a first temperature area 61 that does not have a temperature rise exceeding the critical temperature Tp1 of the reproducing layer 1, a second temperature area 62 that has a temperature not less than the critical temperature Tp1 of the reproducing layer 1 and not more than the Curie temperature Tc1 of the reproducing layer 1, and a third temperature area 63 that has a temperature rise not less than the Curie temperature Tc1 of the reproducing layer 1.

In the first temperature area 61, since the reproducing layer 1 exhibits in-plane magnetization, the magnetizations of the recording magnetic domains 71 and 71$a$ of the recording layer 3 are masked and are not copied to the reproducing layer 1. In the third temperature area 63 also, since the reproducing layer 1 has a temperature rise not less than the Curie temperature Tc1, the magnetization of the recording magnetic domain 71$c$ of the recording layer 3 is masked, and is not copied to the reproducing layer 1. Therefore, double masks are formed by the first temperature area 61 and the third temperature area 63 which respectively mask recording magnetic domains 71$a$ and 71$c$ adjacent to the recording magnetic domain 71$b$ to be reproduced. Consequently, among the three temperature areas formed by the application of heat, only the temperature area 62 is allowed to copy the magnetization of the recording layer 3. In other words, the recording magnetic domains 71$b$ and 71$d$ of the recording layer 3 are copied to the reproducing layer 1 as magnetic domains 71$b'$ and 71$d'$. Here, of the magnetic domains 71$b'$ and 71$d'$ that are copied in an area within the second temperature area 62 in the reproducing layer 1, only the magnetic domain 71$b'$ that is located within the range of a light beam spot 7 is reproduced, and the magnetic domain 71$d'$ that is not adjacent to the magnetic domain 71$b'$ does not contribute to the reproducing operation.

Referring to FIG. 28, an explanation will be given of an operation in which the magnetization of a recording magnetic domain of the recording layer 3 is copied to the reproducing layer 1.

In the above-mentioned magneto-optical recording medium, the magnetic polarities of the recording layer 3 and the flux adjustment layer 4 are different from each other, with the result that at room temperature, the magnetizations are cancelled, resulting in a weakened leakage magnetic flux 70'. Here, the reproducing layer 1, the reproducing assist layer 10 and the in-plane magnetization layer 9 exhibit in-plane magnetization at room temperature.

When, upon reproduction, heated by the irradiation with the light beam 5, the above-mentioned magneto-optical recording medium forms three temperature areas (the first temperature area 61, the second temperature area 62 and the third temperature area 63).

In the first temperature area 61 having a temperature not more than the critical temperature Tp1 of the reproducing layer 1, the magnetizations of the recording layer 3 and the flux adjustment layer 4 are cancelled, with the result that a weakened leakage magnetic flux 70' is released. However, since the in-plane magnetization layer 9, the reproducing assist layer 10 and the reproducing layer 1 exhibit in-plane magnetization, the magnetization of the recording magnetic domain 71a is not copied to the reproducing layer 1.

In the second temperature area 62 having a temperature ranging from the critical temperature Tp1 to the Curie temperature Tc1 of the reproducing layer 1, the flux adjustment layer 4 and the in-plane magnetization layer 9 have reached temperatures not less than the respective Curie temperatures Tc4 and Tc9, and consequently have lost their magnetizations. Therefore, a leakage magnetic flux generated by the magnetizations of the recording magnetic domains 71b and 71d of the recording layer 3 is copied to the reproducing assist layer 10 which exhibits perpendicular magnetization, and further copied to the reproducing layer 1, thereby forming magnetic domains 71b' and 71d'. Then, only the magnetic domain 71b' is reproduced.

In the third temperature area 63 having a temperature not less than the Curie temperature Tc1 of the reproducing layer 1, the flux adjustment layer 4, the in-plane magnetization layer 9 and the reproducing layer 1 have reached temperatures not less than their respective Curie temperatures Tc4, Tc9 and Tc1, and consequently have lost their magnetizations. Therefore, a leakage magnetic flux 70", generated by the magnetization of the recording magnetic domain 71b of the recording layer 3, is copied on the reproducing assist layer 10 that exhibits perpendicular magnetization, but is not copied to the reproducing layer 1.

Figure 29:
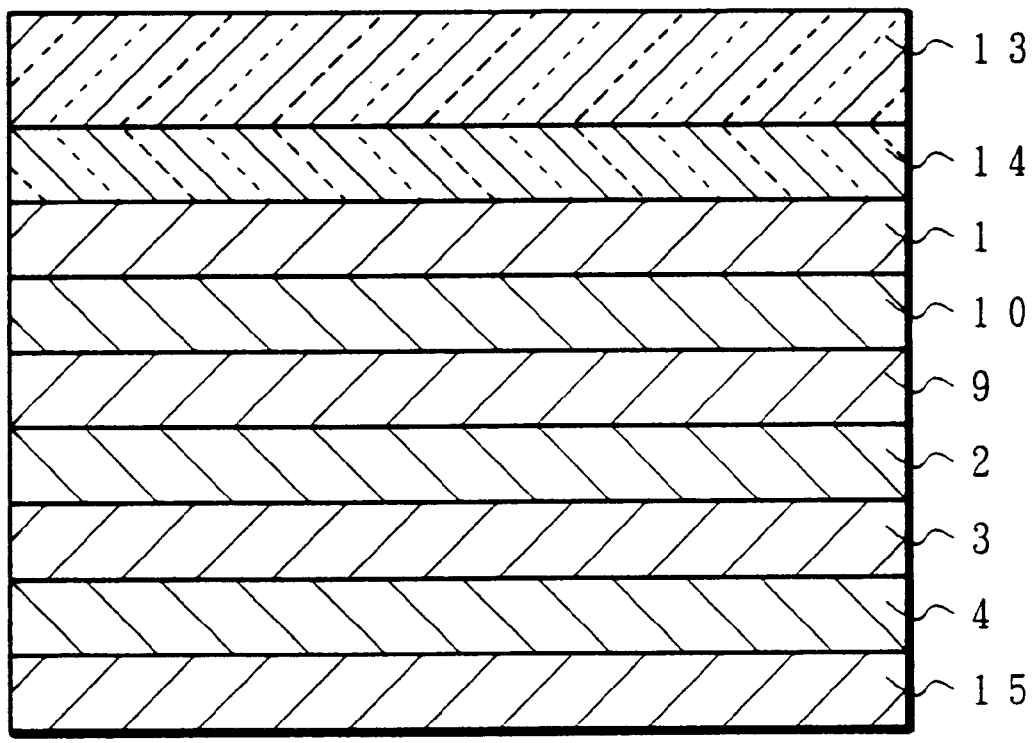
FIG. 29 is a cross-sectional view that schematically shows the construction of a magneto-optical disk to which the magneto-optical recording medium of FIG. 27 is applied.

Referring to FIG. 29, an explanation will be given of the construction of the magneto-optical recording medium in accordance with the present embodiment. Here, the explanation exemplifies a case in which the magneto-optical recording medium is applied to a magneto-optical disk.

A magneto-optical disk, which uses the magneto-optical recording medium of the present embodiment, is constituted by a transparent dielectric protective layer 14, a reproducing layer 1, a reproducing assist layer 10, an in-plane magnetization layer 9, a non-magnetic intermediate layer 2, a recording layer 3, a flux adjustment layer 4 and a protective layer 15 that are successively stacked on a substrate 13.

Here, with respect to the above-mentioned substrate 13, the transparent dielectric protective layer 14, the reproducing layer 1, the reproducing assist layer 10, the non-magnetic intermediate layer 2, the recording layer 3, the flux adjustment layer 4 and the protective layer 15, the same materials as described in Embodiment 5 may be used in the same manner. Moreover, as explained in Embodiment 3, the order of layer formation of the recording layer 3 and the flux adjustment layer 4 may be reversed to that of FIG. 29.

With this construction, the application of the flux adjustment layer 4 allows the leakage magnetic flux 70 released from the recording layer 3 and the flux adjustment layer 4 upon temperature rise to have a more abrupt increase, and the application of the in-plane magnetization layer 9 and the reproducing assist layer 10 allows the transition from in-plane magnetization to perpendicular magnetization of the recording layer 1 and the reproducing assist layer 10 at the time of a temperature rise to take place more abruptly. Therefore, it is possible to further improve the reproducing resolution of the magneto-optical disk.

Next, explanations will be given of specific examples of the formation method and the recording and reproducing characteristics of the magneto-optical disk (FIG. 29) having the above-mentioned construction.

(1) Formation method of the magneto-optical disk

The formation method of the magneto-optical disk is explained as follows:

First, in the same manner as Embodiment 5, a transparent dielectric protective layer 14 made of AlN having a film-thickness of 80 nm, a reproducing layer 1 made of $(Gd_{0.30}Fe_{0.70})_{0.93}Al_{0.07}$ having a film-thickness of 40 nm are successively formed on a substrate 13, and a reproducing assist layer 10 made of $Gd_{0.31}(Fe_{0.75}Co_{0.25})_{0.69}$ is formed on the reproducing layer 1 with a film thickness of 25 nm.

Second, power is supplied to another GdFeAl target under a gas pressure of $4 \times 10^{-3}$ Torr; thus, an in-plane magnetization layer 9 made of $(Gd_{0.11}Fe_{0.89})_{0.75}Al_{0.25}$ having a film-thickness of 20 nm is formed. Here, the in-plane magnetization layer 9 thus formed is an in-plane magnetization film which has a Curie temperature Tc9 at 120° C. and exhibits magnetization in a direction in parallel with the film plane from room temperature to the Curie temperature Tc9.

Third, in the same manner as Embodiment 5, on the above-mentioned in-plane magnetization layer 9 are successively formed a non-magnetic intermediate layer 2 made of AlN having a film-thickness of 3 nm, a recording layer 3 made of $Tb_{0.28}(Fe_{0.86}Co_{0.14})_{0.72}$ having a film-thickness of 30 nm, a flux adjustment layer 4 made of $Tb_{0.23}Fe_{0.77}$ having a film-thickness of 60 nm and a protective layer 15 made of AlN having a film-thickness of 20 nm.

(2) Recording and reproducing characteristics

Figure 30:
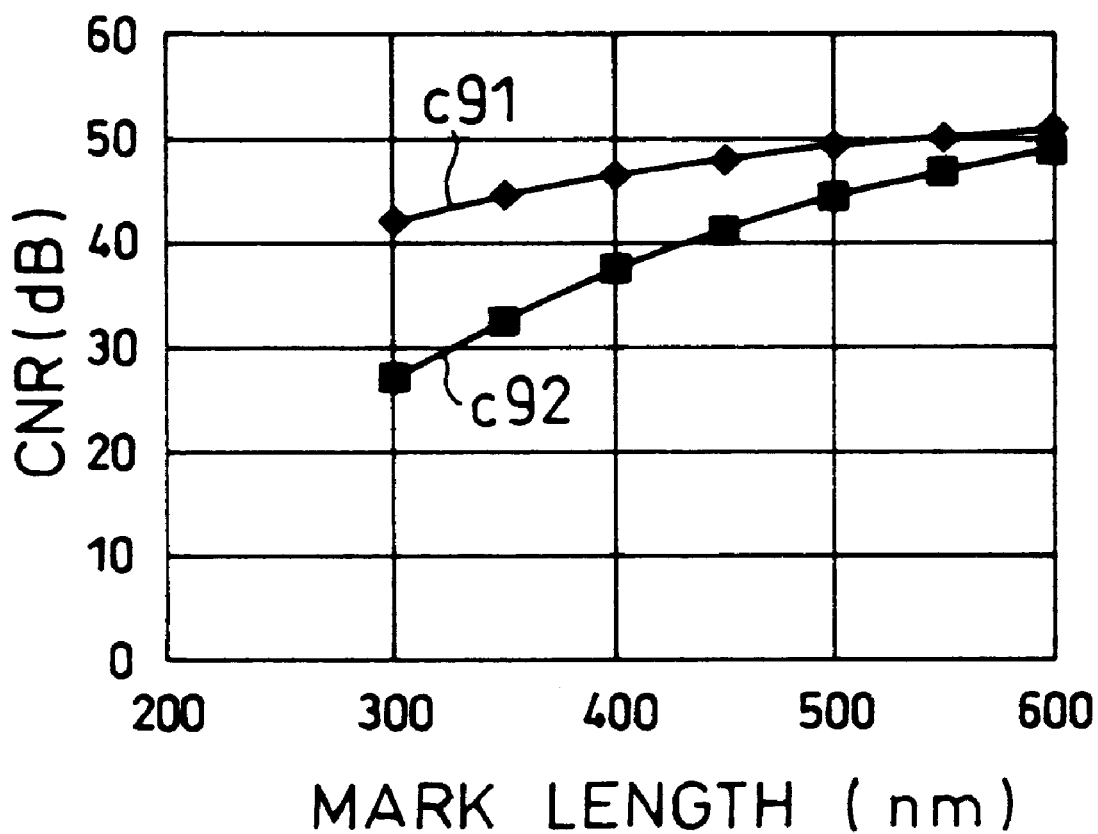
FIG. 30 is a graph that shows one example of mark-length dependence of the carrier-to-noise ratio of a magneto-optical disk to which the magneto-optical recording medium of FIG. 27 is applied.

The recording and reproducing characteristics of the above-mentioned magneto-optical disk will be explained as follows:

FIG. 30 is a graph that shows a mark-length dependence of CNR (signal-to-noise ratio) obtained by carrying out measurements on the above-mentioned magneto-optical disk (referred to as sample #6) by using an optical pickup and a semiconductor laser having a wavelength of 680 nm (c91). Here, these measurements were carried out by adjusting the line speed to 5 m/s and the reproducing power to 3.4 mW. Moreover, the mark-length dependence of CNR shown here represents a signal-to-noise ratio of a reproducing signal obtained when recording magnetic domains, each having a length corresponding to a mark length, are successively formed with a pitch twice as long as the mark-length by using a magnetic-field modulation recording system.

Moreover, for comparative purposes, another graph is also shown in which a mark-length dependence of CNR is obtained by carrying out measurements on a magneto-optical disk (referred to as comparative sample #r6) having no flux adjustment layer 4 in the above-mentioned construction (c92). In this case, since no flux adjustment layer 4 exists, the reproducing power of comparative sample #r6 was set at 3.0 mW, which was lower than the reproducing power of sample #6.

When sample #6 (c91) shown in FIG. 30 is compared with sample #5 (c81) shown in FIG. 26, it is confirmed that the CNR of sample #6 is higher the CNR of sample #5 by 2 dB in all the range of mark-lengths. This is because the installation of the in-plane magnetization film 9 has strengthened the in-plane magnetization mask (front mask) in the reproducing layer 1 and consequently, the reproducing resolution has improved.

Moreover, in FIG. 30, comparison made between sample #6 (c91) and comparative sample #r6 (c92) indicates that the CNRs of the two samples are virtually identical to each other at a mark length of 600 nm; this shows that the same degree of reproducing signal quality is obtained in long mark lengths. In contrast, at a short mark length (300 nm), the CNR of sample #6 is higher than the CNR of comparative sample #r6 by approximately 15 dB. This shows that in sample #6, since the flux adjustment layer 4 is installed, the total magnetization abruptly increases as the temperature rises, thereby allowing the leakage magnetic flux 70 to increase more abruptly as the temperature rises; thus, a desired in-plane magnetization mask is formed in the reproducing layer 1. In contract, in comparative sample #r6, since a leakage magnetic flux is released only from the recording layer 3 having an RErich composition because of nonexistence of the flux adjustment layer 4, a great leakage magnetic flux is exerted even at room temperature, and the leakage magnetic flux is not allowed to increase even as the temperature rises, thereby failing to provide a desired in-plane magnetization mask on the reproducing layer As described above, in the magneto-optical recording medium of the present embodiment, since the flux adjustment layer 4 is formed adjacent to the recording layer 3 in the same manner as Embodiment 1, a leakage magnetic flux 70, released from the recording layer 3 and the flux adjustment layer 4, is made to rapidly grow with a temperature rise. Consequently, the greater leakage magnetic flux 70 is generated from the recording layer 3 and the flux adjustment layer 4 only at areas having a temperature rise by irradiation with a light beam 5.

Moreover, in the magneto-optical recording medium of the present embodiment, since the in-plane magnetization layer 9 is formed between the reproducing layer 1 and the recording layer 3 in the same manner as Embodiment 2, it is possible to strengthen the in-plane magnetization mask in the reproducing layer 1. This allows the reproducing layer 1 to have a transition from in-plane magnetization to perpendicular magnetization more abruptly with a temperature rise.

Furthermore, in the magneto-optical recording medium of the present embodiment, upon application of heat by the light beam 5, the three temperature areas (the first temperature area 61, the second temperature area 62, the third temperature area 63) are formed in the same manner as Embodiment 3; thus, the recording magnetic domain 71b is copied to the magnetic domain 71b' of the reproducing layer 1 while the recording magnetic domains 71a and 71c adjacent to the recording magnetic domain 71b to be reproduced are being masked. Consequently, it is possible to greatly narrow the area that is allowed to copy the magnetization of the recording layer 3 and that is located within the beam spot 7.

In addition, in the magneto-optical recording medium of the present invention, in the same manner as Embodiment 5, the reproducing assist layer 10 is formed between the reproducing layer 1 and the recording layer 3 in contact with the reproducing layer 3; therefore, since a comparatively large magnetization of the reproducing assist layer 10 and a leakage magnetic flux 70 released from the recording layer 3 and the flux adjustment layer 4 are magnetostatically coupled to each other firmly in a stable manner, it is possible to copy the recording magnetic domain 71b to the magnetic domain 71b' stably even at a short mark length as well as at a long mark length. Therefore, it becomes possible to carry out a magnetic super-resolution reproducing operation with a great reproducing resolution which ensures a stable reproducing operation.

Therefore, in the magneto-optical recording medium of the present embodiment, since only the magnetization of the recording magnetic domain 71b is copied from the recording layer 3 to the reproducing layer 1, it is possible to reproduce only the copied magnetic domain 71b' stably. In other words, even if the recording-bit diameter and the recording-bit intervals of the recording layer 3 are very small, the reproducing layer 1 reproduces a recording bit to be reproduced in a separated manner from recording bits adjacent to this recording bit, thereby making it possible to carry out a magnetic super-resolution reproducing process with a higher reproducing resolution even in the case of the application of a shorter mark length.

Moreover, the magneto-optical recording medium of the present embodiment has either a construction in which a transparent dielectric protective layer 14, a reproducing layer 1, a reproducing assist layer 10, an in-plane magnetization layer 9, a non-magnetic intermediate layer 2, a recording layer 3, a flux adjustment layer 4 and a protective layer 15 are successively stacked on a substrate 13, or a construction in which a transparent dielectric protective layer 14, a reproducing layer 1, a reproducing assist layer 10, an in-plane magnetization layer 9, a non-magnetic intermediate layer 2, a flux adjustment layer 4, a recording layer 3 and a protective layer 15 are successively stacked on a substrate 13.

With the above-mentioned constructions, since the reproducing layer 1 is installed on the light-incidence side of the light beam 5 and since the in-plane magnetization mask of the reproducing layer 1 is strengthened by the in-plane magnetization layer 9, it is possible to obtain a magnetic super-resolution reproducing operation with the above-mentioned high reproducing resolution, and since the non-magnetic intermediate layer 2 completely intercept an exchange coupling exerted between the reproducing layer 1 plus the reproducing assist layer 10 plus the in-plane magnetization layer 9 and the recording layer 3 plus the flux adjustment layer 4, it is possible to realize a superior magnetostatic coupling between the reproducing layer 1 plus the reproducing assist layer 10 plus the in-plane magnetization layer 9 and the recording layer 3 plus the flux adjustment layer 4.

Additionally, in the above-mentioned Embodiment 5 and Embodiment 6, the explanations exemplified cases in which GdFeAl is used as the reproducing layer 1, GdFeCo is used as the reproducing assist layer 10, GdFeAl is used as the in-plane magnetization layer 9, TbFeCo is used as the recording layer 3, and TbFe is used as the flux adjustment layer 4; however, the present invention is not intended to be limited by these materials, and any material may be used as long as it satisfies the required magnetic properties.

With respect to the recording layer 3, besides TbFeCo, rare-earth transition metal alloy thin films made of materials such as DyFeCo, TbDyFeCo, GdDyFeCo, GdTbFeCo and GdTbDyFeCo may be adopted.

With respect to the flux adjustment layer 4, besides TbFe, rare-earth transition metal alloy thin films made of materials such as DyFe, TbFeCo, DyFeCo, TbDyFeCo, GdDyFeCo, GdTbFeCo and GdTbDyFeCo may be adopted.

Moreover, in Embodiment 5 and Embodiment 6, explanations were given of cases in which the recording layer 3 having an RErich composition and the flux adjustment layer 4 having a TMrich composition are used; however, in the same manner as Embodiment 1 and Embodiment 2, the recording layer 3 having a TMrich composition and the flux adjustment layer 4 having an RErich composition may be used, with the same effect of improvement in the reproduction resolution.

With respect to the reproducing layer 1, any material is adopted as long as it exhibits in-plane magnetization at room temperature and comes to exhibit perpendicular magnetization as the temperature rises. With respect to the in-plane magnetization layer 9, any material is adopted as long as it has a Curie temperature Tc9 in the vicinity of a temperature at which the reproducing layer 1 comes to exhibit perpendicular magnetization. Therefore, with respect to the reproducing layer 1 and the in-plane magnetization layer 9, besides GdFeAl, in-plane magnetization films made of the following materials may be adopted: GdFe and GdFeD, or GdFeCoD (where D is made of at least one element selected from the group consisting of Y, Ti, V, Cr, Pd, Cu and Si or two or more elements of these), and GdHRFe, or GdHRFeCo, or GdHRFeCoD (where HR is a heavy rare earth metal that is made of at least one element selected from the group consisting of Tb, Dy, Ho and Er, or two or more elements of these, and D is made of at least one element selected from the group consisting of Y, Ti, V, Cr, Pd, Cu, Al and Si or two or more elements of these), and GdLRfe, or GdLRFeCo, or GdLRFeCoD (where LR is a light rare earth metal made of at least one element selected from the group consisting of Ce, Pr, Nd and Sm, or two or more elements of these, and D is made of at least one element selected from the group consisting of Y, Ti, V, Cr, Pd, Cu, Al and Si, or two or more elements of these).

Moreover, in the above-mentioned Embodiments 5 and 6, a recording assist layer, which is made of, for example, GdFeCo, and has a higher Curie temperature and a smaller coercive force than the recording layer 3, may be formed in contact with the recording layer 3, in order to achieve a low magnetic field recording operation.

Each of the above-mentioned embodiments of the present invention is not intended to limit the scope of the present invention, and various modifications may be made within the scope of the present invention.

As described above, the first magneto-optical recording medium of the present invention is characterized by comprising: a recording layer made of a perpendicular magnetization film; a reproducing layer made of a magnetic film which exhibits in-plane magnetization at room temperature and comes to exhibit perpendicular magnetization at a temperature not less than a critical temperature, said reproducing layer being designed so that a portion having a perpendicular magnetization state is magnetically coupled to the recording layer so as to copy a magnetization of the recording layer, while a portion having an in-plane magnetization state is not allowed to copy the magnetization of the recording layer; and a flux adjustment layer, stacked adjacent to the recording layer, which is made of a perpendicular magnetization film that has a magnetic polarity different from that of the recording layer and also has a Curie temperature lower than the Curie temperature of the recording layer.

With the above-mentioned construction, leakage magnetic fluxes, generated by the recording layer and the flux adjustment layer, are made to rapidly grow with a temperature rise. In other words, since the recording layer and the flux adjustment layer, which are stacked adjacent to each other, have mutually different magnetic polarities, their magnetizations are countervailed at room temperature so that the leakage magnetic fluxes are weakened. Upon reproducing a recording magnetic domain of the recording layer, an area including the recording magnetic domain related to the reproducing process is heated. At this time, since the Curie temperature of the flux adjustment layer is lower than that of the recording layer, the magnetization of an area of the flux adjustment layer corresponding to the recording magnetic domain to be reproduced is allowed to decrease or disappear. As a result, a leakage magnetic flux, which is strengthened by a corresponding decrement of the magnetization of the flux adjustment layer, appears and is copied onto the reproducing layer.

Thus, a greater leakage magnetic flux is generated from the recording layer and the flux adjustment layer only at areas having a temperature rise. In other words, since a greater leakage magnetic flux is generated only from the inside of a rear aperture region having a greater temperature rise, it is possible to form a smaller rear aperture region in a stable manner.

Therefore, only the magnetization of the recording bit to be reproduced is copied from the recording layer to the reproducing layer so that it is possible to reproduce only the recording bit to be reproduced stably. Consequently, it becomes possible to provide a super-resolution reproducing operation with a high reproducing resolution.

In addition to the above-mentioned construction of the first magneto-optical recording medium, the second magneto-optical recording medium of the present invention is characterized by comprising an in-plane magnetization layer made of a magnetic film, which is stacked between the reproducing layer and the recording layer and which exhibits in-plane magnetization at room temperature, and has a Curie temperature in the vicinity of the critical temperature of the reproducing layer.

With this construction, in addition to the functions of the first magneto-optical recording medium, the in-plane magnetization mask of the reproducing layer is further strengthened. In other words, at room temperature, the magnetization layer forms an in-plane magnetization mask against a leakage magnetic flux generated from the recording layer and the flux adjustment layer. Then, upon reproduction, the area including the recording magnetic domain to be reproduced is heated to a temperature in the vicinity of the critical temperature of the reproducing layer; therefore, the in-plane magnetization layer at this area has reached the Curie temperature, losing its magnetization. This makes it possible to remove only the in-plane magnetization mask of the region including the recording magnetic domain to be reproduced.

This allows a transition from in-plane magnetization to perpendicular magnetization in the reproducing layer at the time of a temperature rise to take place more abruptly.

Therefore, only the magnetization of the recording bit to be reproduced is copied from the recording layer to the reproducing layer so that it is possible to reproduce only the recording bit to be reproduced stably. Consequently, it becomes possible to provide a super-resolution reproducing operation with a high reproducing resolution.

Moreover, in addition to the construction of the first or the second magneto-optical recording medium, the third magneto-optical recording medium of the present invention is characterized in that the above-mentioned reproducing layer is allowed to exhibit perpendicular magnetization from the critical temperature to the Curie temperature so that the magnetization of the recording layer is not copied on areas thereof having a temperature rise exceeding the Curie temperature.

With this construction, in addition to the functions of the first or second magneto-optical recording medium, upon reproduction, three temperature areas are formed in the above-mentioned magneto-optical recording medium that has been heated. That is, in the first temperature area having a temperature not more than the critical temperature, the reproducing layer exhibits in-plane magnetization so that it does not copy the magnetization of the recording layer which exhibits perpendicular magnetization. In the second temperature area having a temperature rise between the critical temperature and the Curie temperature, the reproducing layer comes to exhibit perpendicular magnetization so that it copies the magnetization of the recording layer. In the third temperature area having a temperature rise exceeding the Curie temperature, the magnetization of the reproducing layer has disappeared so that it does not copy the magnetization of the recording layer.

Thus, the second temperature area, which is an area relating to a reproducing operation, is formed, and the first and third temperature areas, which cannot copy the magnetization of the recording layer, are formed adjacent to this area, with the result that the area capable of copying is greatly narrowed.

Therefore, even if the recording-bit diameter and the recording-bit intervals of the recording layer are very small, a recording bit to be reproduced is reproduced in a separated manner from recording bits adjacent to this recording bit, thereby making it possible to carry out a magnetic super-resolution reproducing process with a higher reproducing resolution even in the case of the application of a shorter mark length.

Moreover, in addition to the construction of the third magneto-optical recording medium, the fourth magneto-optical recording medium of the present invention is characterized by comprising a reproducing assist layer made of a magnetic film, which is stacked between the reproducing layer and the recording layer in contact with the reproducing layer, and which exhibits in-plane magnetization at room temperature, has a Curie temperature higher than the Curie temperature of the reproducing layer, and comes to exhibit perpendicular magnetization at a temperature in the vicinity of the critical temperature of the reproducing layer.

With this construction, in addition to the functions obtained by the construction of the third magneto-optical recording medium, since the reproducing assist layer has a Curie temperature higher than the Curie temperature of the reproducing layer, even if, upon reproduction, the reproducing layer is heated to the vicinity of its Curie temperature, the perpendicular magnetization state is maintained so that the magnetization copied from the recording layer is further copied onto the reproducing layer.

Thus, a comparatively great magnetization exerted by the reproducing assist layer and a leakage magnetic flux generated from the recording layer and the flux adjustment layer are magnetostatically coupled more firmly in a stable state so that a recording magnetic domain to be reproduced is copied on the reproducing layer stably in both of the cases of a shorter mark length and a longer mark length.

Therefore, it becomes possible to carry out a magnetic super-resolution reproducing operation with a high reproducing resolution in a stable manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:
    a recording layer made of a perpendicular magnetization film;
    a reproducing layer made of a magnetic film which exhibits in-plane magnetization at room temperature and comes to exhibit perpendicular magnetization at a temperature not less than a critical temperature; and
    a flux adjustment layer, stacked adjacent to the recording layer, which is made of a perpendicular magnetization film that has a magnetic polarity different from that of the recording layer and also has a Curie temperature lower than the Curie temperature of the recording layer.

2. The magneto-optical recording medium as defined in claim 1, wherein a leakage magnetic flux, released from the recording layer and the flux adjustment layer, is allowed to increase abruptly with a temperature rise by an exchange coupling between the recording layer and the flux adjustment layer.

3. The magneto-optical recording medium as defined in claim 2, wherein: the recording layer has a Curie temperature in a range from not less than 200° C. to not more than 300° C., and the flux adjustment layer has a Curie temperature in a range from not less than 100° C. to not more than 200° C.

4. The magneto-optical recording medium as defined in claim 1, wherein the recording layer is made of a rare-earth transition metal alloy with a thickness in a range of 20 nm to 80 nm.

5. The magneto-optical recording medium as defined in claim 1, wherein the reproducing layer has a film thickness in a range of 20 nm to 80 nm.

6. The magneto-optical recording medium as defined in claim 1, wherein the flux adjustment layer is made of a rare-earth transition metal alloy with a thickness in a range of 20 nm to 80 nm.

7. The magneto-optical recording medium as defined in claim 1, wherein the reproducing layer has a critical temperature in a range from not less than 60° C. to not more than 250° C., said critical temperature being a temperature at which the reproducing layer has a transition from in-plane magnetization to perpendicular magnetization.

8. The magneto-optical recording medium as defined in claim 1, wherein: either the recording layer or the flux adjustment layer is made of a rare-earth transition metal alloy having such a composition that with respect to the compensation composition at which the magnetic moment of a transition metal and the magnetic moment of a rare-earth metal balance each other, the magnetic moment of the rare-earth metal becomes more predominant, and the other is made of a rare-earth transition metal alloy having such a composition that with respect to the compensation composition at which the magnetic moment of a transition metal and the magnetic moment of a rare-earth metal balance each other, the magnetic moment of the transition metal becomes more predominant.

9. The magneto-optical recording medium as defined in claim 1, wherein the recording layer is made of at least one rare-earth transition metal alloy selected from the group consisting of TbFeCo, DyFeCo, TbDyFeCo, GdDyFeCo, GdTbFeCo and GdTbDyFeCo.

10. The magneto-optical recording medium as defined in claim 1, wherein the flux adjustment layer is made of at least one rare-earth transition metal alloy selected from the group consisting of TbFe, DyFe, TbFeCo, DyFeCo, TbDyFeCo, GdDyFeCo, GdTbFeCo and GdTbDyFeCo.

11. The magneto-optical recording medium as defined in claim 1, wherein the reproducing layer is made of at least one rare-earth transition metal alloy selected from the group consisting of GdFeCo, GdDyFeCo and GdTbFeCo.

12. The magneto-optical recording medium as defined in claim 1, further comprising: a non-magnetic intermediate layer that intercepts an exchange coupling between the reproducing layer and the recording layer.

13. The magneto-optical recording medium as defined in claim 12, wherein the non-magnetic intermediate layer has a film thickness in a range of 0.5 nm to 60 nm.

14. The magneto-optical recording medium as defined in claim 1, further comprising: a protective layer for preventing magnetic films from oxidation.

15. The magneto-optical recording medium as defined in claim 1, further comprising a transparent dielectric protective layer for improving a super-resolution reproducing characteristic by using an optical interference effect thereof.

16. The magneto-optical recording medium as defined in claim 1, further comprising: an in-plane magnetization layer, stacked between the reproducing layer and the recording layer, which is made of a magnetic film that exhibits in-plane magnetization at room temperature and has a Curie temperature in the vicinity of the critical temperature of the reproducing layer.

17. The magneto-optical recording medium as defined in claim 16, wherein the in-plane magnetization layer is made of at least one material selected from the group consisting of: GdFeAl, GdFe, GdFeD, GdFeCoD (where D is made of at least one element selected from the group consisting of Y, Ti, V, Cr, Pd, Cu and Si or two or more elements of these); GdHRFe, GdHRFeCo, GdHRFeCoD (where HR is a heavy rare earth metal that is made of at least one element selected from the group consisting of Tb, Dy, Ho and Er, or two or more elements of these, and D is made of at least one element selected from the group consisting of Y, Ti, V, Cr, Pd, Cu, Al and Si or two or more elements of these); and GdLRFe, GdLRFeCo, GdLRFeCoD (where LR is a light rare earth metal made of at least one element selected from the group consisting of Ce, Pr, Nd and Sm, or two or more elements of these, and D is made of at least one element selected from the group consisting of Y, Ti, V, Cr, Pd, Cu, Al and Si, or two or more elements of these).

18. The magneto-optical recording medium as defined in claim 16, wherein the in-plane magnetization layer has a Curie temperature in a range from not less than 60° C. to not more than 200° C.

19. The magneto-optical recording medium as defined in claim 16, wherein the reproducing layer exhibits perpendicular magnetization from the critical temperature to the Curie temperature so that no magnetization of the recording layer is copied on an area thereof having a temperature rise not less than the Curie temperature.

20. The magneto-optical recording medium as defined in claim 19, wherein: the Curie temperature of the in-plane magnetization layer is set in a range from 60° C. to not more than 150° C., and the critical temperature at which the reproducing layer has a transition from in-plane magnetization from perpendicular magnetization is virtually the same as the Curie temperature of the in-plane magnetization layer.

21. The magneto-optical recording medium as defined in claim 19, further comprising: a recording assist layer made of a magnetic film, which is stacked between the reproducing layer and the recording layer in contact with the reproducing layer, and which exhibits in-plane magnetization at room temperature, has a Curie temperature higher than the Curie temperature of the reproducing layer, and comes to exhibit perpendicular magnetization at a temperature in the vicinity of the critical temperature of the reproducing layer.

22. The magneto-optical recording medium as defined in claim 1, wherein the reproducing layer exhibits perpendicular magnetization from the critical temperature to the Curie temperature so that no magnetization of the recording layer is copied on an area thereof having a temperature rise not less than the Curie temperature.

23. The magneto-optical recording medium as defined in claim 22, further comprising: a reproducing assist layer made of a magnetic film, which is stacked between the reproducing layer and the recording layer in contact with the reproducing layer, and which exhibits in-plane magnetization at room temperature, has a Curie temperature higher than the Curie temperature of the reproducing layer, and comes to exhibit perpendicular magnetization at a temperature in the vicinity of the critical temperature of the reproducing layer.

24. The magneto-optical recording medium as defined in claim 23, wherein the reproducing assist layer has a film thickness in a range of 20 nm to 80 nm.

25. The magneto-optical recording medium as defined in claim 23, wherein the reproducing assist layer has a critical temperature in a range from not less than 60° C. to not more than 200° C., said critical temperature being a temperature at which the reproducing layer has a transition from in-plane magnetization to perpendicular magnetization.

26. The magneto-optical recording medium as defined in claim 23, wherein the reproducing assist layer has a Curie temperature not less than 200° C.

27. The magneto-optical recording medium as defined in claim 22, wherein the reproducing layer has a Curie temperature in a range from not less than 150° C. to not more than 250° C.

28. A magneto-optical recording medium comprising:

a recording layer made of a perpendicular magnetization film;

a reproducing layer made of a magnetic film which exhibits in-plane magnetization at room temperature and comes to exhibit perpendicular magnetization at a temperature not less than a critical temperature, said reproducing layer being designed so that a portion having a perpendicular magnetization state is magnetically coupled to the recording layer so as to copy a magnetization of the recording layer, while a portion having an in-plane magnetization state is not allowed to copy the magnetization of the recording layer; and a flux adjustment layer, stacked adjacent to the recording layer, which is made of a perpendicular magnetization film that has a magnetic polarity different from that of the recording layer and also has a Curie temperature lower than the Curie temperature of the recording layer.

* * * * *